(12) United States Patent
Marash et al.

(10) Patent No.: US 12,452,584 B2
(45) Date of Patent: Oct. 21, 2025

(54) SCALABLE CONFERENCING SYSTEMS AND METHODS

(71) Applicant: Shure Acquisition Holdings, Inc., Niles, IL (US)

(72) Inventors: Joseph Marash, Irvine, CA (US); Jacob Marash, Foothill Ranch, CA (US); Baruch Berdugo, St. Kiriat Ata (IL)

(73) Assignee: Shure Acquisition Holdings, Inc., Niles, IL (US)

( * ) Notice: Subject to any disclaimer, the term of this patent is extended or adjusted under 35 U.S.C. 154(b) by 595 days.

(21) Appl. No.: 17/586,600

(22) Filed: Jan. 27, 2022

(65) Prior Publication Data
US 2022/0256281 A1     Aug. 11, 2022

Related U.S. Application Data

(60) Provisional application No. 63/143,258, filed on Jan. 29, 2021.

(51) Int. Cl.
*H04R 1/34* (2006.01)
*H04L 12/18* (2006.01)
(Continued)

(52) U.S. Cl.
CPC ......... *H04R 1/345* (2013.01); *H04L 12/1818* (2013.01); *H04L 12/1822* (2013.01);
(Continued)

(58) Field of Classification Search
CPC .. H04R 1/345; H04R 2201/021; H04R 1/406; H04R 1/02; H04R 1/34; H04L 12/1818;
(Continued)

(56) References Cited

U.S. PATENT DOCUMENTS

| | | |
|---|---|---|
| 1,535,408 A | 4/1925 | Fricke |
| 1,540,788 A | 6/1925 | McClure |

(Continued)

FOREIGN PATENT DOCUMENTS

| | | |
|---|---|---|
| CA | 2359771 | 4/2003 |
| CA | 2475283 | 1/2005 |

(Continued)

OTHER PUBLICATIONS

"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021.

(Continued)

*Primary Examiner* — Yosef K Laekemariam
(74) *Attorney, Agent, or Firm* — ALSTON & BIRD LLP

(57) ABSTRACT

A scalable conferencing system can include a set of conferencing devices configured to be placed on a surface (such as, a table), mounted on a ceiling, or attached to a wall. The conferencing devices can be configured to be positioned in a room and pick up and/or reproduce audio in the room. Depending on the configuration and/or characteristics of the room (such as, dimensions, geometry, acoustical properties, furnishings, or the like), a plurality of conferencing devices of a particular type can be deployed in the room and/or conferencing devices of another particular type may not be deployed. The conferencing system can be used for audio and/or video conferencing.

24 Claims, 22 Drawing Sheets

(51) Int. Cl.
  *H04M 3/56* (2006.01)
  *H04M 15/00* (2024.01)
  *H04N 7/15* (2006.01)

(52) U.S. Cl.
  CPC .............. *H04N 7/15* (2013.01); *H04M 3/567* (2013.01); *H04M 15/8072* (2013.01); *H04M 2203/5009* (2013.01); *H04N 7/152* (2013.01)

(58) Field of Classification Search
  CPC ....... H04L 12/1822; H04L 12/18; H04N 7/15; H04N 7/152; H04M 3/567; H04M 15/8072; H04M 2203/5009; H04M 15/00; H04M 3/56
  See application file for complete search history.

(56) References Cited

U.S. PATENT DOCUMENTS

| | | |
|---|---|---|
| 1,965,830 A | 7/1934 | Hammer |
| 2,075,588 A | 3/1937 | Meyers |
| 2,113,219 A | 4/1938 | Olson |
| 2,164,655 A | 7/1939 | Kleerup |
| D122,771 S | 10/1940 | Doner |
| 2,233,412 A | 3/1941 | Hill |
| 2,268,529 A | 12/1941 | Stiles |
| 2,343,037 A | 2/1944 | Adelman |
| 2,377,449 A | 6/1945 | Prevette |
| 2,481,250 A | 9/1949 | Schneider |
| 2,521,603 A | 9/1950 | Prew |
| 2,533,565 A | 12/1950 | Eichelman |
| 2,539,671 A | 1/1951 | Olson |
| 2,777,232 A | 1/1957 | Kulicke |
| 2,828,508 A | 4/1958 | Labarre |
| 2,840,181 A | 6/1958 | Wildman |
| 2,882,633 A | 4/1959 | Howell |
| 2,912,605 A | 11/1959 | Tibbetts |
| 2,938,113 A | 5/1960 | Schnell |
| 2,950,556 A | 8/1960 | Larios |
| 3,019,854 A | 2/1962 | Obryant |
| 3,132,713 A | 5/1964 | Seeler |
| 3,143,182 A | 8/1964 | Sears |
| 3,160,225 A | 12/1964 | Sechrist |
| 3,161,975 A | 12/1964 | McMillan |
| 3,205,601 A | 9/1965 | Gawne |
| 3,239,973 A | 3/1966 | Hannes |
| 3,240,883 A | 3/1966 | Seeler |
| 3,310,901 A | 3/1967 | Sarkisian |
| 3,321,170 A | 5/1967 | Vye |
| 3,509,290 A | 4/1970 | Mochida |
| 3,573,399 A | 4/1971 | Schroeder |
| 3,657,490 A | 4/1972 | Scheiber |
| 3,696,885 A | 10/1972 | Grieg |
| 3,755,625 A | 8/1973 | Maston |
| 3,828,508 A | 8/1974 | Moeller |
| 3,857,191 A | 12/1974 | Sadorus |
| 3,895,194 A | 7/1975 | Fraim |
| 3,906,431 A | 9/1975 | Clearwaters |
| D237,103 S | 10/1975 | Fisher |
| 3,936,606 A | 2/1976 | Wanke |
| 3,938,617 A | 2/1976 | Forbes |
| 3,941,638 A | 3/1976 | Horky |
| 3,992,584 A | 11/1976 | Dugan |
| 4,007,461 A | 2/1977 | Luedtke |
| 4,008,408 A | 2/1977 | Kodama |
| 4,029,170 A | 6/1977 | Phillips |
| 4,032,725 A | 6/1977 | McGee |
| 4,070,547 A | 1/1978 | Dellar |
| 4,072,821 A | 2/1978 | Bauer |
| 4,096,353 A | 6/1978 | Bauer |
| 4,127,156 A | 11/1978 | Brandt |
| 4,131,760 A | 12/1978 | Christensen |
| 4,169,219 A | 9/1979 | Beard |
| 4,184,048 A | 1/1980 | Alcaide |
| 4,198,705 A | 4/1980 | Massa |
| D255,234 S | 6/1980 | Wellward |
| D256,015 S | 7/1980 | Doherty |
| 4,212,133 A | 7/1980 | Lufkin |
| 4,237,339 A | 12/1980 | Bunting |
| 4,244,096 A | 1/1981 | Kashichi |
| 4,244,906 A | 1/1981 | Heinemann |
| 4,254,417 A | 3/1981 | Speiser |
| 4,275,694 A | 6/1981 | Nagaishi |
| 4,296,280 A | 10/1981 | Richie |
| 4,305,141 A | 12/1981 | Massa |
| 4,308,425 A | 12/1981 | Momose |
| 4,311,874 A | 1/1982 | Wallace, Jr. |
| 4,330,691 A | 5/1982 | Gordon |
| 4,334,740 A | 6/1982 | Wray |
| 4,365,449 A | 12/1982 | Liautaud |
| 4,373,191 A | 2/1983 | Fette |
| 4,393,631 A | 7/1983 | Krent |
| 4,414,433 A | 11/1983 | Horie |
| 4,429,850 A | 2/1984 | Weber |
| 4,436,966 A | 3/1984 | Botros |
| 4,449,238 A | 5/1984 | Lee |
| 4,466,117 A | 8/1984 | Rudolf |
| 4,485,484 A | 11/1984 | Flanagan |
| 4,489,442 A | 12/1984 | Anderson |
| 4,518,826 A | 5/1985 | Caudill |
| 4,521,908 A | 6/1985 | Miyaji |
| 4,566,557 A | 1/1986 | Lemaitre |
| 4,593,404 A | 6/1986 | Bolin |
| 4,594,478 A | 6/1986 | Gumb |
| D285,067 S | 8/1986 | Delbuck |
| 4,625,827 A | 12/1986 | Bartlett |
| 4,653,102 A | 3/1987 | Hansen |
| 4,658,425 A | 4/1987 | Julstrom |
| 4,669,108 A | 5/1987 | Deinzer |
| 4,675,906 A | 6/1987 | Sessler |
| 4,693,174 A | 9/1987 | Anderson |
| 4,696,043 A | 9/1987 | Iwahara |
| 4,712,231 A | 12/1987 | Julstrom |
| 4,741,038 A | 4/1988 | Elko |
| 4,752,961 A | 6/1988 | Kahn |
| 4,805,730 A | 2/1989 | O'Neill |
| 4,815,132 A | 3/1989 | Minami |
| 4,860,366 A | 8/1989 | Fukushi |
| 4,862,507 A | 8/1989 | Woodard |
| 4,866,868 A | 9/1989 | Kass |
| 4,881,135 A | 11/1989 | Heilweil |
| 4,888,807 A | 12/1989 | Reichel |
| 4,903,247 A | 2/1990 | Van Gerwen |
| 4,923,032 A | 5/1990 | Nuernberger |
| 4,928,312 A | 5/1990 | Hill |
| 4,969,197 A | 11/1990 | Takaya |
| 5,000,286 A | 3/1991 | Crawford |
| 5,038,935 A | 8/1991 | Wenkman |
| 5,058,170 A | 10/1991 | Kanamori |
| 5,088,574 A | 2/1992 | Kertesz, III |
| D324,780 S | 3/1992 | Sebesta |
| 5,121,426 A | 6/1992 | Baumhauer |
| D329,239 S | 9/1992 | Hahn |
| 5,189,701 A | 2/1993 | Jain |
| 5,204,907 A | 4/1993 | Staple |
| 5,214,709 A | 5/1993 | Ribic |
| D340,718 S | 10/1993 | Leger |
| 5,289,544 A | 2/1994 | Franklin |
| D345,346 S | 3/1994 | Alfonso |
| D345,379 S | 3/1994 | Chan |
| 5,297,210 A | 3/1994 | Julstrom |
| 5,322,979 A | 6/1994 | Cassity |
| 5,323,459 A | 6/1994 | Hirano |
| 5,329,593 A | 7/1994 | Lazzeroni |
| 5,335,011 A | 8/1994 | Addeo |
| 5,353,279 A | 10/1994 | Koyama |
| 5,359,374 A | 10/1994 | Schwartz |
| 5,371,789 A | 12/1994 | Hirano |
| 5,383,293 A | 1/1995 | Royal |
| 5,384,843 A | 1/1995 | Masuda |
| 5,396,554 A | 3/1995 | Hirano |
| 5,400,413 A | 3/1995 | Kindel |
| D363,045 S | 10/1995 | Phillips |
| 5,473,701 A | 12/1995 | Cezanne |
| 5,509,634 A | 4/1996 | Gebka |

(56) References Cited

U.S. PATENT DOCUMENTS

| | | |
|---|---|---|
| 5,513,265 A | 4/1996 | Hirano |
| 5,525,765 A | 6/1996 | Freiheit |
| 5,550,924 A | 8/1996 | Helf |
| 5,550,925 A | 8/1996 | Hori |
| 5,555,447 A | 9/1996 | Kotzin |
| 5,574,793 A | 11/1996 | Hirschhorn |
| 5,602,962 A | 2/1997 | Kellermann |
| 5,633,936 A | 5/1997 | Oh |
| 5,645,257 A | 7/1997 | Ward |
| D382,118 S | 8/1997 | Ferrero |
| 5,657,393 A | 8/1997 | Crow |
| 5,661,813 A | 8/1997 | Shimauchi |
| 5,673,327 A | 9/1997 | Julstrom |
| 5,687,229 A | 11/1997 | Sih |
| 5,706,344 A | 1/1998 | Finn |
| 5,715,319 A | 2/1998 | Chu |
| 5,717,171 A | 2/1998 | Miller |
| D392,977 S | 3/1998 | Kim |
| D394,061 S | 5/1998 | Fink |
| 5,761,318 A | 6/1998 | Shimauchi |
| 5,766,702 A | 6/1998 | Lin |
| 5,787,183 A | 7/1998 | Chu |
| 5,796,819 A | 8/1998 | Romesburg |
| 5,848,146 A | 12/1998 | Slattery |
| 5,870,482 A | 2/1999 | Loeppert |
| 5,878,147 A | 3/1999 | Killion |
| 5,888,412 A | 3/1999 | Sooriakumar |
| 5,888,439 A | 3/1999 | Miller |
| D416,315 S | 11/1999 | Nanjo |
| 5,978,211 A | 11/1999 | Hong |
| 5,991,277 A | 11/1999 | Maeng |
| 6,035,962 A | 3/2000 | Lin |
| 6,039,457 A | 3/2000 | O'Neal |
| 6,041,127 A | 3/2000 | Elko |
| 6,049,607 A | 4/2000 | Marash |
| D424,538 S | 5/2000 | Hayashi |
| 6,069,961 A | 5/2000 | Nakazawa |
| 6,125,179 A | 9/2000 | Wu |
| D432,518 S | 10/2000 | Muto |
| 6,128,395 A | 10/2000 | De Vries |
| 6,137,887 A | 10/2000 | Anderson |
| 6,144,746 A | 11/2000 | Azima |
| 6,151,399 A | 11/2000 | Killion |
| 6,173,059 B1 | 1/2001 | Huang |
| 6,198,831 B1 | 3/2001 | Azima |
| 6,205,224 B1 | 3/2001 | Underbrink |
| 6,215,881 B1 | 4/2001 | Azima |
| 6,266,427 B1 | 7/2001 | Mathur |
| 6,285,770 B1 | 9/2001 | Azima |
| 6,301,357 B1 | 10/2001 | Romesburg |
| 6,329,908 B1 | 12/2001 | Frecska |
| 6,332,029 B1 | 12/2001 | Azima |
| D453,016 S | 1/2002 | Nevill |
| 6,386,315 B1 | 5/2002 | Roy |
| 6,393,129 B1 | 5/2002 | Conrad |
| 6,424,635 B1 | 7/2002 | Song |
| 6,442,272 B1 | 8/2002 | Osovets |
| 6,449,593 B1 | 9/2002 | Valve |
| 6,481,173 B1 | 11/2002 | Roy |
| 6,488,367 B1 | 12/2002 | Debesis |
| D469,090 S | 1/2003 | Tsuji |
| 6,505,057 B1 | 1/2003 | Finn |
| 6,507,659 B1 | 1/2003 | Iredale |
| 6,510,919 B1 | 1/2003 | Roy |
| 6,526,147 B1 | 2/2003 | Rung |
| 6,556,682 B1 | 4/2003 | Gilloire |
| 6,592,237 B1 | 7/2003 | Pledger |
| 6,622,030 B1 | 9/2003 | Romesburg |
| D480,923 S | 10/2003 | Neubourg |
| 6,633,647 B1 | 10/2003 | Markow |
| 6,665,971 B2 | 12/2003 | Lowry |
| 6,694,028 B1 | 2/2004 | Matsuo |
| 6,704,422 B1 | 3/2004 | Jensen |
| D489,707 S | 5/2004 | Kobayashi |
| 6,731,334 B1 | 5/2004 | Maeng |
| 6,741,720 B1 | 5/2004 | Myatt |
| 6,757,393 B1 | 6/2004 | Spitzer |
| 6,768,795 B2 | 7/2004 | Feltstrom |
| 6,868,377 B1 | 3/2005 | Laroche |
| 6,885,750 B2 | 4/2005 | Egelmeers |
| 6,885,986 B1 | 4/2005 | Gigi |
| D504,889 S | 5/2005 | Andre |
| 6,889,183 B1 | 5/2005 | Gunduzhan |
| 6,895,093 B1 | 5/2005 | Ali |
| 6,931,123 B1 | 8/2005 | Hughes |
| 6,944,312 B2 | 9/2005 | Mason |
| D510,729 S | 10/2005 | Chen |
| 6,968,064 B1 | 11/2005 | Ning |
| 6,990,193 B2 | 1/2006 | Beaucoup |
| 6,993,126 B1 | 1/2006 | Kyrylenko |
| 6,993,145 B2 | 1/2006 | Combest |
| 7,003,099 B1 | 2/2006 | Zhang |
| 7,013,267 B1 | 3/2006 | Huart |
| 7,031,269 B2 | 4/2006 | Lee |
| 7,035,398 B2 | 4/2006 | Matsuo |
| 7,035,415 B2 | 4/2006 | Belt |
| 7,050,576 B2 | 5/2006 | Zhang |
| 7,054,451 B2 | 5/2006 | Janse |
| D526,643 S | 8/2006 | Ishizaki |
| D527,372 S | 8/2006 | Allen |
| 7,092,516 B2 | 8/2006 | Furuta |
| 7,092,882 B2 | 8/2006 | Arrowood |
| 7,098,865 B2 | 8/2006 | Christensen |
| 7,106,876 B2 | 9/2006 | Santiago |
| 7,120,269 B2 | 10/2006 | Lowell |
| 7,130,309 B2 | 10/2006 | Boaz |
| D533,177 S | 12/2006 | Andre |
| 7,149,320 B2 | 12/2006 | Haykin |
| 7,161,534 B2 | 1/2007 | Tsai |
| 7,187,765 B2 | 3/2007 | Popovic |
| 7,203,308 B2 | 4/2007 | Kubota |
| D542,543 S | 5/2007 | Bruce |
| 7,212,628 B2 | 5/2007 | Mirjana |
| D546,318 S | 7/2007 | Yoon |
| D546,814 S | 7/2007 | Takita |
| D547,748 S | 7/2007 | Tsuge |
| 7,239,714 B2 | 7/2007 | de Blok |
| D549,673 S | 8/2007 | Niitsu |
| 7,269,263 B2 | 9/2007 | Dedieu |
| D552,570 S | 10/2007 | Niitsu |
| D559,553 S | 1/2008 | James |
| 7,333,476 B2 | 2/2008 | LeBlanc |
| D566,685 S | 4/2008 | Koller |
| 7,359,504 B1 | 4/2008 | Reuss |
| 7,366,310 B2 | 4/2008 | Stinson |
| 7,387,151 B1 | 6/2008 | Payne |
| 7,412,376 B2 | 8/2008 | Florencio |
| 7,415,117 B2 | 8/2008 | Tashev |
| D578,509 S | 10/2008 | Thomas |
| D581,510 S | 11/2008 | Albano |
| D582,391 S | 12/2008 | Morimoto |
| D587,709 S | 3/2009 | Niitsu |
| D589,605 S | 3/2009 | Reedy |
| 7,503,616 B2 | 3/2009 | Linhard |
| 7,515,719 B2 | 4/2009 | Hooley |
| 7,536,769 B2 | 5/2009 | Pedersen |
| D595,402 S | 6/2009 | Miyake |
| D595,736 S | 7/2009 | Son |
| 7,558,381 B1 | 7/2009 | Ali |
| 7,565,949 B2 | 7/2009 | Tojo |
| D601,585 S | 10/2009 | Andre |
| 7,651,390 B1 | 1/2010 | Profeta |
| 7,660,428 B2 | 2/2010 | Rodman |
| 7,667,728 B2 | 2/2010 | Kenoyer |
| 7,672,445 B1 | 3/2010 | Zhang |
| D613,338 S | 4/2010 | Marukos |
| 7,701,110 B2 | 4/2010 | Fukuda |
| 7,702,116 B2 | 4/2010 | Stone |
| D614,871 S | 5/2010 | Tang |
| 7,724,891 B2 | 5/2010 | Beaucoup |
| D617,441 S | 6/2010 | Koury |
| 7,747,001 B2 | 6/2010 | Kellermann |
| 7,756,278 B2 | 7/2010 | Moorer |
| 7,783,063 B2 | 8/2010 | Pocino |

(56) References Cited

U.S. PATENT DOCUMENTS

| | | |
|---|---|---|
| 7,787,328 B2 | 8/2010 | Chu |
| 7,830,862 B2 | 11/2010 | James |
| 7,831,035 B2 | 11/2010 | Stokes |
| 7,831,036 B2 | 11/2010 | Beaucoup |
| 7,856,097 B2 | 12/2010 | Tokuda |
| 7,881,486 B1 | 2/2011 | Killion |
| 7,894,421 B2 | 2/2011 | Kwan |
| D636,188 S | 4/2011 | Kim |
| 7,925,006 B2 | 4/2011 | Hirai |
| 7,925,007 B2 | 4/2011 | Stokes |
| 7,936,886 B2 | 5/2011 | Kim |
| 7,970,123 B2 | 6/2011 | Beaucoup |
| 7,970,151 B2 | 6/2011 | Oxford |
| D642,385 S | 8/2011 | Lee |
| D643,015 S | 8/2011 | Kim |
| 7,991,167 B2 | 8/2011 | Oxford |
| 7,995,768 B2 | 8/2011 | Miki |
| 8,000,481 B2 | 8/2011 | Nishikawa |
| 8,005,238 B2 | 8/2011 | Tashev |
| 8,019,091 B2 | 9/2011 | Burnett |
| 8,041,054 B2 | 10/2011 | Yeldener |
| 8,059,843 B2 | 11/2011 | Hung |
| 8,064,629 B2 | 11/2011 | Jiang |
| 8,085,947 B2 | 12/2011 | Haulick |
| 8,085,949 B2 | 12/2011 | Kim |
| 8,095,120 B1 | 1/2012 | Blair |
| 8,098,842 B2 | 1/2012 | Florencio |
| 8,098,844 B2 | 1/2012 | Elko |
| 8,103,030 B2 | 1/2012 | Barthel |
| 8,109,360 B2 | 2/2012 | Stewart, Jr. |
| 8,112,272 B2 | 2/2012 | Nagahama |
| 8,116,500 B2 | 2/2012 | Oxford |
| 8,121,834 B2 | 2/2012 | Rosec |
| D655,271 S | 3/2012 | Park |
| D656,473 S | 3/2012 | Laube |
| 8,130,969 B2 | 3/2012 | Buck |
| 8,130,977 B2 | 3/2012 | Chu |
| 8,135,143 B2 | 3/2012 | Ishibashi |
| 8,144,886 B2 | 3/2012 | Ishibashi |
| D658,153 S | 4/2012 | Woo |
| 8,155,331 B2 | 4/2012 | Nakadai |
| 8,170,882 B2 | 5/2012 | Davis |
| 8,175,291 B2 | 5/2012 | Chan |
| 8,175,871 B2 | 5/2012 | Wang |
| 8,184,801 B1 | 5/2012 | Hamalainen |
| 8,189,765 B2 | 5/2012 | Nishikawa |
| 8,189,810 B2 | 5/2012 | Wolff |
| 8,194,863 B2 | 6/2012 | Takumai |
| 8,199,927 B1 | 6/2012 | Raftery |
| 8,204,198 B2 | 6/2012 | Adeney |
| 8,204,248 B2 | 6/2012 | Haulick |
| 8,208,664 B2 | 6/2012 | Iwasaki |
| 8,213,596 B2 | 7/2012 | Beaucoup |
| 8,213,634 B1 | 7/2012 | Daniel |
| 8,219,387 B2 | 7/2012 | Cutler |
| 8,229,134 B2 | 7/2012 | Duraiswami |
| 8,233,352 B2 | 7/2012 | Beaucoup |
| 8,243,951 B2 | 8/2012 | Ishibashi |
| 8,244,536 B2 | 8/2012 | Arun |
| 8,249,273 B2 | 8/2012 | Inoda |
| 8,259,959 B2 | 9/2012 | Marton |
| 8,275,120 B2 | 9/2012 | Stokes, III |
| 8,280,728 B2 | 10/2012 | Chen |
| 8,284,949 B2 | 10/2012 | Farhang |
| 8,284,952 B2 | 10/2012 | Reining |
| 8,286,749 B2 | 10/2012 | Stewart |
| 8,290,142 B1 | 10/2012 | Lambert |
| 8,291,670 B2 | 10/2012 | Gard |
| 8,297,402 B2 | 10/2012 | Stewart |
| 8,315,380 B2 | 11/2012 | Liu |
| 8,331,582 B2 | 12/2012 | Steele |
| 8,345,898 B2 | 1/2013 | Reining |
| 8,355,521 B2 | 1/2013 | Larson |
| 8,370,140 B2 | 2/2013 | Vitte |
| 8,379,823 B2 | 2/2013 | Ratmanski |
| 8,385,557 B2 | 2/2013 | Tashev |
| D678,329 S | 3/2013 | Lee |
| 8,395,653 B2 | 3/2013 | Feng |
| 8,403,107 B2 | 3/2013 | Stewart |
| 8,406,436 B2 | 3/2013 | Craven |
| 8,428,661 B2 | 4/2013 | Chen |
| 8,433,061 B2 | 4/2013 | Cutler |
| D682,266 S | 5/2013 | Wu |
| 8,437,490 B2 | 5/2013 | Marton |
| 8,443,930 B2 | 5/2013 | Stewart, Jr. |
| 8,447,590 B2 | 5/2013 | Ishibashi |
| 8,472,639 B2 | 6/2013 | Reining |
| 8,472,640 B2 | 6/2013 | Marton |
| D685,346 S | 7/2013 | Szymanski |
| D686,182 S | 7/2013 | Ashiwa |
| 8,479,871 B2 | 7/2013 | Stewart |
| 8,483,398 B2 | 7/2013 | Fozunbal |
| 8,498,423 B2 | 7/2013 | Thaden |
| D687,432 S | 8/2013 | Duan |
| 8,503,653 B2 | 8/2013 | Ahuja |
| 8,515,089 B2 | 8/2013 | Nicholson |
| 8,515,109 B2 | 8/2013 | Dittberner |
| 8,526,633 B2 | 9/2013 | Ukai |
| 8,553,904 B2 | 10/2013 | Said |
| 8,559,611 B2 | 10/2013 | Ratmanski |
| D693,328 S | 11/2013 | Goetzen |
| 8,583,481 B2 | 11/2013 | Viveiros |
| 8,599,194 B2 | 12/2013 | Lewis |
| 8,600,443 B2 | 12/2013 | Kawaguchi |
| 8,605,890 B2 | 12/2013 | Zhang |
| 8,620,650 B2 | 12/2013 | Walters |
| 8,631,897 B2 | 1/2014 | Stewart |
| 8,634,569 B2 | 1/2014 | Lu |
| 8,638,951 B2 | 1/2014 | Zurek |
| D699,712 S | 2/2014 | Bourne |
| 8,644,477 B2 | 2/2014 | Gilbert |
| 8,654,955 B1 | 2/2014 | Lambert |
| 8,654,990 B2 | 2/2014 | Faller |
| 8,660,274 B2 | 2/2014 | Wolff |
| 8,660,275 B2 | 2/2014 | Buck |
| 8,670,581 B2 | 3/2014 | Harman |
| 8,672,087 B2 | 3/2014 | Stewart |
| 8,675,890 B2 | 3/2014 | Schmidt |
| 8,675,899 B2 | 3/2014 | Jung |
| 8,676,728 B1 | 3/2014 | Velusamy |
| 8,682,675 B2 | 3/2014 | Togami |
| 8,724,829 B2 | 5/2014 | Visser |
| 8,730,156 B2 | 5/2014 | Weising |
| 8,744,069 B2 | 6/2014 | Cutler |
| 8,744,101 B1 | 6/2014 | Burns |
| 8,755,536 B2 | 6/2014 | Chen |
| 8,811,601 B2 | 8/2014 | Mohammad |
| 8,818,002 B2 | 8/2014 | Tashev |
| 8,824,693 B2 | 9/2014 | Åhgren |
| 8,842,851 B2 | 9/2014 | Beaucoup |
| 8,855,326 B2 | 10/2014 | Derkx |
| 8,855,327 B2 | 10/2014 | Tanaka |
| 8,861,713 B2 | 10/2014 | Xu |
| 8,861,756 B2 | 10/2014 | Zhu |
| 8,873,789 B2 | 10/2014 | Bigeh |
| D717,272 S | 11/2014 | Kim |
| 8,886,343 B2 | 11/2014 | Ishibashi |
| 8,893,849 B2 | 11/2014 | Hudson |
| 8,898,633 B2 | 11/2014 | Bryant |
| D718,731 S | 12/2014 | Lee |
| 8,903,106 B2 | 12/2014 | Meyer |
| 8,923,529 B2 | 12/2014 | McCowan |
| 8,929,564 B2 | 1/2015 | Kikkeri |
| 8,942,382 B2 | 1/2015 | Elko |
| 8,965,546 B2 | 2/2015 | Visser |
| D725,059 S | 3/2015 | Kim |
| D725,631 S | 3/2015 | McNamara |
| 8,976,977 B2 | 3/2015 | De |
| 8,983,089 B1 | 3/2015 | Chu |
| 8,983,834 B2 | 3/2015 | Davis |
| D726,144 S | 4/2015 | Kang |
| D727,968 S | 4/2015 | Onoue |
| 9,002,028 B2 | 4/2015 | Haulick |
| D729,767 S | 5/2015 | Lee |

(56) References Cited

U.S. PATENT DOCUMENTS

| | | |
|---|---|---|
| 9,038,301 B2 | 5/2015 | Zelbacher |
| 9,088,336 B2 | 7/2015 | Mani |
| 9,094,496 B2 | 7/2015 | Teutsch |
| D735,717 S | 8/2015 | Lam |
| D737,245 S | 8/2015 | Fan |
| 9,099,094 B2 | 8/2015 | Burnett |
| 9,107,001 B2 | 8/2015 | Diethorn |
| 9,111,543 B2 | 8/2015 | Åhgren |
| 9,113,242 B2 | 8/2015 | Hyun |
| 9,113,247 B2 | 8/2015 | Chatlani |
| 9,126,827 B2 | 9/2015 | Hsieh |
| 9,129,223 B1 | 9/2015 | Velusamy |
| 9,140,054 B2 | 9/2015 | Oberbroeckling |
| D740,279 S | 10/2015 | Wu |
| 9,172,345 B2 | 10/2015 | Kok |
| D743,376 S | 11/2015 | Kim |
| D743,939 S | 11/2015 | Seong |
| 9,196,261 B2 | 11/2015 | Burnett |
| 9,197,974 B1 | 11/2015 | Clark |
| 9,203,494 B2 | 12/2015 | Tarighat Mehrabani |
| 9,215,327 B2 | 12/2015 | Bathurst |
| 9,215,543 B2 | 12/2015 | Sun |
| 9,226,062 B2 | 12/2015 | Sun |
| 9,226,070 B2 | 12/2015 | Hyun |
| 9,226,088 B2 | 12/2015 | Pandey |
| 9,232,185 B2 | 1/2016 | Graham |
| 9,237,391 B2 | 1/2016 | Benesty |
| 9,247,367 B2 | 1/2016 | Nobile |
| 9,253,567 B2 | 2/2016 | Morcelli |
| 9,257,132 B2 | 2/2016 | Gowreesunker |
| 9,264,553 B2 | 2/2016 | Pandey |
| 9,264,805 B2 | 2/2016 | Buck |
| 9,280,985 B2 | 3/2016 | Tawada |
| 9,286,908 B2 | 3/2016 | Zhang |
| 9,294,839 B2 | 3/2016 | Lambert |
| 9,301,049 B2 | 3/2016 | Elko |
| D754,103 S | 4/2016 | Fischer |
| 9,307,326 B2 | 4/2016 | Elko |
| 9,319,532 B2 | 4/2016 | Bao |
| 9,319,799 B2 | 4/2016 | Salmon |
| 9,326,060 B2 | 4/2016 | Nicholson |
| D756,502 S | 5/2016 | Lee |
| 9,330,673 B2 | 5/2016 | Cho |
| 9,338,301 B2 | 5/2016 | Pocino |
| 9,338,549 B2 | 5/2016 | Haulick |
| 9,354,310 B2 | 5/2016 | Visser |
| 9,357,080 B2 | 5/2016 | Beaucoup |
| 9,403,670 B2 | 8/2016 | Schelling |
| 9,426,598 B2 | 8/2016 | Walsh |
| D767,748 S | 9/2016 | Nakai |
| 9,451,078 B2 | 9/2016 | Yang |
| D769,239 S | 10/2016 | Li |
| 9,462,378 B2 | 10/2016 | Kuech |
| 9,473,868 B2 | 10/2016 | Huang |
| 9,479,627 B1 | 10/2016 | Rung |
| 9,479,885 B1 | 10/2016 | Ivanov |
| 9,489,948 B1 | 11/2016 | Chu |
| 9,510,090 B2 | 11/2016 | Lissek |
| 9,514,723 B2 | 12/2016 | Silfvast |
| 9,516,412 B2 | 12/2016 | Shigenaga |
| 9,521,057 B2 | 12/2016 | Klingbeil |
| 9,549,245 B2 | 1/2017 | Frater |
| 9,560,446 B1 | 1/2017 | Chang |
| 9,560,451 B2 | 1/2017 | Eichfeld |
| 9,565,493 B2 | 2/2017 | Abraham |
| 9,578,413 B2 | 2/2017 | Sawa |
| 9,578,440 B2 | 2/2017 | Otto |
| 9,589,556 B2 | 3/2017 | Gao |
| 9,591,123 B2 | 3/2017 | Sorensen |
| 9,591,404 B1 | 3/2017 | Chhetri |
| D784,299 S | 4/2017 | Cho |
| 9,615,173 B2 | 4/2017 | Sako |
| 9,628,596 B1 | 4/2017 | Bullough |
| 9,635,186 B2 | 4/2017 | Pandey |
| 9,635,474 B2 | 4/2017 | Kuster |
| D787,481 S | 5/2017 | Tyss |
| D788,073 S | 5/2017 | Silvera |
| 9,640,187 B2 | 5/2017 | Niemisto |
| 9,641,688 B2 | 5/2017 | Pandey |
| 9,641,929 B2 | 5/2017 | Li |
| 9,641,935 B1 | 5/2017 | Ivanov |
| 9,653,091 B2 | 5/2017 | Matsuo |
| 9,653,092 B2 | 5/2017 | Sun |
| 9,655,001 B2 | 5/2017 | Metzger |
| 9,659,576 B1 | 5/2017 | Kotvis |
| D789,323 S | 6/2017 | Mackiewicz |
| 9,674,604 B2 | 6/2017 | Deroo |
| 9,692,882 B2 | 6/2017 | Mani |
| 9,706,057 B2 | 7/2017 | Mani |
| 9,716,944 B2 | 7/2017 | Yliaho |
| 9,721,582 B1 | 8/2017 | Huang |
| 9,734,835 B2 | 8/2017 | Fujieda |
| 9,754,572 B2 | 9/2017 | Salazar |
| 9,761,243 B2 | 9/2017 | Taenzer |
| D801,285 S | 10/2017 | Timmins |
| 9,788,119 B2 | 10/2017 | Vilermo |
| 9,813,806 B2 | 11/2017 | Graham |
| 9,818,426 B2 | 11/2017 | Kotera |
| 9,826,211 B2 | 11/2017 | Sawa |
| 9,854,101 B2 | 12/2017 | Pandey |
| 9,854,363 B2 | 12/2017 | Sladeczek |
| 9,860,439 B2 | 1/2018 | Sawa |
| 9,866,952 B2 | 1/2018 | Pandey |
| D811,393 S | 2/2018 | Ahn |
| 9,894,434 B2 | 2/2018 | Rollow, IV |
| 9,930,448 B1 | 3/2018 | Chen |
| 9,936,290 B2 | 4/2018 | Mohammad |
| 9,966,059 B1 | 5/2018 | Ayrapetian |
| 9,973,848 B2 | 5/2018 | Chhetri |
| 9,980,042 B1 | 5/2018 | Benattar |
| D819,607 S | 6/2018 | Chui |
| D819,631 S | 6/2018 | Matsumiya |
| 10,015,589 B1 | 7/2018 | Ebenezer |
| 10,021,506 B2 | 7/2018 | Johnson |
| 10,021,515 B1 | 7/2018 | Mallya |
| 10,034,116 B2 | 7/2018 | Kadri |
| 10,054,320 B2 | 8/2018 | Choi |
| 10,061,009 B1 | 8/2018 | Family |
| 10,062,379 B2 | 8/2018 | Katuri |
| 10,153,744 B1 | 12/2018 | Every |
| 10,165,386 B2 | 12/2018 | Lehtiniemi |
| D841,589 S | 2/2019 | Böhmer |
| 10,206,030 B2 | 2/2019 | Matsumoto |
| 10,210,882 B1 | 2/2019 | McCowan |
| 10,231,062 B2 | 3/2019 | Pedersen |
| 10,244,121 B2 | 3/2019 | Mani |
| 10,244,219 B2 | 3/2019 | Sawa |
| 10,269,343 B2 | 4/2019 | Wingate |
| 10,366,702 B2 | 7/2019 | Morton |
| 10,367,948 B2 | 7/2019 | Wells-Rutherford |
| D857,873 S | 8/2019 | Shimada |
| 10,389,861 B2 | 8/2019 | Mani |
| 10,389,885 B2 | 8/2019 | Sun |
| D860,319 S | 9/2019 | Beruto |
| D860,997 S | 9/2019 | Jhun |
| D864,136 S | 10/2019 | Kim |
| 10,440,469 B2 | 10/2019 | Barnett |
| D865,723 S | 11/2019 | Cho |
| 10,566,008 B2 | 2/2020 | Thorpe |
| 10,602,267 B2 | 3/2020 | Grosche |
| D883,952 S | 5/2020 | Lucas |
| 10,650,797 B2 | 5/2020 | Kumar |
| D888,020 S | 6/2020 | Lyu |
| 10,728,653 B2 | 7/2020 | Graham |
| D900,070 S | 10/2020 | Lantz |
| D900,071 S | 10/2020 | Lantz |
| D900,072 S | 10/2020 | Lantz |
| D900,073 S | 10/2020 | Lantz |
| D900,074 S | 10/2020 | Lantz |
| 10,827,263 B2 | 11/2020 | Christoph |
| 10,863,270 B1 | 12/2020 | O'Neill |
| 10,930,297 B2 | 2/2021 | Christoph |
| 10,959,018 B1 | 3/2021 | Shi |
| 10,979,805 B2 | 4/2021 | Chowdhary |

(56) References Cited

U.S. PATENT DOCUMENTS

| | | |
|---|---|---|
| D924,189 S | 7/2021 | Park |
| 11,109,133 B2 | 8/2021 | Lantz |
| D940,116 S | 1/2022 | Cho |
| 2001/0031058 A1 | 10/2001 | Anderson |
| 2002/0015500 A1 | 2/2002 | Belt |
| 2002/0041679 A1 | 4/2002 | Beaucoup |
| 2002/0048377 A1 | 4/2002 | Vaudrey |
| 2002/0064158 A1 | 5/2002 | Yokoyama |
| 2002/0064287 A1 | 5/2002 | Kawamura |
| 2002/0069054 A1 | 6/2002 | Arrowood |
| 2002/0110255 A1 | 8/2002 | Killion |
| 2002/0126861 A1 | 9/2002 | Colby |
| 2002/0131580 A1 | 9/2002 | Smith |
| 2002/0140633 A1 | 10/2002 | Rafii |
| 2002/0146282 A1 | 10/2002 | Wilkes |
| 2002/0149070 A1 | 10/2002 | Sheplak |
| 2002/0159603 A1 | 10/2002 | Hirai |
| 2003/0026437 A1 | 2/2003 | Janse |
| 2003/0053639 A1 | 3/2003 | Beaucoup |
| 2003/0059061 A1 | 3/2003 | Tsuji |
| 2003/0063762 A1 | 4/2003 | Tajima |
| 2003/0063768 A1 | 4/2003 | Cornelius |
| 2003/0072461 A1 | 4/2003 | Moorer |
| 2003/0107478 A1 | 6/2003 | Hendricks |
| 2003/0118200 A1 | 6/2003 | Beaucoup |
| 2003/0122777 A1 | 7/2003 | Grover |
| 2003/0138119 A1 | 7/2003 | Pocino |
| 2003/0156725 A1 | 8/2003 | Boone |
| 2003/0161485 A1 | 8/2003 | Smith |
| 2003/0163326 A1 | 8/2003 | Maase |
| 2003/0169888 A1 | 9/2003 | Subotic |
| 2003/0185404 A1 | 10/2003 | Milsap |
| 2003/0198339 A1 | 10/2003 | Roy |
| 2003/0198359 A1 | 10/2003 | Killion |
| 2003/0202107 A1 | 10/2003 | Slattery |
| 2004/0013038 A1 | 1/2004 | Kajala |
| 2004/0013252 A1 | 1/2004 | Craner |
| 2004/0076305 A1 | 4/2004 | Santiago |
| 2004/0105557 A1 | 6/2004 | Matsuo |
| 2004/0125942 A1 | 7/2004 | Beaucoup |
| 2004/0175006 A1 | 9/2004 | Kim |
| 2004/0202345 A1 | 10/2004 | Stenberg |
| 2004/0240664 A1 | 12/2004 | Freed |
| 2005/0005494 A1 | 1/2005 | Way |
| 2005/0041530 A1 | 2/2005 | Goudie |
| 2005/0069156 A1 | 3/2005 | Haapapuro |
| 2005/0094580 A1 | 5/2005 | Kumar |
| 2005/0094795 A1 | 5/2005 | Rambo |
| 2005/0149320 A1 | 7/2005 | Kajala |
| 2005/0157897 A1 | 7/2005 | Saltykov |
| 2005/0175189 A1 | 8/2005 | Lee |
| 2005/0175190 A1 | 8/2005 | Tashev |
| 2005/0213747 A1 | 9/2005 | Popovich |
| 2005/0221867 A1 | 10/2005 | Zurek |
| 2005/0238196 A1 | 10/2005 | Furuno |
| 2005/0270906 A1 | 12/2005 | Ramenzoni |
| 2005/0271221 A1 | 12/2005 | Cerwin |
| 2005/0286698 A1 | 12/2005 | Bathurst |
| 2005/0286729 A1 | 12/2005 | Harwood |
| 2006/0083390 A1 | 4/2006 | Kaderavek |
| 2006/0088173 A1 | 4/2006 | Rodman |
| 2006/0093128 A1 | 5/2006 | Oxford |
| 2006/0098403 A1 | 5/2006 | Smith |
| 2006/0104458 A1 | 5/2006 | Kenoyer |
| 2006/0109983 A1 | 5/2006 | Young |
| 2006/0151256 A1 | 7/2006 | Lee |
| 2006/0159293 A1 | 7/2006 | Azima |
| 2006/0161430 A1 | 7/2006 | Schweng |
| 2006/0165242 A1 | 7/2006 | Miki |
| 2006/0192976 A1 | 8/2006 | Hall |
| 2006/0198541 A1 | 9/2006 | Henry |
| 2006/0204022 A1 | 9/2006 | Hooley |
| 2006/0215866 A1 | 9/2006 | Francisco |
| 2006/0222187 A1 | 10/2006 | Jarrett |
| 2006/0233353 A1 | 10/2006 | Beaucoup |
| 2006/0239471 A1 | 10/2006 | Mao |
| 2006/0262942 A1 | 11/2006 | Oxford |
| 2006/0269080 A1 | 11/2006 | Oxford |
| 2006/0269086 A1 | 11/2006 | Page |
| 2007/0006474 A1 | 1/2007 | Taniguchi |
| 2007/0009116 A1 | 1/2007 | Reining |
| 2007/0019828 A1 | 1/2007 | Hughes |
| 2007/0053524 A1 | 3/2007 | Haulick |
| 2007/0093714 A1 | 4/2007 | Beaucoup |
| 2007/0116255 A1 | 5/2007 | Derkx |
| 2007/0120029 A1 | 5/2007 | Keung |
| 2007/0165871 A1 | 7/2007 | Roovers |
| 2007/0230712 A1 | 10/2007 | Belt |
| 2007/0253561 A1 | 11/2007 | Williams |
| 2007/0269066 A1 | 11/2007 | Derleth |
| 2008/0008339 A1 | 1/2008 | Ryan |
| 2008/0033723 A1 | 2/2008 | Jang |
| 2008/0046235 A1 | 2/2008 | Chen |
| 2008/0056517 A1 | 3/2008 | Algazi |
| 2008/0101622 A1 | 5/2008 | Sugiyama |
| 2008/0130907 A1 | 6/2008 | Sudo |
| 2008/0144848 A1 | 6/2008 | Buck |
| 2008/0168283 A1 | 7/2008 | Penning |
| 2008/0188965 A1 | 8/2008 | Bruey |
| 2008/0212805 A1 | 9/2008 | Fincham |
| 2008/0232607 A1 | 9/2008 | Tashev |
| 2008/0247567 A1 | 10/2008 | Kjolerbakken |
| 2008/0253553 A1 | 10/2008 | Li |
| 2008/0253589 A1 | 10/2008 | Trahms |
| 2008/0259731 A1 | 10/2008 | Happonen |
| 2008/0260175 A1 | 10/2008 | Elko |
| 2008/0279400 A1 | 11/2008 | Knoll |
| 2008/0285772 A1 | 11/2008 | Haulick |
| 2009/0003586 A1 | 1/2009 | Lai |
| 2009/0030536 A1 | 1/2009 | Gur |
| 2009/0052684 A1 | 2/2009 | Ishibashi |
| 2009/0086998 A1 | 4/2009 | Jeong |
| 2009/0087000 A1 | 4/2009 | Ko |
| 2009/0087001 A1 | 4/2009 | Jiang |
| 2009/0094817 A1 | 4/2009 | Killion |
| 2009/0129609 A1 | 5/2009 | Oh |
| 2009/0147967 A1 | 6/2009 | Ishibashi |
| 2009/0150149 A1 | 6/2009 | Cutter |
| 2009/0161880 A1 | 6/2009 | Hooley |
| 2009/0169027 A1 | 7/2009 | Ura |
| 2009/0173030 A1 | 7/2009 | Gulbrandsen |
| 2009/0173570 A1 | 7/2009 | Levit |
| 2009/0226004 A1 | 9/2009 | Soerensen |
| 2009/0233545 A1 | 9/2009 | Sutskover |
| 2009/0237561 A1 | 9/2009 | Kobayashi |
| 2009/0254340 A1 | 10/2009 | Sun |
| 2009/0274318 A1 | 11/2009 | Ishibashi |
| 2009/0310794 A1 | 12/2009 | Ishibashi |
| 2010/0011644 A1 | 1/2010 | Kramer |
| 2010/0034397 A1 | 2/2010 | Nakadai |
| 2010/0074433 A1 | 3/2010 | Zhang |
| 2010/0111323 A1 | 5/2010 | Marton |
| 2010/0111324 A1 | 5/2010 | Yeldener |
| 2010/0119097 A1 | 5/2010 | Ohtsuka |
| 2010/0123785 A1 | 5/2010 | Chen |
| 2010/0128892 A1 | 5/2010 | Chen |
| 2010/0128901 A1 | 5/2010 | Herman |
| 2010/0131749 A1 | 5/2010 | Kim |
| 2010/0142721 A1 | 6/2010 | Wada |
| 2010/0150364 A1 | 6/2010 | Buck |
| 2010/0158268 A1 | 6/2010 | Marton |
| 2010/0165071 A1 | 7/2010 | Ishibashi |
| 2010/0166219 A1 | 7/2010 | Marton |
| 2010/0189275 A1 | 7/2010 | Christoph |
| 2010/0189299 A1 | 7/2010 | Grant |
| 2010/0202628 A1 | 8/2010 | Meyer |
| 2010/0208605 A1 | 8/2010 | Wang |
| 2010/0215184 A1 | 8/2010 | Buck |
| 2010/0215189 A1 | 8/2010 | Marton |
| 2010/0217590 A1 | 8/2010 | Nemer |
| 2010/0245624 A1 | 9/2010 | Beaucoup |
| 2010/0246873 A1 | 9/2010 | Chen |
| 2010/0284185 A1 | 11/2010 | Ngai |
| 2010/0305728 A1 | 12/2010 | Aiso |

(56) References Cited

U.S. PATENT DOCUMENTS

| | | |
|---|---|---|
| 2010/0314513 A1 | 12/2010 | Evans |
| 2011/0002469 A1 | 1/2011 | Ojala |
| 2011/0007921 A1 | 1/2011 | Stewart |
| 2011/0033063 A1 | 2/2011 | McGrath |
| 2011/0038229 A1 | 2/2011 | Beaucoup |
| 2011/0096136 A1 | 4/2011 | Liu |
| 2011/0096631 A1 | 4/2011 | Kondo |
| 2011/0096915 A1 | 4/2011 | Nemer |
| 2011/0164761 A1 | 7/2011 | McCowan |
| 2011/0194719 A1 | 8/2011 | Frater |
| 2011/0211706 A1 | 9/2011 | Tanaka |
| 2011/0235821 A1 | 9/2011 | Okita |
| 2011/0268287 A1 | 11/2011 | Ishibashi |
| 2011/0311064 A1 | 12/2011 | Teutsch |
| 2011/0311085 A1 | 12/2011 | Stewart |
| 2011/0317862 A1 | 12/2011 | Hosoe |
| 2012/0002835 A1 | 1/2012 | Stewart |
| 2012/0014049 A1 | 1/2012 | Ogle |
| 2012/0027227 A1 | 2/2012 | Kok |
| 2012/0076316 A1 | 3/2012 | Zhu |
| 2012/0080260 A1 | 4/2012 | Stewart |
| 2012/0093344 A1 | 4/2012 | Sun |
| 2012/0117474 A1 | 5/2012 | Miki |
| 2012/0128160 A1 | 5/2012 | Kim |
| 2012/0128175 A1 | 5/2012 | Visser |
| 2012/0155688 A1 | 6/2012 | Wilson |
| 2012/0155703 A1 | 6/2012 | Hernandez-Abrego |
| 2012/0163625 A1 | 6/2012 | Siotis |
| 2012/0169826 A1 | 7/2012 | Jeong |
| 2012/0177219 A1 | 7/2012 | Mullen |
| 2012/0182429 A1 | 7/2012 | Forutanpour |
| 2012/0207335 A1 | 8/2012 | Spaanderman |
| 2012/0224709 A1 | 9/2012 | Keddem |
| 2012/0243698 A1 | 9/2012 | Elko |
| 2012/0262536 A1 | 10/2012 | Chen |
| 2012/0288079 A1 | 11/2012 | Burnett |
| 2012/0288114 A1 | 11/2012 | Duraiswami |
| 2012/0294472 A1 | 11/2012 | Hudson |
| 2012/0327115 A1 | 12/2012 | Chhetri |
| 2012/0328142 A1 | 12/2012 | Horibe |
| 2013/0002797 A1 | 1/2013 | Thapa |
| 2013/0004013 A1 | 1/2013 | Stewart |
| 2013/0015014 A1 | 1/2013 | Stewart |
| 2013/0016847 A1 | 1/2013 | Steiner |
| 2013/0028451 A1 | 1/2013 | De Roo |
| 2013/0029684 A1 | 1/2013 | Kawaguchi |
| 2013/0034241 A1 | 2/2013 | Pandey |
| 2013/0039504 A1 | 2/2013 | Pandey |
| 2013/0083911 A1 | 4/2013 | Bathurst |
| 2013/0094653 A1* | 4/2013 | Bathurst ............... H04M 3/568 704/201 |
| 2013/0094689 A1 | 4/2013 | Tanaka |
| 2013/0101141 A1 | 4/2013 | McElveen |
| 2013/0136274 A1 | 5/2013 | Åhgren |
| 2013/0142343 A1 | 6/2013 | Matsui |
| 2013/0147835 A1 | 6/2013 | Lee |
| 2013/0156198 A1 | 6/2013 | Kim |
| 2013/0182190 A1 | 7/2013 | McCartney |
| 2013/0206501 A1 | 8/2013 | Yu |
| 2013/0216066 A1 | 8/2013 | Yerrace |
| 2013/0226593 A1 | 8/2013 | Magnusson |
| 2013/0251181 A1 | 9/2013 | Stewart |
| 2013/0264144 A1 | 10/2013 | Hudson |
| 2013/0271559 A1 | 10/2013 | Feng |
| 2013/0294616 A1 | 11/2013 | Mulder |
| 2013/0297302 A1 | 11/2013 | Pan |
| 2013/0304476 A1 | 11/2013 | Kim |
| 2013/0304479 A1 | 11/2013 | Teller |
| 2013/0329908 A1 | 12/2013 | Lindahl |
| 2013/0332156 A1 | 12/2013 | Tackin |
| 2013/0336516 A1 | 12/2013 | Stewart |
| 2013/0343549 A1 | 12/2013 | Vemireddy |
| 2014/0003635 A1 | 1/2014 | Mohammad |
| 2014/0010383 A1 | 1/2014 | Mackey |
| 2014/0016794 A1 | 1/2014 | Lu |
| 2014/0029761 A1 | 1/2014 | Maenpaa |
| 2014/0037097 A1 | 2/2014 | Mark |
| 2014/0050332 A1 | 2/2014 | Nielsen |
| 2014/0072151 A1 | 3/2014 | Ochs |
| 2014/0098233 A1 | 4/2014 | Martin |
| 2014/0098964 A1 | 4/2014 | Rosca |
| 2014/0122060 A1 | 5/2014 | Kaszczuk |
| 2014/0177857 A1 | 6/2014 | Kuster |
| 2014/0233777 A1 | 8/2014 | Tseng |
| 2014/0233778 A1 | 8/2014 | Hardiman |
| 2014/0264654 A1 | 9/2014 | Salmon |
| 2014/0265774 A1 | 9/2014 | Stewart |
| 2014/0270271 A1 | 9/2014 | Dehe |
| 2014/0286518 A1 | 9/2014 | Stewart |
| 2014/0295768 A1 | 10/2014 | Wu |
| 2014/0301586 A1 | 10/2014 | Stewart |
| 2014/0307882 A1 | 10/2014 | Leblanc |
| 2014/0314251 A1 | 10/2014 | Rosca |
| 2014/0341392 A1 | 11/2014 | Lambert |
| 2014/0357177 A1 | 12/2014 | Stewart |
| 2014/0363008 A1 | 12/2014 | Chen |
| 2015/0003638 A1 | 1/2015 | Kasai |
| 2015/0025878 A1 | 1/2015 | Gowreesunker |
| 2015/0030172 A1 | 1/2015 | Gaensler |
| 2015/0033042 A1 | 1/2015 | Iwamoto |
| 2015/0050967 A1 | 2/2015 | Bao |
| 2015/0055796 A1 | 2/2015 | Nugent |
| 2015/0055797 A1 | 2/2015 | Nguyen |
| 2015/0063579 A1 | 3/2015 | Bao |
| 2015/0070188 A1 | 3/2015 | Aramburu |
| 2015/0078581 A1 | 3/2015 | Etter |
| 2015/0078582 A1 | 3/2015 | Graham |
| 2015/0097719 A1 | 4/2015 | Balachandreswaran |
| 2015/0104023 A1 | 4/2015 | Bilobrov |
| 2015/0117672 A1 | 4/2015 | Christoph |
| 2015/0118960 A1 | 4/2015 | Petit |
| 2015/0126255 A1 | 5/2015 | Yang |
| 2015/0156578 A1 | 6/2015 | Alexandridis |
| 2015/0163577 A1 | 6/2015 | Benesty |
| 2015/0185825 A1 | 7/2015 | Mullins |
| 2015/0189423 A1 | 7/2015 | Giannuzzi |
| 2015/0208171 A1 | 7/2015 | Funakoshi |
| 2015/0237424 A1 | 8/2015 | Wilker |
| 2015/0281832 A1 | 10/2015 | Kishimoto |
| 2015/0281833 A1 | 10/2015 | Shigenaga |
| 2015/0281834 A1 | 10/2015 | Takano |
| 2015/0312662 A1 | 10/2015 | Kishimoto |
| 2015/0312691 A1 | 10/2015 | Virolainen |
| 2015/0326968 A1 | 11/2015 | Shigenaga |
| 2015/0341734 A1 | 11/2015 | Sherman |
| 2015/0350621 A1 | 12/2015 | Sawa |
| 2015/0358734 A1 | 12/2015 | Butler |
| 2016/0011851 A1 | 1/2016 | Zhang |
| 2016/0021478 A1 | 1/2016 | Katagiri |
| 2016/0029120 A1 | 1/2016 | Nesta |
| 2016/0031700 A1 | 2/2016 | Sparks |
| 2016/0037277 A1 | 2/2016 | Matsumoto |
| 2016/0055859 A1 | 2/2016 | Finlow-Bates |
| 2016/0080867 A1 | 3/2016 | Nugent |
| 2016/0088392 A1 | 3/2016 | Huttunen |
| 2016/0100092 A1 | 4/2016 | Bohac |
| 2016/0105473 A1 | 4/2016 | Klingbeil |
| 2016/0111109 A1 | 4/2016 | Tsujikawa |
| 2016/0127527 A1 | 5/2016 | Mani |
| 2016/0134928 A1 | 5/2016 | Ogle |
| 2016/0142548 A1 | 5/2016 | Pandey |
| 2016/0142814 A1 | 5/2016 | Deroo |
| 2016/0142815 A1 | 5/2016 | Norris |
| 2016/0148057 A1 | 5/2016 | Oh |
| 2016/0150315 A1 | 5/2016 | Tzirkel-Hancock |
| 2016/0150316 A1 | 5/2016 | Kubota |
| 2016/0155455 A1 | 6/2016 | Ojanperä |
| 2016/0165340 A1 | 6/2016 | Benattar |
| 2016/0173976 A1 | 6/2016 | Podhradsky |
| 2016/0173978 A1 | 6/2016 | Li |
| 2016/0189727 A1 | 6/2016 | Wu |
| 2016/0192068 A1 | 6/2016 | Ng |
| 2016/0196836 A1 | 7/2016 | Yu |
| 2016/0234593 A1 | 8/2016 | Matsumoto |

(56) References Cited

U.S. PATENT DOCUMENTS

| | | | |
|---|---|---|---|
| 2016/0249132 A1 | 8/2016 | Oliaei | |
| 2016/0275961 A1 | 9/2016 | Yu | |
| 2016/0295279 A1 | 10/2016 | Srinivasan | |
| 2016/0300584 A1 | 10/2016 | Pandey | |
| 2016/0302002 A1 | 10/2016 | Lambert | |
| 2016/0302006 A1 | 10/2016 | Pandey | |
| 2016/0323667 A1 | 11/2016 | Shumard | |
| 2016/0323668 A1 | 11/2016 | Abraham | |
| 2016/0330545 A1 | 11/2016 | McElveen | |
| 2016/0337523 A1 | 11/2016 | Pandey | |
| 2016/0353200 A1 | 12/2016 | Bigeh | |
| 2016/0357508 A1 | 12/2016 | Moore | |
| 2016/0373899 A1* | 12/2016 | Celinski | H04B 1/3833 |
| 2017/0019744 A1 | 1/2017 | Matsumoto | |
| 2017/0064451 A1 | 3/2017 | Park | |
| 2017/0105066 A1 | 4/2017 | McLaughlin | |
| 2017/0134849 A1 | 5/2017 | Pandey | |
| 2017/0134850 A1 | 5/2017 | Graham | |
| 2017/0164101 A1 | 6/2017 | Rollow, IV | |
| 2017/0164110 A1* | 6/2017 | Hansson | H04R 3/005 |
| 2017/0180861 A1 | 6/2017 | Chen | |
| 2017/0206064 A1 | 7/2017 | Breazeal | |
| 2017/0230748 A1 | 8/2017 | Shumard | |
| 2017/0264999 A1 | 9/2017 | Fukuda | |
| 2017/0303887 A1 | 10/2017 | Richmond | |
| 2017/0308352 A1 | 10/2017 | Kessler | |
| 2017/0374454 A1 | 12/2017 | Bernardini | |
| 2018/0083848 A1 | 3/2018 | Siddiqi | |
| 2018/0102136 A1 | 4/2018 | Ebenezer | |
| 2018/0109873 A1 | 4/2018 | Xiang | |
| 2018/0115799 A1 | 4/2018 | Thiele | |
| 2018/0160224 A1 | 6/2018 | Graham | |
| 2018/0196585 A1 | 7/2018 | Densham | |
| 2018/0219922 A1 | 8/2018 | Bryans | |
| 2018/0227666 A1 | 8/2018 | Barnett | |
| 2018/0292079 A1 | 10/2018 | Branham | |
| 2018/0310096 A1 | 10/2018 | Shumard | |
| 2018/0313558 A1 | 11/2018 | Byers | |
| 2018/0338205 A1 | 11/2018 | Abraham | |
| 2018/0359565 A1 | 12/2018 | Kim | |
| 2019/0042187 A1 | 2/2019 | Truong | |
| 2019/0166424 A1 | 5/2019 | Harney | |
| 2019/0215540 A1 | 7/2019 | Nicol | |
| 2019/0230436 A1 | 7/2019 | Tsingos | |
| 2019/0259408 A1 | 8/2019 | Freeman | |
| 2019/0268683 A1 | 8/2019 | Miyahara | |
| 2019/0295540 A1 | 9/2019 | Grima | |
| 2019/0295569 A1 | 9/2019 | Wang | |
| 2019/0319677 A1 | 10/2019 | Hansen | |
| 2019/0371354 A1 | 12/2019 | Lester | |
| 2019/0373362 A1 | 12/2019 | Ansai | |
| 2019/0385629 A1 | 12/2019 | Moravy | |
| 2019/0387311 A1 | 12/2019 | Schultz | |
| 2020/0015021 A1 | 1/2020 | Leppanen | |
| 2020/0021910 A1 | 1/2020 | Rollow, IV | |
| 2020/0037068 A1 | 1/2020 | Barnett | |
| 2020/0068297 A1 | 2/2020 | Rollow, IV | |
| 2020/0100009 A1 | 3/2020 | Lantz | |
| 2020/0100025 A1 | 3/2020 | Shumard | |
| 2020/0137485 A1 | 4/2020 | Yamakawa | |
| 2020/0145753 A1 | 5/2020 | Rollow, IV | |
| 2020/0152218 A1 | 5/2020 | Kikuhara | |
| 2020/0162618 A1 | 5/2020 | Enteshari | |
| 2020/0228663 A1 | 7/2020 | Wells-Rutherford | |
| 2020/0251119 A1 | 8/2020 | Yang | |
| 2020/0275204 A1 | 8/2020 | Labosco | |
| 2020/0278043 A1 | 9/2020 | Cao | |
| 2020/0288237 A1 | 9/2020 | Abraham | |
| 2021/0012789 A1 | 1/2021 | Husain | |
| 2021/0021940 A1 | 1/2021 | Petersen | |
| 2021/0044881 A1 | 2/2021 | Lantz | |
| 2021/0051397 A1 | 2/2021 | Veselinovic | |
| 2021/0098014 A1 | 4/2021 | Tanaka | |
| 2021/0098015 A1 | 4/2021 | Pandey | |
| 2021/0120335 A1 | 4/2021 | Veselinovic | |
| 2021/0200504 A1 | 7/2021 | Park | |
| 2021/0375298 A1 | 12/2021 | Zhang | |

FOREIGN PATENT DOCUMENTS

| | | |
|---|---|---|
| CA | 2505496 | 10/2006 |
| CA | 2838856 | 12/2012 |
| CA | 2846323 | 9/2014 |
| CN | 1780495 | 5/2006 |
| CN | 101217830 | 7/2008 |
| CN | 101833954 | 9/2010 |
| CN | 101860776 | 10/2010 |
| CN | 101894558 | 11/2010 |
| CN | 102646418 | 8/2012 |
| CN | 102821336 | 12/2012 |
| CN | 102833664 | 12/2012 |
| CN | 102860039 | 1/2013 |
| CN | 104036784 | 9/2014 |
| CN | 104053088 | 9/2014 |
| CN | 104080289 | 10/2014 |
| CN | 104347076 | 2/2015 |
| CN | 104581463 | 4/2015 |
| CN | 105355210 | 2/2016 |
| CN | 105548998 | 5/2016 |
| CN | 106162427 | 11/2016 |
| CN | 106251857 | 12/2016 |
| CN | 106851036 | 6/2017 |
| CN | 107221336 | 9/2017 |
| CN | 107534725 | 1/2018 |
| CN | 108172235 | 6/2018 |
| CN | 109087664 | 12/2018 |
| CN | 208190895 | 12/2018 |
| CN | 109727604 | 5/2019 |
| CN | 110010147 | 7/2019 |
| CN | 306391029 | 3/2021 |
| DE | 2941485 | 4/1981 |
| EM | 0077546430001 | 3/2020 |
| EP | 0381498 | 8/1990 |
| EP | 0594098 | 4/1994 |
| EP | 0869697 | 10/1998 |
| EP | 1180914 | 2/2002 |
| EP | 1184676 | 3/2002 |
| EP | 0944228 | 6/2003 |
| EP | 1439526 | 7/2004 |
| EP | 1651001 | 4/2006 |
| EP | 1727344 | 11/2006 |
| EP | 1906707 | 4/2008 |
| EP | 1952393 | 8/2008 |
| EP | 1962547 | 8/2008 |
| EP | 2133867 | 12/2009 |
| EP | 2159789 | 3/2010 |
| EP | 2197219 | 6/2010 |
| EP | 2360940 | 8/2011 |
| EP | 2710788 | 3/2014 |
| EP | 2721837 | 4/2014 |
| EP | 2772910 | 9/2014 |
| EP | 2778310 | 9/2014 |
| EP | 2942975 | 11/2015 |
| EP | 2988527 | 2/2016 |
| EP | 3131311 | 2/2017 |
| GB | 2393601 | 3/2004 |
| GB | 2446620 | 8/2008 |
| JP | S63144699 | 6/1988 |
| JP | H01260967 | 10/1989 |
| JP | H0241099 | 2/1990 |
| JP | H05260589 | 10/1993 |
| JP | H07336790 | 12/1995 |
| JP | 3175622 | 6/2001 |
| JP | 2003060530 | 2/2003 |
| JP | 2003087890 | 3/2003 |
| JP | 2004349806 | 12/2004 |
| JP | 2004537232 | 12/2004 |
| JP | 2005323084 | 11/2005 |
| JP | 2006094389 | 4/2006 |
| JP | 2006101499 | 4/2006 |
| JP | 4120646 | 8/2006 |
| JP | 4258472 | 8/2006 |
| JP | 4196956 | 9/2006 |

(56) References Cited

FOREIGN PATENT DOCUMENTS

| | | | | |
|---|---|---|---|---|
| JP | 2006340151 | 12/2006 | | |
| JP | 4760160 | 1/2007 | | |
| JP | 4752403 | 3/2007 | | |
| JP | 2007074255 | * 3/2007 | ............... | H04R 1/02 |
| JP | 2007089058 | 4/2007 | | |
| JP | 4867579 | 6/2007 | | |
| JP | 2007208503 | 8/2007 | | |
| JP | 2007228069 | 9/2007 | | |
| JP | 2007228070 | 9/2007 | | |
| JP | 2007274131 | 10/2007 | | |
| JP | 2007274463 | 10/2007 | | |
| JP | 2007288679 | 11/2007 | | |
| JP | 2008005347 | 1/2008 | | |
| JP | 2008042754 | 2/2008 | | |
| JP | 2008154056 | 7/2008 | | |
| JP | 2008259022 | 10/2008 | | |
| JP | 2008263336 | 10/2008 | | |
| JP | 2008312002 | 12/2008 | | |
| JP | 2009206671 | 9/2009 | | |
| JP | 2010028653 | 2/2010 | | |
| JP | 2010114554 | 5/2010 | | |
| JP | 2010268129 | 11/2010 | | |
| JP | 2011015018 | 1/2011 | | |
| JP | 4779748 | 9/2011 | | |
| JP | 2012165189 | 8/2012 | | |
| JP | 5028944 | 9/2012 | | |
| JP | 5139111 | 2/2013 | | |
| JP | 5306565 | 10/2013 | | |
| JP | 5685173 | 3/2015 | | |
| JP | 2016051038 | 4/2016 | | |
| KR | 100298300 | 5/2001 | | |
| KR | 100901464 | 6/2009 | | |
| KR | 100960781 | 6/2010 | | |
| KR | 1020130033723 | 4/2013 | | |
| KR | 300856915 | 5/2016 | | |
| TW | 201331932 | 8/2013 | | |
| TW | 1484478 | 5/2015 | | |
| WO | 1997008896 | 3/1997 | | |
| WO | 1998047291 | 10/1998 | | |
| WO | 2000030402 | 5/2000 | | |
| WO | 2003073786 | 9/2003 | | |
| WO | 2003088429 | 10/2003 | | |
| WO | 2004027754 | 4/2004 | | |
| WO | 2004090865 | 10/2004 | | |
| WO | 2006049260 | 5/2006 | | |
| WO | 2006071119 | 7/2006 | | |
| WO | 2006114015 | 11/2006 | | |
| WO | 2006121896 | 11/2006 | | |
| WO | 2007045971 | 4/2007 | | |
| WO | 2008074249 | 6/2008 | | |
| WO | 2008125523 | 10/2008 | | |
| WO | 2009039783 | 4/2009 | | |
| WO | 2009109069 | 9/2009 | | |
| WO | 2010001508 | 1/2010 | | |
| WO | 2010091999 | 8/2010 | | |
| WO | 2010140084 | 12/2010 | | |
| WO | 2010144148 | 12/2010 | | |
| WO | 2011104501 | 9/2011 | | |
| WO | 2012122132 | 9/2012 | | |
| WO | 2012140435 | 10/2012 | | |
| WO | 2012160459 | 11/2012 | | |
| WO | 2012174159 | 12/2012 | | |
| WO | 2013016986 | 2/2013 | | |
| WO | 2013182118 | 12/2013 | | |
| WO | 2014156292 | 10/2014 | | |
| WO | 2016176429 | 11/2016 | | |
| WO | 2016179211 | 11/2016 | | |
| WO | 2017208022 | 12/2017 | | |
| WO | 2018140444 | 8/2018 | | |
| WO | 2018140618 | 8/2018 | | |
| WO | 2018211806 | 11/2018 | | |
| WO | 2019231630 | 12/2019 | | |
| WO | 2020168873 | 8/2020 | | |
| WO | 2020191354 | 9/2020 | | |
| WO | 211843001 | 11/2020 | | |

OTHER PUBLICATIONS

"Vsa 2050 II Digitally Steerable Column Speaker," Web page https://www.rcf.it/en_US/products/product-detail/vsa-2050-ii/972389, 15 pages, Dec. 24, 2018.

Advanced Network Devices, IPSCM Ceiling Tile IP Speaker, Feb. 2011, 2 pgs.

Advanced Network Devices, IPSCM Standard 2' by 2' Ceiling Tile Speaker, 2 pgs.

Chen, et al., "Design and Implementation of Small Microphone Arrays," PowerPoint Presentation, Northwestern Polytechnical University and Institut national de la recherche scientifique, Jan. 1, 2014, 56 pp.

Chen, et al., "Design of Robust Broadband Beamformers with Passband Shaping Characteristics using Tikhonov Regularization," IEEE Transactions on Audio, Speech, and Language Processing, vol. 17, No. 4, May 2009, pp. 565-681.

Chou, "Frequency-Independent Beamformer with Low Response Error," 1995 International Conference on Acoustics, Speech, and Signal Processing, pp. 2995-2998, May 9, 1995, 4 pp.

Chu, "Desktop Mic Array for Teleconferencing," 1995 International Conference on Acoustics, Speech, and Signal Processing, May 1995, pp. 2999-3002.

Circuit Specialists webpage for an aluminum enclosure, available at <https://www.circuitspecialists.com/metal-instrument-enclosure-la7.html?otaid=gpl&gclid=EAIaIQobChMI2JTw-Ynm6AIVgbbICh3F4QKuEAkYBiABEgJZMPD_BWE>, 3 pp.

ClearOne Introduces Ceiling Microphone Array With Built-In Dante Interface, Press Release; GlobeNewswire, Jan. 8, 2019, 2 pp.

ClearOne Launches Second Generation of its Groundbreaking Beamforming Microphone Array, Press Release, Acquire Media, Jun. 1, 2016, 2 pp.

ClearOne to Unveil Beamforming Microphone Array with Adaptive Steering and Next Generation Acoustic Echo Cancellation Technology, Press Release, InfoComm, Jun. 4, 2012, 1 p.

ClearOne, Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-technology-for-corporate-conferencing-systems/.

ClearOne, Beamforming Microphone Array, Mar. 2012, 6 pgs.

ClearOne, Ceiling Microphone Array Installation Manual, Jan. 9, 2012, 20 pgs.

ClearOne, Converge/Converge Pro, Manual, 2008, 51 pp.

ClearOne, Professional Conferencing Microphones, Brochure, Mar. 2015, 3 pp.

Coleman, "Loudspeaker Array Processing for Personal Sound Zone Reproduction," Centre for Vision, Speech and Signal Processing, 2014, 239 pp.

Cook, et al., An Alternative Approach to Interpolated Array Processing for Uniform Circular Arrays, Asia-Pacific Conference on Circuits and Systems, 2002, pp. 411-414.

Cox, et al., "Robust Adaptive Beamforming," IEEE Trans. Acoust., Speech, and Signal Processing, vol. ASSP-35, No. 10, Oct. 1987, pp. 1365-1376.

CTG Audio, Ceiling Microphone CTG CM-01, Jun. 5, 2008, 2 pgs.

CTG Audio, CM-01 & CM-02 Ceiling Microphones Specifications, 2 pgs.

CTG Audio, CM-01 & CM-02 Ceiling Microphones, 2017, 4 pgs.

CTG Audio, CTG FS-400 and RS-800 with "Beamforming" Technology, Datasheet, as early as 2009, 2 pp.

CTG Audio, CTG User Manual for the FS-400/800 Beamforming Mixers, Nov. 2008, 26 pp.

Double Condenser Microphone SM 69, Datasheet, Georg Neumann GmbH, available at <https://ende.neumann.com/product_files/7453/download>, 8 pp.

Eargle, "The Microphone Handbook," Elar Publ. Co., 1st ed., 1981, 4 pp.

Enright, Notes From Logan, June edition of Scanlines, Jun. 2009, 9 pp.

Fan, et al., "Localization Estimation of Sound Source by Microphones Array," Procedia Engineering 7, 2010, pp. 312-317.

(56) References Cited

OTHER PUBLICATIONS

Firoozabadi, et al., "Combination of Nested Microphone Array and Subband Processing for Multiple Simultaneous Speaker Localization," 6th International Symposium on Telecommunications, Nov. 2012, pp. 907-912.

Flanagan et al., Autodirective Microphone Systems, Acustica, vol. 73, 1991, pp. 58-71.

Flanagan, et al., "Computer-Steered Microphone Arrays for Sound Transduction in Large Rooms," J. Acoust. Soc. Am. 78 (5), Nov. 1985, pp. 1508-1518.

Fohhn Audio New Generation of Beam Steering Systems Available Now, audioXpress Staff, May 10, 2017, 8 pp.

Fox, et al., "A Subband Hybrid Beamforming for In-Car Speech Enhancement," 20th European Signal rocessing Conference, Aug. 2012, 5 pp.

Frost, III, An Algorithm for Linearly Constrained Adaptive Array Processing, Proc. IEEE, vol. 60, No. 8, Aug. 1972, pp. 926-935.

Gannot et al., Signal Enhancement using Beamforming and Nonstationarity with Applications to Speech, IEEE Trans. On Signal Processing, vol. 49, No. 8, Aug. 2001, pp. 1614-1626.

Gansler et al., A Double-Talk Detector Based on Coherence, IEEE Transactions on Communications, vol. 44, No. 11, Nov. 1996, pp. 1421-1427.

Gazor et al., Robust Adaptive Beamforming via Target Tracking, IEEE Transactions on Signal Processing, vol. 44, No. 6, Jun. 1996, pp. 1589-1593.

Gazor et al., Wideband Multi-Source Beamforming with Adaptive Array Location Calibration and Direction Finding, 1995 International Conference on Acoustics, Speech, and Signal Processing, May 1995, pp. 1904-1907.

Gentner Communications Corp., AP400 Audio Perfect 400 Audioconferencing System Installation & Operation Manual, Nov. 1998, 80 pgs.

Gentner Communications Corp., XAP 800 Audio Conferencing System Installation & Operation Manual, Oct. 2001, 152 pgs.

Gil-Cacho et al., Multi-Microphone Acoustic Echo Cancellation Using Multi-Channel Warped Linear Prediction of Common Acoustical Poles, 18th European Signal Processing Conference, Aug. 2010, pp. 2121-2125.

Giuliani, et al., "Use of Different Microphone Array Configurations for Hands-Free Speech Recognition in Noisy and Reverberant Environment," IRST-Istituto per la Ricerca Scientifica e Tecnologica, Sep. 22, 1997, 4 pp.

Gritton et al., Echo Cancellation Algorithms, IEEE ASSP Magazine, vol. 1, issue 2, Apr. 1984, pp. 30-38.

Hald, et al., "A class of optimal broadband phased array geometries designed for easy construction," 2002 Int'l Congress & Expo. on Noise Control Engineering, Aug. 2002, 6 pp.

Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.

Sennheiser, New microphone solutions for ceiling and desk installation, https://en-us.sennheiser.com/news-new-microphone-solutions-for-ceiling-and-desk-installation, Feb. 2011, 2 pgs.

Sennheiser, TeamConnect Ceiling, https://en-us.sennheiser.com/conference-meeting-rooms-teamconnect-ceiling, 2017, 7 pgs.

SerDes, Wikipedia article, last edited on Jun. 25, 2018; retrieved on Jun. 27, 2018, 3 pp., https://en.wikipedia.org/wiki/SerDes.

Sessler, et al., "Directional Transducers," IEEE Transactions on Audio and Electroacoustics, vol. AU-19, No. 1, Mar. 1971, pp. 19-23.

Sessler, et al., "Toroidal Microphones," Journal of Acoustical Society of America, vol. 46, No. 1, 1969, 10 pp.

Shure AMS Update, vol. 1, No. 1, 1983, 2 pgs.

Shure AMS Update, vol. 1, No. 2, 1983, 2 pgs.

Shure AMS Update, vol. 4, No. 4, 1997, 8 pgs.

Shure Debuts Microflex Advance Ceiling and Table Array Microphones, Press Release, Feb. 9, 2016, 4 pp.

Shure Inc., A910-HCM Hard Ceiling Mount, retrieved from website <http://www.shure.com/en-US/products/accessories/a910hcm> on Jan. 16, 2020, 3 pp.

Shure Inc., Microflex Advance, http://www.shure.com/americas/microflex-advance, 12 pgs.

Shure Inc., MX395 Low Profile Boundary Microphones, 2007, 2 pgs.

Shure Inc., MXA910 Ceiling Array Microphone, http://www.shure.com/americas/products/microphones/microflex-advance/mxa910-ceiling-array-microphone, 7 pgs.

Shure, MXA910 With IntelliMix, Ceiling Array Microphone, available at <https://www.shure.com/en-US/products/microphones/mxa910>, as early as 2020, 12 pp.

Shure, New MXA910 Variant Now Available, Press Release, Dec. 13, 2019, 5 pp.

Shure, Q&A in Response to Recent Us Court Ruling on Shure MXA910, Available at <https://www.shure.com/en-US/meta/legal/q-and-a-inresponse-to-recent-us-court-ruling-on-shure-mxa910-response>, as early as 2020, 5 pp.

Shure, RK244G Replacement Screen and Grille, Datasheet, 2013, 1 p.

Shure, The Microflex Advance MXA310 Table Array Microphone, Available at <https://www.shure.com/en-US/products/microphones/mxa310>, as early as 2020, 12 pp.

Signal Processor MRX7-D Product Specifications, Yamaha Corporation, 2016.

Silverman et al., Performance of Real-Time Source-Location Estimators for a Large-Aperture Microphone Array, IEEE Transactions on Speech and Audio Processing, vol. 13, No. 4, Jul. 2005, pp. 593-606.

Sinha, Ch. 9: Noise and Echo Cancellation, in Speech Processing in Embedded Systems, Springer, 2010, pp. 127-142.

SM 69 Stereo Microphone, Datasheet, Georg Neumann GmbH, Available at <https://ende.neumann.com/product_files/6552/download>, 1 p.

Soda et al., Introducing Multiple Microphone Arrays for Enhancing Smart Home Voice Control, The Institute of Electronics, Information and Communication Engineers, Technical Report of IEICE, Jan. 2013, 6 pgs.

Soundweb London Application Guides, BSS Audio, 2010.

Symetrix, Inc., SymNet Network Audio Solutions Brochure, 2008, 32 pgs.

SymNet Network Audio Solutions Brochure, Symetrix, Inc., 2008.

Tan, et al., "Pitch Detection Algorithm: Autocorrelation Method and AMDF," Department of Computer Engineering, Prince of Songkhla University, Jan. 2003, 6 pp.

Tandon, et al., "An Efficient, Low-Complexity, Normalized LMS Algorithm for Echo Cancellation," 2nd Annual IEEE Northeast Workshop on Circuits and Systems, Jun. 2004, pp. 161-164.

Tetelbaum et al., Design and Implementation of a Conference Phone Based on Microphone Array Technology, Proc. Global Signal Processing Conference and Expo (GSPx), Sep. 2004, 6 pgs.

Tiete et al., SoundCompass: A Distributed MEMS Microphone Array-Based Sensor for Sound Source Localization, Sensors, Jan. 23, 2014, pp. 1918-1949.

TOA Corp., Ceiling Mount Microphone AN-9001 Operating Instructions, http://www.toaelectronics.com/media/an9001_mt1e.pdf, 1 pg.

Togami, et al., "Subband Beamformer Combined with Time-Frequency ICA for Extraction of Target Source Under Reverberant Environments," 17th European Signal Processing Conference, Aug. 2009, 5 pp.

U.S. Appl. No. 16/598,918, filed Oct. 10, 2019, 50 pp.

Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.

Van Trees, Optimum Array Processing: Part IV of Detection, Estimation, and Modulation Theory, 2002, 54 pgs., pp. i-xxv, 90-95, 201-230.

Van Veen et al., Beamforming: A Versatile Approach to Spatial Filtering, IEEE ASSP Magazine, vol. 5, issue 2, Apr. 1988, pp. 4-24.

(56) References Cited

OTHER PUBLICATIONS

Vicente, "Adaptive Array Signal Processing Using the Concentric Ring Array and the Spherical Array," Ph.D. Dissertation, University of Missouri, May 2009, 226 pp.
Wang et al., Combining Superdirective Beamforming and Frequency-Domain Blind Source Separation for Highly Reverberant Signals, EURASIP Journal on Audio, Speech, and Music Processing, vol. 2010, pp. 1-13.
Warsitz, et al., "Blind Acoustic Beamforming Based on Generalized Eigenvalue Decomposition," IEEE Transactions on Audio, Speech and Language Processing, vol. 15, No. 5, 2007, 11 pp.
Weinstein, et al., "Loud: A 1020-Node Microphone Array and Acoustic Beamformer," 14th International Congress on Sound & Vibration, Jul. 2007, 8 pgs.
Affes, et al., "A Signal Subspace Tracking Algorithm for Microphone Array Processing of Speech," IEEE Trans. On Speech and Audio Processing, vol. 5, No. 5, Sep. 1997, pp. 425-437.
Affes, et al., "A Source Subspace Tracking Array of Microphones for Double Talk Situations," 1996 IEEE International Conference on Acoustics, Speech, and Signal Processing Conference Proceedings, May 1996, pp. 909-912.
Affes, et al., "An Algorithm for Multisource Beamforming and Multitarget Tracking," IEEE Trans. On Signal Processing, vol. 44, No. 6, Jun. 1996, pp. 1512-1522.
Affes, et al., "Robust Adaptive Beamforming via LMS-Like Target Tracking," Proceedings of IEEE International Conference on Acoustics, Speech and Signal Processing, Apr. 1994, pp. IV-269-IV-272.
Ahonen, et al., "Directional Analysis of Sound Field with Linear Microphone Array and Applications in Sound Reproduction," Audio Engineering Socity, Convention Paper 7329, May 2008, 11 pp.
Alarifi, et al., "Ultra Wideband Indoor Positioning Technologies: Analysis and Recent Advances," Sensors 2016, vol. 16, No. 707, 36 pp.
Amazon webpage for Metalfab MFLCRFG (last visited Apr. 22, 2020) available at <https://www.amazon.com/RETURN-FILTERGRILLE-Drop-Ceiling/dp/B0064Q9A7I/ref=sr_12?dchild=1&keywords=drop+ceiling+return+air+grille&qid=1585862723&s=hi&sr=1-2>, 11 pp.
Armstrong "Walls" Catalog available at <https://www.armstrongceilings.com/content/dam/armstrongceilings/commercial/north-america/catalogs/armstrong-ceilings-wallsspecifiers-reference.pdf>, 2019, 30 pp.
Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.
Armstrong Woodworks Concealed Catalog available at <https://sweets.construction.com/swts_content_files/3824/442581.pdf>, 2014, 6 pp.
Armstrong Woodworks Walls Catalog available at <https://www.armstrongceilings.com/pdbupimagesclg/220600.pdf/download/datasheet-woodworks-walls.pdf>, 2019, 2 pp.
Armstrong World Industries, Inc., I-Ceilings Sound Systems Speaker Panels, 2002, 4 pgs.
Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.
Armstrong, Ceiling Systems, Brochure page for Armstrong Softlook, 1995, 2 pp.
Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, 162 pp.
Armstrong, i-Ceilings, Brochure, 2009, 12 pp.
Arnold, et al., "A Directional Acoustic Array Using Silicon Micromachined Piezoresistive Microphones," Journal of the Acoustical Society of America, 113(1), Jan. 2003, 10 pp.
Atlas Sound, I128SYSM IP Compliant Loudspeaker System with Microphone Data Sheet, 2009, 2 pgs.
Atlas Sound, 1'x2' IP Speaker with Micophone for Suspended Ceiling Systems, https://www.atlasied.com/i128sysm, retrieved Oct. 25, 2017, 5 pgs.
Audio Technica, ES945 Omnidirectional Condenser Boundary Microphones, https://eu.audio-technica.com/resources/ES945%20Specifications.pdf, 2007, 1 pg.
Audix Microphones, Audix Introduces Innovative Ceiling Mics, http://audixusa.com/docs_12/latest_news/EFpIFkAAkIOtSdolke.shtml, Jun. 2011, 6 pgs.
Audix Microphones, M70 Flush Mount Ceiling Mic, May 2016, 2 pgs.
Automixer Gated, Information Sheet, MIT, Nov. 2019, 9 pp.
AVNetwork, "Top Five Conference Room Mic Myths," Feb. 25, 2015, 14 pp.
Beh, et al., "Combining Acoustic Echo Cancellation and Adaptive Beamforming for Achieving Robust Speech Interface in Mobile Robot," 2008 IEEE/RSJ International Conference on Intelligent Robots and Systems, Sep. 2008, pp. 1693-1698.
Benesty, et al., "A New Class of Doubletalk Detectors Based on Cross-Correlation," IEEE Transactions on Speech and Audio Processing, vol. 8, No. 2, Mar. 2000, pp. 168-172.
Benesty, et al., "Adaptive Algorithms for Mimo Acoustic Echo Cancellation," AI2 Allen Institute for Artifical Intelligence, 2003.
Benesty, et al., "Differential Beamforming," Fundamentals of Signal Enhancement and Array Signal Processing, First Edition, 2017, 39 pp.
Benesty, et al., "Frequency-Domain Adaptive Filtering Revisited, Generalization to the Multi-Channel Case, and Application to Acoustic Echo Cancellation," 2000 IEEE International Conference on Acoustics, Speech, and Signal Processing Proceedings, Jun. 2000, pp. 789-792.
Benesty, et. al., "Microphone Array Signal Processing," Springer, 2010, 20 pp.
Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.
Beyer Dynamic, Classis BM 32-33-34 DE-EN-FR 2016, 1 pg.
Beyer Dynamic, Classis-BM-33-PZ A1, 2013, 1 pg.
BNO055, Intelligent 9-axis absolute orientation sensor, Data sheet, Bosch, Nov. 2020, 118 pp.
Boyd, et al., Convex Optimization, Mar. 15, 1999, 216 pgs.
Brandstein, et al., "Microphone Arrays: Signal Processing Techniques and Applications," Digital Signal Processing, Springer-Verlag Berlin Heidelberg, 2001, 401 pgs.
Brooks, et al., "A Quantitative Assessment of Group Delay Methods for Identifying Glottal Closures in Voiced Speech," IEEE Transaction on Audio, Speech, and Language Processing, vol. 14, No. 2, Mar. 2006, 11 pp.
Bruel & Kjaer, by J.J. Christensen and J. Hald, Technical Review: Beamforming, No. 1, 2004, 54 pgs.
BSS Audio, Soundweb London Application Guides, 2010, 120 pgs.
Buchner, et al., "An Acoustic Human-Machine Interface with Multi-Channel Sound Reproduction," IEEE Fourth Workshop on Multimedia Signal Processing, Oct. 2001, pp. 359-364.
Buchner, et al., "An Efficient Combination of Multi-Channel Acoustic Echo Cancellation with a Beamforming Microphone Array," International Workshop on Hands-Free Speech Communication (HSC2001), Apr. 2001, pp. 55-58.
Buchner, et al., "Full-Duplex Communication Systems Using Loudspeaker Arrays and Microphone Arrays," IEEE International Conference on Multimedia and Expo, Aug. 2002, pp. 509-512.
Buchner, et al., "Generalized Multichannel Frequency-Domain Adaptive Filtering: Efficient Realization and Application to Hands-Free Speech Communication," Signal Processing 85, 2005, pp. 549-570.
Buchner, et al., "Multichannel Frequency-Domain Adaptive Filtering with Application to Multichannel Acoustic Echo Cancellation," Adaptive Signal Processing, 2003, pp. 95-128.
Buck, "Aspects of First-Order Differential Microphone Arrays in the Presence of Sensor Imperfections," Transactions on Emerging Telecommunications Technologies, 13.2, 2002, 8 pp.

(56) References Cited

OTHER PUBLICATIONS

Buck, et al., "First Order Differential Microphone Arrays for Automotive Applications," 7th International Workshop on Acoustic Echo and Noise Control, Darmstadt University of Technology, Sep. 10-13, 2001, 4 pp.
Buck, et al., "Self-Calibrating Microphone Arrays for Speech Signal Acquisition: A Systematic Approach," Signal Processing, vol. 86, 2006, pp. 1230-1238.
Burton, et al., "A New Structure for Combining Echo Cancellation and Beamforming in Changing Acoustical Environments," IEEE International Conference on Acoustics, Speech and Signal Processing, 2007, pp. 1-77-1-80.
BZ-3a Installation Instructions, XEDIT Corporation, Available at <chrome-extension://efaidnbmnnnibpcajpcglclefindmkaj/viewer.html?pdfurl=https%3A%2F%2Fwww.servoreelers.com%2Fmt-content%2Fuploads%2F2017%2F05%2Fbz-a-3universal-2017c.pdf&clen=189067&chunk=true>, 1 p.
Cabral, et al., Glottal Spectral Separation for Speech Synthesis, IEEE Journal of Selected Topics in Signal Processing, 2013, 15 pp.
Campbell, "Adaptive Beamforming Using a Microphone Array for Hands-Free Telephony," Virginia Polytechnic Institute and State University, Feb. 1999, 154 pgs.
Canetto, et al., "Speech Enhancement Systems Based on Microphone Arrays," VI Conference of the Italian Society for Applied and Industrial Mathematics, May 27, 2002, 9 pp.
Cao, "Survey on Acoustic Vector Sensor and its Applications in Signal Processing" Proceedings of the 33rd Chinese Control Conference, Jul. 2014, 17 pp.
Cech, et al., "Active-Speaker Detection and Localization with Microphones and Cameras Embedded into a Robotic Head," IEEE-RAS International Conference on Humanoid Robots, Oct. 2013, pp. 203-210.
Chan, et al., "Uniform Concentric Circular Arrays with Frequency-Invariant Characteristics-Theory, Design, Adaptive Beamforming and DOA Estimation," IEEE Transactions on Signal Processing, vol. 55, No. 1, Jan. 2007, pp. 165-177.
Chau, et al., "A Subband Beamformer on an Ultra Low-Power Miniature DSP Platform," 2002 IEEE International Conference on Acoustics, Speech, and Signal Processing, 4 pp.
Chen, et al., "A General Approach to the Design and Implementation of Linear Differential Microphone Arrays," Signal and Information Processing Association Annual Summit and Conference, 2013 Asia-Pacific, IEEE, 7 pp.
CTG Audio, Expand Your IP Teleconferencing to Full Room Audio, Obtained from website htt. )://www ct audio com/ex and-, our-i - teleconforencino-to-ful-room-audio-while-conquennc.1-echo-cancelation-issues Mull, 2014.
CTG Audio, Frequently Asked Questions, as early as 2009, 2 pp.
CTG Audio, Installation Manual and User Guidelines for the Soundman SM 02 System, May 2001, 29 pp.
CTG Audio, Installation Manual, Nov. 21, 2008, 25 pgs.
CTG Audio, Introducing the CTG FS-400 and FS-800 with Beamforming Technology, as early as 2008, 2 pp.
CTG Audio, Meeting the Demand for Ceiling Mics in the Enterprise 5 Best Practices, Brochure, 2012, 9 pp.
CTG Audio, White on White—Introducing the CM-02 Ceiling Microphone, https://ctgaudio.com/white-on-white-introducing-the-cm-02-ceiling-microphone/, Feb. 20, 2014, 3 pgs.
Dahl et al., Acoustic Echo Cancelling with Microphone Arrays, Research Report Mar. 1995, Univ. of Karlskrona/Ronneby, Apr. 1995, 64 pgs.
Decawave, Application Note: APR001, UWB Regulations, A Summary of Worldwide Telecommunications Regulations governing the use of Ultra-Wideband radio, Version 1.2, 2015, 63 pp.
Desiraju, et al., "Efficient Multi-Channel Acoustic Echo Cancellation Using Constrained Sparse Filter Updates in the Subband Domain," Acoustic Speech Enhancement Research, Sep. 2014, 4 pp.
DiBiase et al., Robust Localization in Reverberent Rooms, in Brandstein, ed., Microphone Arrays: Techniques and Applications, 2001, Springer-Verlag Berlin Heidelberg, pp. 157-180.
Diethorn, "Audio Signal Processing for Next-Generation Multimedia Communication Systems," Chapter 4, 2004, 9 pp.
Digikey webpage for Converta box (last visited Apr. 22, 2020) <https://www.digikey.com/product-detail/en/bud-industries/CU-452-A/377-1969-ND/439257?utm_adgroup=Boxes&utm_source=google&utm_medium=cpc&utm_campaign=Shopping_Boxes%2C%20Enclosures%2C%20Racks_NEW&utm_term=&utm_content=Boxes&gclid=EAIaIQobChMI2JTw-Ynm6AIVgbblCh3F4QKuEAkYCSABEgKybPD_BwE>, 3 pp.
Digikey webpage for Pomona Box (last visited Apr. 22, 2020) available at <https://www.digikey.com/product-detail/en/pomonaelectronics/3306/501-2054-ND/736489>, 2 pp.
Digital Wireless Conference System, MCW-D 50, Beyerdynamic Inc., 2009, 18 pp.
Do et al., A Real-Time SRP-PHAT Source Location Implementation using Stochastic Region Contraction (SRC) on a Large-Aperture Microphone Array, 2007 IEEE International Conference on Acoustics, Speech and Signal Processing—ICASSP '07, , Apr. 2007, pp. I-121-I-124.
Dominguez, et al., "Towards an Environmental Measurement Cloud: Delivering Pollution Awareness to the Public," International Journal of Distributed Sensor Networks, vol. 10, Issue 3, Mar. 31, 2014, 17 pp.
Dormehl, "HoloLens concept lets you control your smart home via augmented reality," digitaltrends, Jul. 26, 2016, 12 pp.
Hamalainen, et al., "Acoustic Echo Cancellation for Dynamically Steered Microphone Array Systems," 2007 IEEE Workshop on Applications of Signal Processing to Audio and Acoustics, Oct. 2007, pp. 58-61.
Hayo, Virtual Controls for Real Life, Web page downloaded from https://hayo.io/ on Sep. 18, 2019, 19 pp.
Herbordt et al., A Real-time Acoustic Human-Machine Front-End for Multimedia Applications Integrating Robust Adaptive Beamforrning and Stereophonic Acoustic Echo Cancellation, 7th International Conference on Spoken Language Processing, Sep. 2002, 4 pgs.
Herbordt et al., GSAEC—Acoustic Echo Cancellation embedded into the Generalized Sidelobe Canceller, 10th European Signal Processing Conference, Sep. 2000, 5 pgs.
Herbordt et al., Multichannel Bin-Wise Robust Frequency-Domain Adaptive Filtering and Its Application to Adaptive Beamforming, IEEE Transactions on Audio, Speech, and Language Processing, vol. 15, No. 4, May 2007, pp. 1340-1351.
Herbordt, "Combination of Robust Adaptive Beamforming with Acoustic Echo Cancellation for Acoustic Human/Machine Interfaces," Friedrich-Alexander University, 2003, 293 pgs.
Herbordt, et al., Joint Optimization of LCMV Beamforming and Acoustic Echo Cancellation for Automatic Speech Recognition, IEEE International Conference on Acoustics, Speech, and Signal Processing, Mar. 2005, pp. III-77-III-80.
Holm, "Optimizing Microphone Arrays for use in Conference Halls," Norwegian University of Science and Technology, Jun. 2009, 101 pp.
Huang et al., Immersive Audio Schemes: The Evolution of Multiparty Teleconferencing, IEEE Signal Processing Magazine, Jan. 2011, pp. 20-32.
ICONYX Gen5, Product Overview; Renkus-Heinz, Dec. 24, 2018, 2 pp.
International Search Report and Written Opinion for PCT/US2016/022773 dated Jun. 10, 2016.
International Search Report and Written Opinion for PCT/US2016/029751 dated Nov. 28, 2016, 21 pp.
International Search Report and Written Opinion for PCT/US2018/013155 dated Jun. 8, 2018.
International Search Report and Written Opinion for PCT/US2019/031833 dated Jul. 24, 2019, 16 pp.
International Search Report and Written Opinion for PCT/US2019/033470 dated Jul. 31, 2019, 12 pp.
International Search Report and Written Opinion for PCT/US2019/051989 dated Jan. 10, 2020, 15 pp.

(56) References Cited

OTHER PUBLICATIONS

International Search Report and Written Opinion for PCT/US2020/024063 dated Aug. 31, 2020, 18 pp.
International Search Report and Written Opinion for PCT/US2020/035185 dated Sep. 15, 2020, 11 pp.
International Search Report and Written Opinion for PCT/US2020/058385 dated Mar. 31, 2021, 20 pp.
International Search Report and Written Opinion for PCT/US2021/070625 dated Sep. 17, 2021, 17 pp.
International Search Report for PCT/US2020/024005 dated Jun. 12, 2020, 12 pp.
InvenSense, "Microphone Array Beamforming," Application Note AN-1140, Dec. 31, 2013, 12 pp.
Invensense, Recommendations for Mounting and Connecting InvenSense MEMS Microphones, Application Note AN-1003, 2013, 11 pp.
Ishii et al., Investigation on Sound Localization using Multiple Microphone Arrays, Reflection and Spatial Information, Japanese Society for Artificial Intelligence, JSAI Technical Report, SIG-Challenge-B202-11, 2012, pp. 64-69.
Ito et al., Aerodynamic/Aeroacoustic Testing in Anechoic Closed Test Sections of Low-speed Wind Tunnels, 16th AIAA/CEAS Aeroacoustics Conference, 2010, 11 pgs.
Johansson et al., Robust Acoustic Direction of Arrival Estimation using Root-SRP-PHAT, a Realtime Implementation, IEEE International Conference on Acoustics, Speech, and Signal Processing, Mar. 2005, 4 pgs.
Johansson, et al., Speaker Localisation using the Far-Field SRP-PHAT in Conference Telephony, 2002 International Symposium on Intelligent Signal Processing and Communication Systems, 5 pgs.
Johnson, et al., "Array Signal Processing: Concepts and Techniques," p. 59, Prentice Hall, 1993, 3 pp.
Julstrom et al., Direction-Sensitive Gating: A New Approach to Automatic Mixing, J. Audio Eng. Soc., vol. 32, No. 7/8, Jul./Aug. 1984, pp. 490-506.
Kahrs, Ed., The Past, Present, and Future of Audio Signal Processing, IEEE Signal Processing Magazine, Sep. 1997, pp. 30-57.
Kallinger et al., Multi-Microphone Residual Echo Estimation, 2003 IEEE International Conference on Acoustics, Speech, and Signal Processing, Apr. 2003, 4 pgs.
Kammeyer, et al., New Aspects of Combining Echo Cancellers with Beamformers, IEEE International Conference on Acoustics, Speech, and Signal Processing, Mar. 2005, pp. III-137-III-140.
Kellermann, A Self-Steering Digital Microphone Array, 1991 International Conference on Acoustics, Speech, and Signal Processing, Apr. 1991, pp. 3581-3584.
Kellermann, Acoustic Echo Cancellation for Beamforming Microphone Arrays, in Brandstein, ed., Microphone Arrays: Techniques and Applications, 2001, Springer-Verlag Berlin Heidelberg, pp. 281-306.
Kellermann, Integrating Acoustic Echo Cancellation with Adaptive Beamforming Microphone Arrays, Forum Acusticum, Berlin, Mar. 1999, pp. 1-4.
Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pgs.
Klegon, "Achieve Invisible Audio with the MXA910 Ceiling Array Microphone," Jun. 27, 2016, 10 pp.
Knapp, et al., The Generalized Correlation Method for Estimation of Time Delay, IEEE Transactions on Acoustics, Speech, and Signal Processing, vol. ASSP-24, No. 4, Aug. 1976, pp. 320-327.
Kobayashi et al., A Hands-Free Unit with Noise Reduction by Using Adaptive Beamformer, IEEE Transactions on Consumer Electronics, vol. 54, No. 1, Feb. 2008, pp. 116-122.
Kobayashi et al., A Microphone Array System with Echo Canceller, Electronics and Communications in Japan, Part 3, vol. 89, No. 10, Feb. 2, 2006, pp. 23-32.
Kolundžija, et al., "Baffled circular loudspeaker array with broadband high directivity," 2010 IEEE International Conference on Acoustics, Speech and Signal Processing, Dallas, TX, 2010, pp. 73-76.
Lai, et al., "Design of Robust Steerable Broadband Beamformers with Spiral Arrays and the Farrow Filter Structure," Proc. Intl. Workshop Acoustic Echo Noise Control, 2010, 4 pp.
Lebret, et al., Antenna Array Pattern Synthesis via Convex Optimization, IEEE Trans. on Signal Processing, vol. 45, No. 3, Mar. 1997, pp. 526-532.
LecNet2 Sound System Design Guide, Lectrosonics, Jun. 2, 2006.
Lectrosonics, LecNet2 Sound System Design Guide, Jun. 2006, 28 pgs.
Lee et al., Multichannel Teleconferencing System with Multispatial Region Acoustic Echo Cancellation, International Workshop on Acoustic Echo and Noise Control (IWAENC2003), Sep. 2003, pp. 51-54.
Li, "Broadband Beamforming and Direction Finding Using Concentric Ring Array," Ph.D. Dissertation, University of Missouri-Columbia, Jul. 2005, 163 pp.
Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.
Liu et al., Adaptive Beamforming with Sidelobe Control: A Second-Order Cone Programming Approach, IEEE Signal Proc. Letters, vol. 10, No. 11, Nov. 2003, pp. 331-334.
Liu, et al., "Frequency Invariant Beamforming in Subbands," IEEE Conference on Signals, Systems and Computers, 2004, 5 pp.
Liu, et al., "Wideband Beamforming," Wiley Series on Wireless Communications and Mobile Computing, pp. 143-198, 2010, 297 pp.
Lobo, et al., Applications of Second-Order Cone Programming, Linear Algebra and its Applications 284, 1998, pp. 193-228.
Luo et al., Wideband Beamforming with Broad Nulls of Nested Array, Third Int'l Conf. on Info. Science and Tech., Mar. 23-25, 2013, pp. 1645-1648.
Marquardt et al., A Natural Acoustic Front-End for Interactive TV in the EU-Project Dicit, IEEE Pacific Rim Conference on Communications, Computers and Signal Processing, Aug. 2009, pp. 894-899.
Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.
Maruo et al., On the Optimal Solutions of Beamformer Assisted Acoustic Echo Cancellers, IEEE Statistical Signal Processing Workshop, 2011, pp. 641-644.
McCowan, Microphone Arrays: A Tutorial, Apr. 2001, 36 pgs.
MFLCRFG Datasheet, Metal_Fab Inc., Sep. 7, 2007, 1 p.
Microphone Array Primer, Shure Question and Answer Page, <https://service.shure.com/s/article/microphone-array-primer?language=en_US>, Jan. 2019, 5 pp.
Milanovic, et al., "Design and Realization of FPGA Platform for Real Time Acoustic Signal Acquisition and Data Processing" 22nd Telecommunications Forum TELFOR, 2014, 6 pp.
Mohammed, A New Adaptive Beamformer for Optimal Acoustic Echo and Noise Cancellation with Less Computational Load, Canadian Conference on Electrical and Computer Engineering, May 2008, pp. 000123-000128.
Mohammed, A New Robust Adaptive Beamformer for Enhancing Speech Corrupted with Colored Noise, AICCSA, Apr. 2008, pp. 508-515.
Mohammed, Real-time Implementation of an efficient RLS Algorithm based on IIR Filter for Acoustic Echo Cancellation, AICCSA, Apr. 2008, pp. 489-494.
Mohan, et al., "Localization of multiple acoustic sources with small arrays using a coherence test," Journal Acoustic Soc Am., 123(4), Apr. 2008, 12 pp.
Moulines, et al., "Pitch-Synchronous Waveform Processing Techniques for Text-to-Speech Synthesis Using Diphones," Speech Communication 9, 1990, 15 pp.

(56) References Cited

OTHER PUBLICATIONS

Multichannel Acoustic Echo Cancellation, Obtained from website http://www.buchner-net.com/mcaec.html, Jun. 2011.
Myllyla et al., Adaptive Beamforming Methods for Dynamically Steered Microphone Array Systems, 2008 IEEE International Conference on Acoustics, Speech and Signal Processing, Mar.-Apr. 2008, pp. 305-308.
New Shure Microflex Advance MXA910 Microphone With Intellimix Audio Processing Provides Greater Simplicity, Flexibility, Clarity, Press Release, Jun. 12, 2019, 4 pp.
Nguyen-Ky, et al., "An Improved Error Estimation Algorithm for Stereophonic Acoustic Echo Cancellation Systems," 1st International Conference on Signal Processing and Communication Systems, Dec. 17-19, 2007, 5 pp.
Office Action for Taiwan Patent Application No. 105109900 dated May 5, 2017.
Office Action issued for Japanese Patent Application No. 2015-023781 dated Jun. 20, 2016, 4 pp.
Oh, et al., "Hands-Free Voice Communication in an Automobile With a Microphone Array," 1992 IEEE International Conference on Acoustics, Speech, and Signal Processing, Mar. 1992, pp. I-281-I-284.
Olszewski, et al., "Steerable Highly Directional Audio Beam Loudspeaker," Interspeech 2005, 4 pp.
Omologo, Multi-Microphone Signal Processing for Distant-Speech Interaction, Human Activity and Vision Summer School (HAVSS), Inria Sophia Antipolis, Oct. 3, 2012, 79 pgs.
Order, Conduct of the Proceeding, *Clearone, Inc. v. Shure Acquisition Holdings, Inc.*, Nov. 2, 2020, 10 pp.
Pados et al., An Iterative Algorithm for the Computation of the MVDR Filter, IEEE Trans. On Signal Processing, vol. 49, No. 2, Feb. 2001, pp. 290-300.
Palladino, "This App Lets You Control Your Smarthome Lights via Augmented Reality," Next Reality Mobile AR News, Jul. 2, 2018, 5 pp.
Parikh, et al., "Methods for Mitigating IP Network Packet Loss in Real Time Audio Streaming Applications," GatesAir, 2014, 6 pp.
Pasha, et al., "Clustered Multi-channel Dereverberation for Ad-hoc Microphone Arrays," Proceedings of APSIPA Annual Summit and Conference, Dec. 2015, pp. 274-278.
Petitioner's Motion for Sanctions, *Clearone, Inc. v. Shure Acquisition Holdings, Inc.*, Aug. 24, 2020, 20 pp.
Pettersen, "Broadcast Applications for Voice-Activated Microphones," db, Jul./Aug. 1985, 6 pgs.
Pfeifenberger, et al., "Nonlinear Residual Echo Suppression using a Recurrent Neural Network," Interspeech 2020, 5 pp.
Phoenix Audio Technologies, "Beamforming and Microphone Arrays—Common Myths", Apr. 2016, http://info.phnxaudio.com/blog/microphone-arrays-beamforming-myths-1, 19 pp.
Plascore, PCGA-XR1 3003 Aluminum Honeycomb Data Sheet, 2008, 2 pgs.
Polycom Inc., Vortex EF2211/EF2210 Reference Manual, 2003, 66 pgs.
Polycom, Inc., Polycom SoundStructure C16, C12, C8, and SR12 Design Guide, Nov. 2013, 743 pgs.
Polycom, Inc., Setting Up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.
Polycom, Inc., Vortex EF2241 Reference Manual, 2002, 68 pgs.
Polycom, Inc., Vortex EF2280 Reference Manual, 2001, 60 pp.
Pomona, Model 3306, Datasheet, Jun. 9, 1999, 1 p.
Powers, et al., "Proving Adaptive Directional Technology Works: A Review of Studies," The Hearing Review, Apr. 6, 2004, 5 pp.
Prime, et al., "Beamforming Array Optimisation Averaged Sound Source Mapping on a Model Wind Turbine," ResearchGate, Nov. 2014, 10 pp.
Rabinkin et al., Estimation of Wavefront Arrival Delay Using the Cross-Power Spectrum Phase Technique, 132nd Meeting of the Acoustical Society of America, Dec. 1996, pp. 1-10.
Rane Corp., Halogen Acoustic Echo Cancellation Guide, AEC Guide Version 2, Nov. 2013, 16 pgs.
Rao, et al., "Fast LMS/Newton Algorithms for Stereophonic Acoustic Echo Cancelation," IEEE Transactions on Signal Processing, vol. 57, No. 8, Aug. 2009.
Reuven et al., Joint Acoustic Echo Cancellation and Transfer Function GSC in the Frequency Domain, 23rd IEEE Convention of Electrical and Electronics Engineers in Israel, Sep. 2004, pp. 412-415.
Reuven et al., Joint Noise Reduction and Acoustic Echo Cancellation Using the Transfer-Function Generalized Sidelobe Canceller, Speech Communication, vol. 49, 2007, pp. 623-635.
Reuven, et al., "Multichannel Acoustic Echo Cancellation and Noise Reduction in Reverberant Environments Using the Transfer-Function GSC," 2007 IEEE International Conference on Acoustics, Speech and Signal Processing, Apr. 2007, 4 pp.
Ristimaki, Distributed Microphone Array System for Two-Way Audio Communication, Helsinki Univ. of Technology, Master's Thesis, Jun. 15, 2009, 73 pgs.
Rombouts et al., An Integrated Approach to Acoustic Noise and Echo Cancellation, Signal Processing 85, 2005, pp. 849-871.
Sällberg, "Faster Subband Signal Processing," IEEE Signal Processing Magazine, vol. 30, No. 5, Sep. 2013, 6 pp.
Weinstein, et al., "Loud: A 1020-Node Modular Microphone Array and Beamformer for Intelligent Computing Spaces," MIT Computer Science and Artifical Intelligence Laboratory, 2004, 18 pp.
Wung, "A System Approach to Multi-Channel Acoustic Echo Cancellation and Residual Echo Suppression for Robust Hands-Free Teleconferencing," Georgia Institute of Technology, May 2015, 167 pp.
XAP Audio Conferencing Brochure, ClearOne Communications, Inc., 2002.
Yamaha Corp., MRX7-D Signal Processor Product Specifications, 2016, 12 pgs.
Yamaha Corp., PJP-100H IP Audio Conference System Owner's Manual, Sep. 2006, 59 pgs.
Yamaha Corp., PJP-EC200 Conference Echo Canceller Brochure, Oct. 2009, 2 pgs.
Yan et al., Convex Optimization Based Time-Domain Broadband Beamforming with Sidelobe Control, Journal of the Acoustical Society of America, vol. 121, No. 1, Jan. 2007, pp. 46-49.
Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.
Yermeche, et al., "Real-Time DSP Implementation of a Subband Beamforming Algorithm for Dual Microphone Speech Enhancement," 2007 IEEE International Symposium on Circuits and Systems, 4 pp.
Zavarehei, et al., "Interpolation of Lost Speech Segments Using LP-HNM Model with Codebook Post-Processing," IEEE Transactions on Multimedia, vol. 10, No. 3, Apr. 2008, 10 pp.
Zhang, et al., "F-T-LSTM based Complex Network for Joint Acoustic Echo Cancellation and Speech Enhancement," Audio, Speech and Language Processing Group, Jun. 2021, 5 pp.
Zhang, et al., "Multichannel Acoustic Echo Cancelation in Multi-party Spatial Audio Conferencing with Constrained Kalman Filtering," 11th International Workshop on Acoustic Echo and Noise Control, Sep. 14, 2008, 4 pp.
Zhang, et al., "Selective Frequency Invariant Uniform Circular Broadband Beamformer," EURASIP Journal on Advances in Signal Processing, vol. 2010, pp. 1-11.
Zheng, et al., "Experimental Evaluation of a Nested Microphone Array With Adaptive Noise Cancellers," IEEE Transactions on Instrumentation and Measurement, vol. 53, No. 3, Jun. 2004, 10 pp.

\* cited by examiner

SCALABLE CONFERENCING SYSTEMS AND METHODS

CROSS-REFERENCE TO RELATED APPLICATION

This application claims the benefit of and priority to U.S. Provisional Patent Application No. 63/143,258, filed on Jan. 29, 2021, the contents of which are incorporated herein in their entirety.

TECHNICAL FIELD

Embodiments described herein relate to apparatuses, systems, and methods for audio and/or video conferencing.

DESCRIPTION OF THE RELATED ART

Audio and video conferencing has served as a launch pad for the collaboration for business of various sizes in different industry segments. Expansion of mobile workforces, globalization of businesses, and flexibility at workspaces drive the demand for conferencing services. Conferencing services can provide cost effectiveness, time savings, increased efficiency, and increased productivity. Unfortunately, existing conferencing systems have numerous shortcomings. Stand-alone device may not have the pickup coverage required in larger and more complicated conferencing room, and populating a room with a dedicated conferencing system capable of covering such rooms can be extremely complicated and expensive. It also requires extensive and expensive wiring. Customized conferencing systems having various dedicated endpoints can be expensive, difficult or impossible to move to another room, and challenging to deploy and manage. Accordingly, there exists a need for improved audio and/or video conferencing systems.

SUMMARY

A scalable conferencing system can include one or more conferencing devices configured to be placed on a surface, mounted on a ceiling, attached to a wall, or the like. The conferencing devices can be configured to be positioned in a room and pick up and/or reproduce audio in the room. Depending on the configuration and/or characteristics of the room (such as, dimensions, geometry, acoustical properties, furnishings, or the like), a plurality of conferencing devices of a particular type can be deployed in the room and/or conferencing devices of another particular type may not be deployed. The conferencing deices can implement directional pickup of audio. The pickup and reproduction by the conferencing device can be synchronized. At least some of the conferencing devices can implement a fencing feature that allows focusing the audio pickup on an audio source positioned within a fence while blocking out audio sources positioned outside the fence.

Any of the features, components, or details of any of the arrangements or embodiments disclosed in this application, including without limitation any of the device or system embodiments and any of the conferencing services embodiments disclosed herein, are interchangeably combinable with any other features, components, or details of any of the arrangements or embodiments disclosed herein to form new arrangements and embodiments.

DETAILED DESCRIPTION

Overview of Scalable Conferencing System

A scalable conferencing system for an organization can include a plurality of conferencing devices. The conferencing devices can be configured to be placed on a surface (such as, a table), mounted on a ceiling, or attached to a wall. The conferencing devices can be configured to be positioned in a room and pick up (or sense) and reproduce audio in the room. Depending on the configuration and/or characteristics of the room (such as, dimensions, geometry, acoustical properties, furnishings, or the like), a plurality of conferencing devices of a particular type can be deployed in the room and/or conferencing devices of another particular type may not be deployed. Virtual tools for designing the room and determining the number, type, and placement of the conferencing system can be provided.

A conferencing device can be assigned to a particular room. The conferencing device can cooperate with the other conferencing device(s) in the room. Conferencing devices can be calibrated for optimal or substantially optimal pick up and/or reproduction of audio. Conferencing devices can be easily moved from one room to another. If single (or even multiple) conferencing devices stop working in a particular room, this would not cause failure of the conferencing system since other conferencing device(s) can pick up and reproduce audio. The conferencing system can be used for audio and/or video conferencing.

A connecting device (sometimes referred to as a "hub device" or "hub") can connect multiple conferencing devices via a network and function as a central communication center for the room. A control device (sometimes referred to as "control") can be provided to allow a user to control conferencing system devices, control audio and/or video conferencing, or the like. Additionally or alternatively, in some cases, control can be accomplished with a computing device, such as a phone, tablet, laptop, desktop computer, etc. The conferencing devices can be configured to function cooperatively (such as, via the hub) to provide scalable, flexible, and easily deployable conferencing solution for a room of any configuration and/or characteristics. One or more of the conferencing devices can be moved from the room to another room and be configured to serve in a conferencing system for another room. Conferencing devices (sometimes referred to as "conferencing system components") can include any one or more of the devices configured to pick up and/or reproduce audio, hub, or control.

Figure 1A:
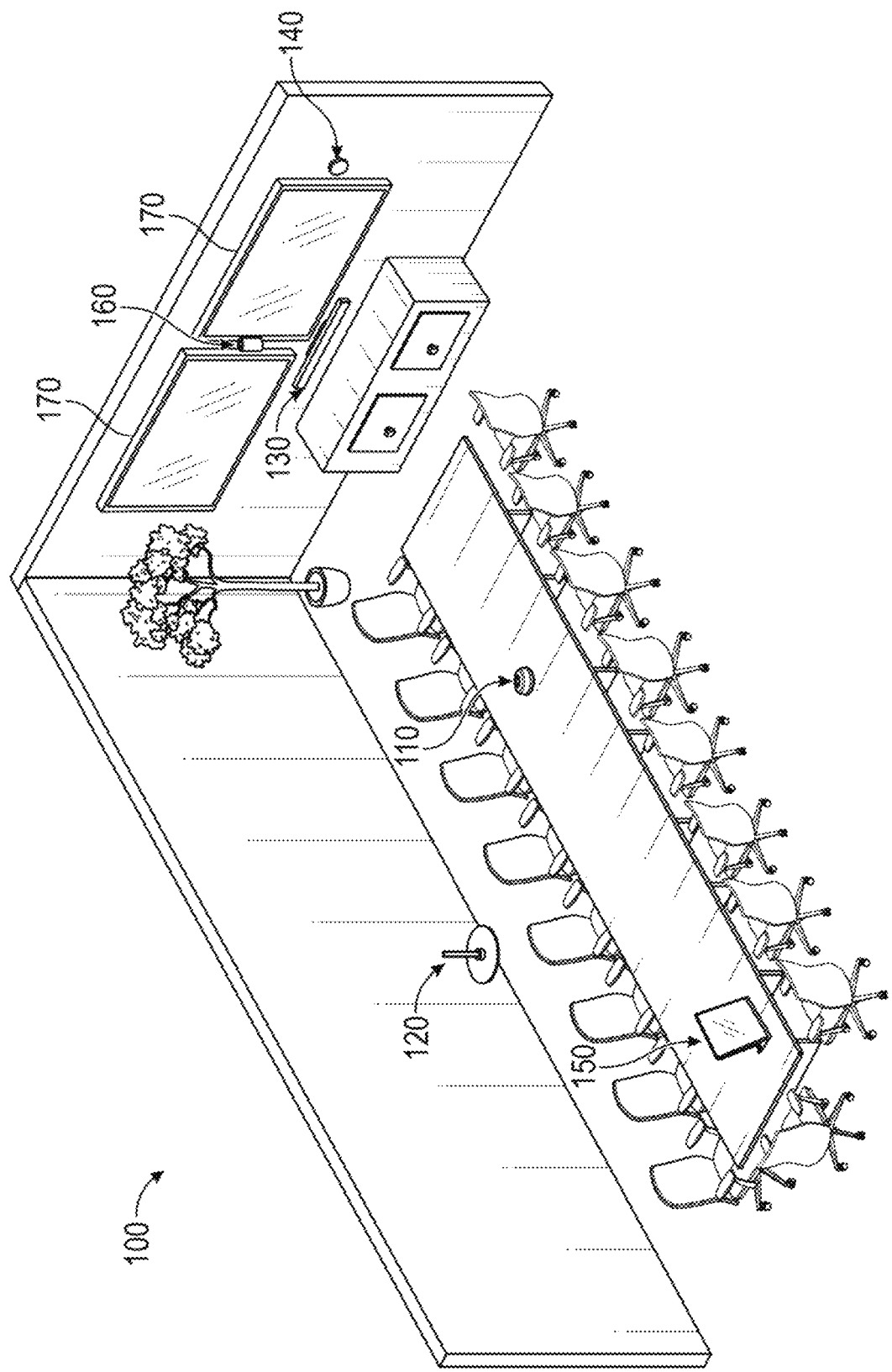
FIGS. 1A-1C illustrate a room equipped with conferencing systems.
Figure 1B:
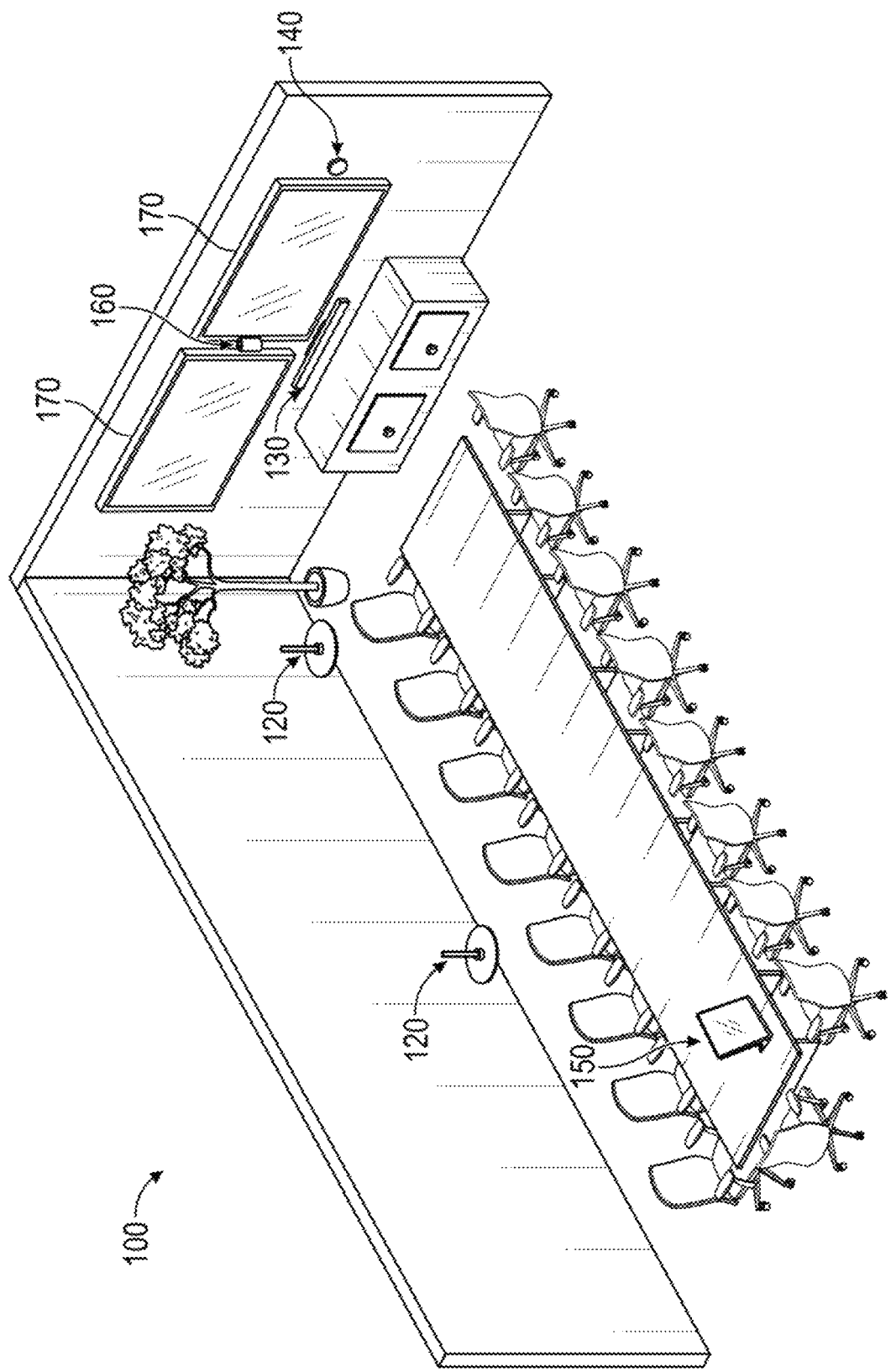
Figure 1C:
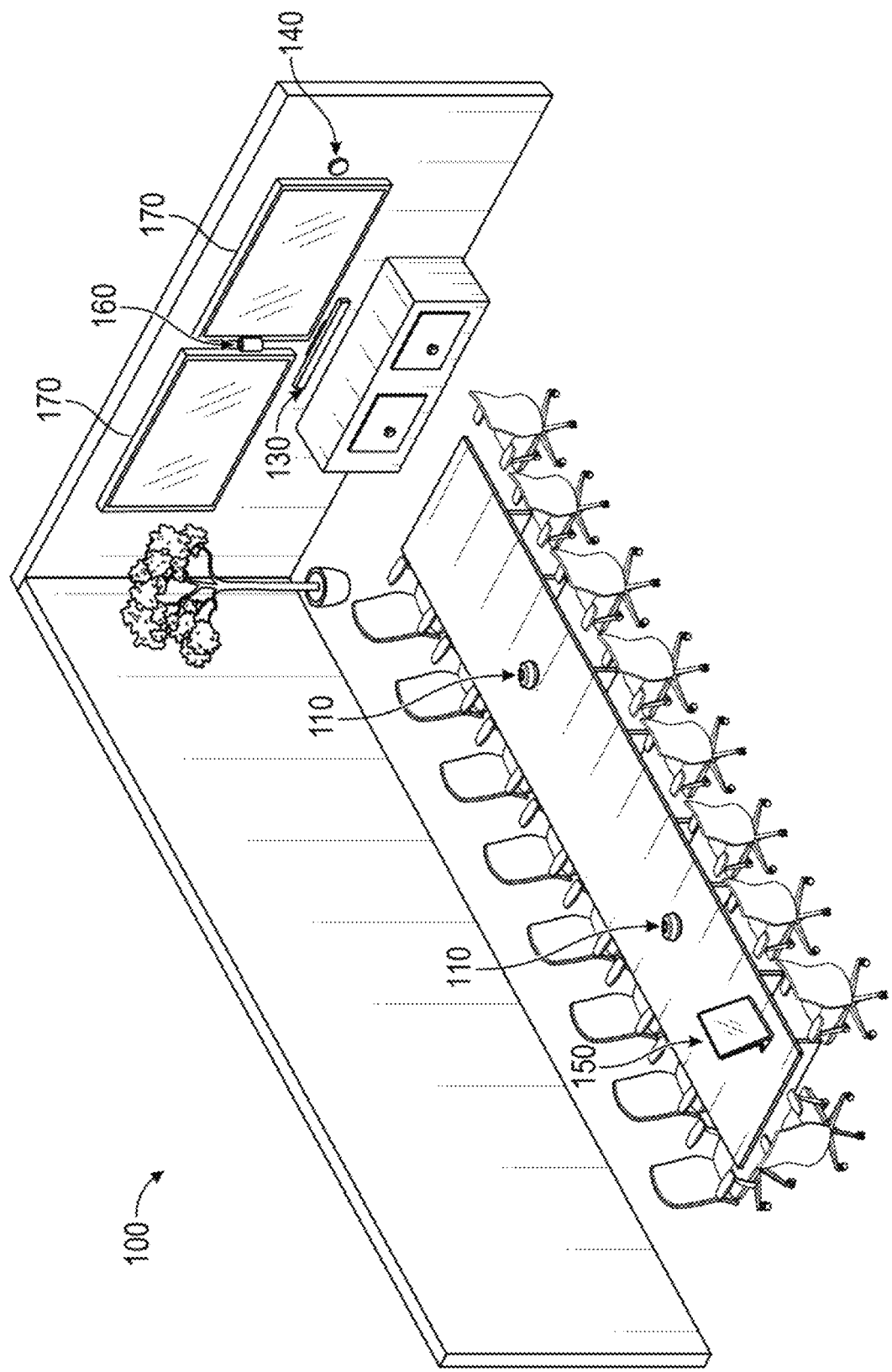
Figure 1D:
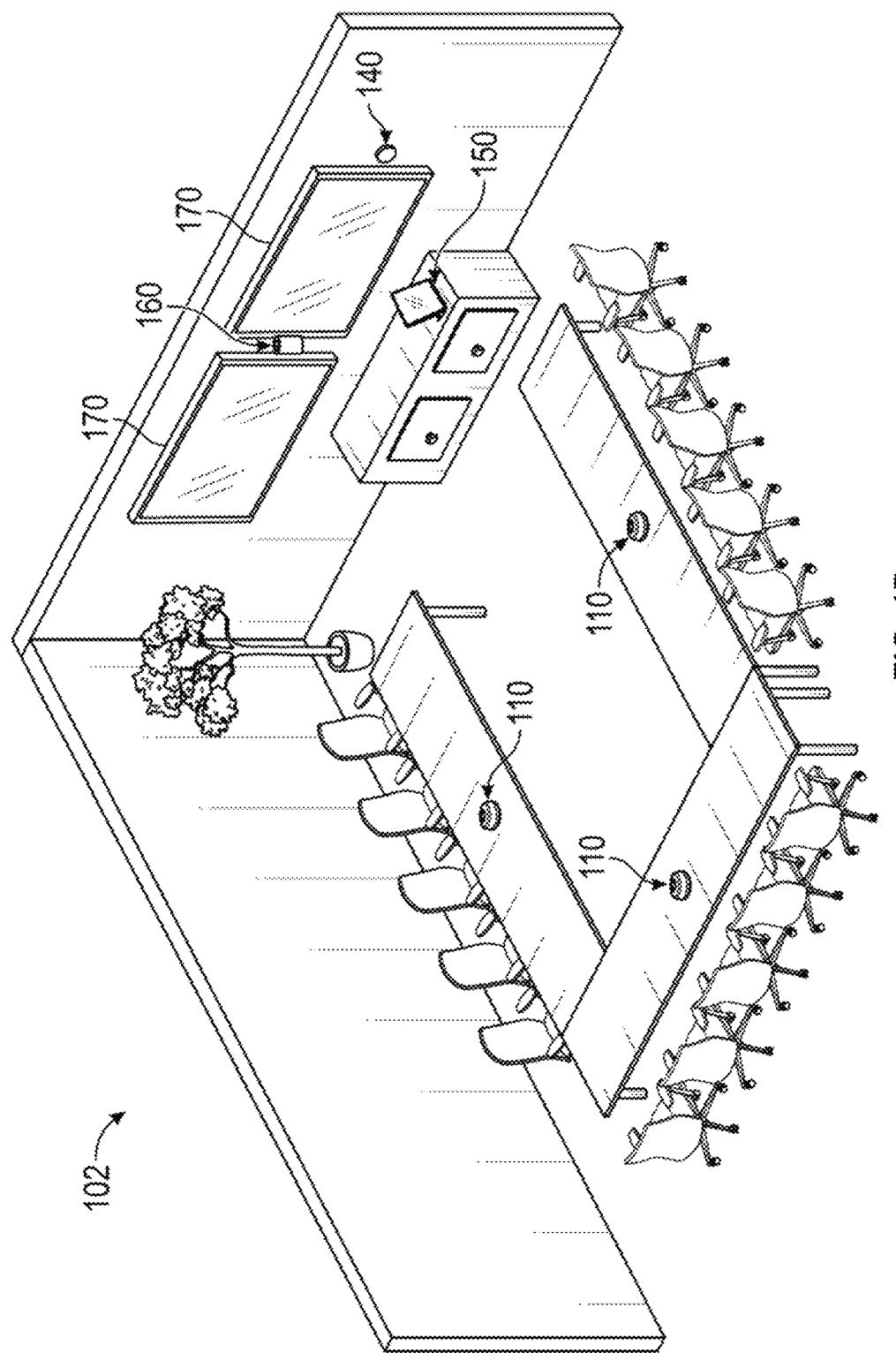
FIGS. 1D-1F illustrate another room equipped with conferencing systems.
Figure 1E:
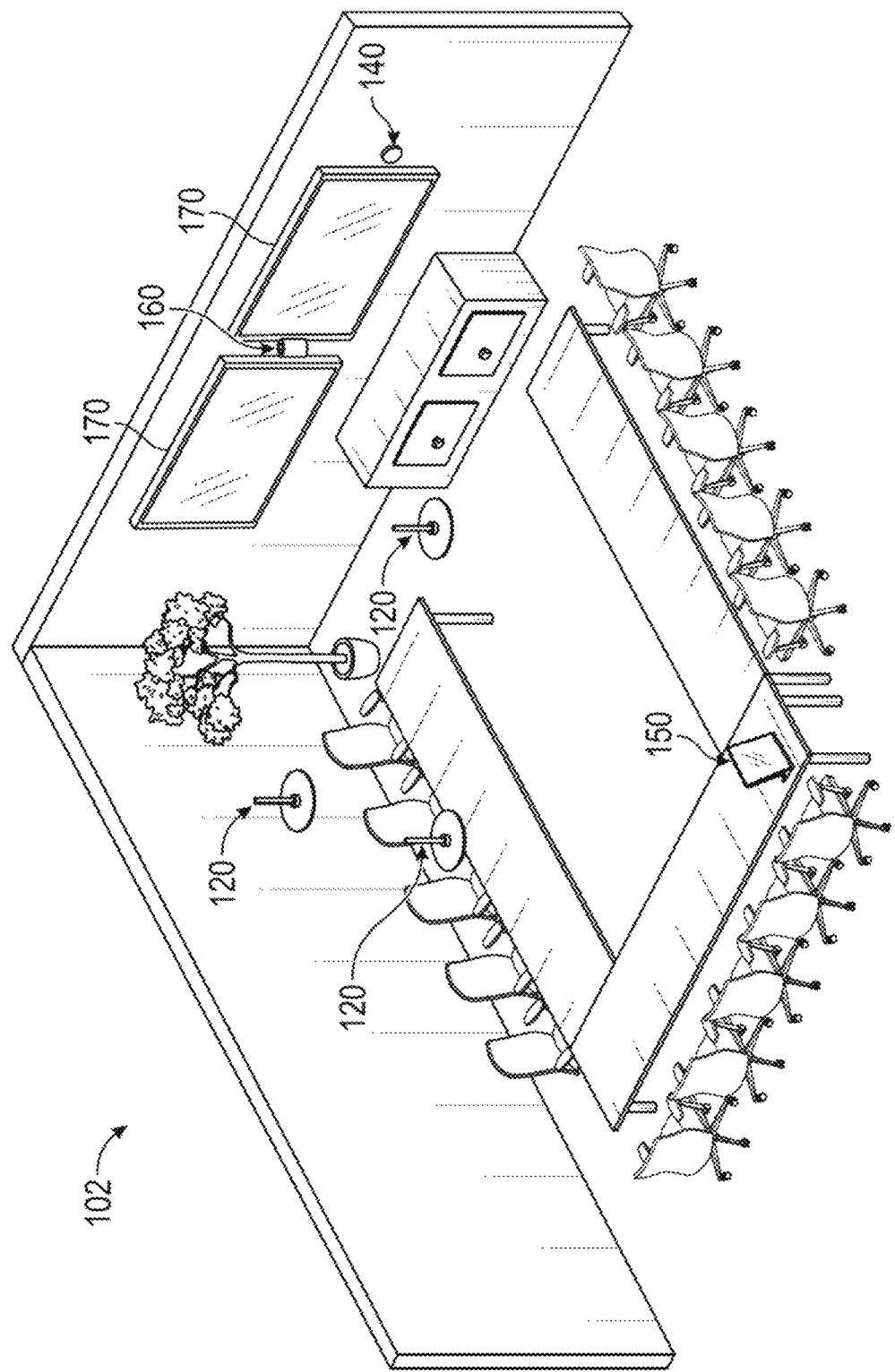

FIG. 1A illustrates a room 100 equipped with a conferencing system. The room 100 is illustrated as a rectangular conference room with a rectangular table, chairs surrounding the table, and a credenza. The conferencing system can include a conferencing device 110 (shown as being placed on the table and sometimes referred to as a "table device"), a conferencing device 120 (shown as being hung from the ceiling and sometimes referred to as a "ceiling device"), a conferencing device 130 (shown as being attached to the wall and sometimes referred to as a "wall device"), a hub 140 (shown as being attached to the wall), and a control device 150 (shown as being positioned on the table). These devices can facilitate audio conferencing. The control device 150 can be portable (such as, a portable tablet), as illustrated in FIGS. 1D and 1E. At least one of the table device or the hub can be repositioned.

Also illustrated are a camera 160 and monitors 170 (such as, flat screen televisions), which can facilitate video conferencing. In some implementations, the room 100 can be configured differently. For example, the table device 110 can be replaced with another ceiling device (as illustrated in FIG. 1B) or the ceiling device 120 can be replaced with another table device (as illustrated in FIG. 1C). The illustrated conferencing system (or any of the conferencing systems and/or conferencing devices described herein) can be compatible with various audio and/or video conferencing platforms, such as Zoom, Microsoft Teams, Google Meet, GoToMeeting, Skype, or the like.

Figure 1F:
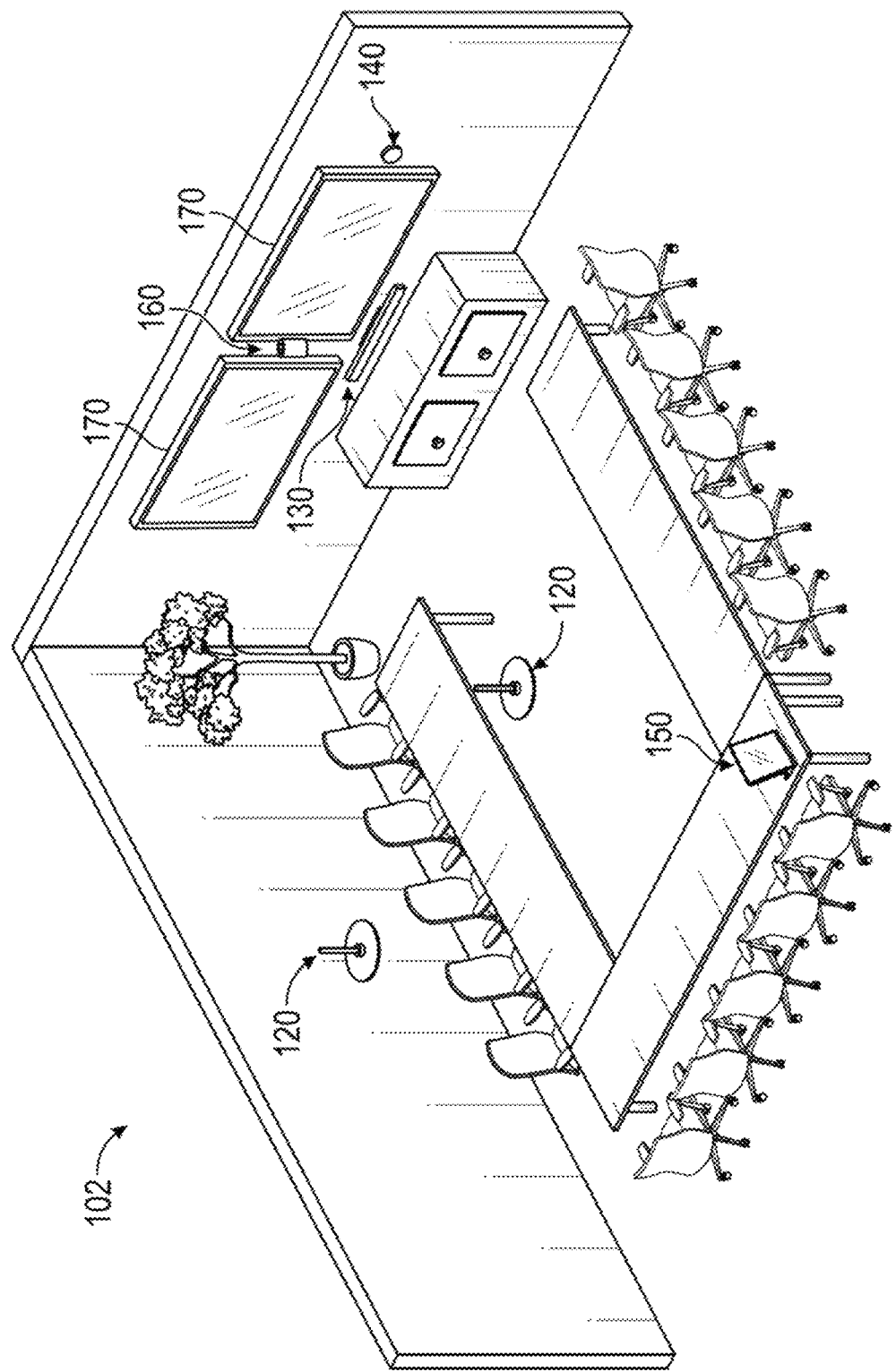

FIG. 1D illustrates a room 102 equipped with a conferencing system. The room 102 is illustrated as a rectangular conference room with a U-shaped table, chairs surrounding the table, and a credenza. The conferencing system can include three table devices 110 (shown as being placed on the table), a hub 140 (shown as being attached to the wall), and a control device 150 (shown as being positioned on the credenza). These devices can facilitate audio and/or video conferencing. Also illustrated are a camera 160 and monitors 170 (such as, flat screen televisions), which can be utilized for video conferencing. In some implementations, the room 100 can be configured differently. For example, one or more of the table devices 110 can be replaced with one or more ceiling devices (as illustrated in FIG. 1E) or one or more ceiling devices can be replaced with one or more wall devices (as illustrated in FIG. 1F).

Figure 13A:
FIGS. 13A-13C illustrate a conferencing device configured as a speaker.
Figure 13B:
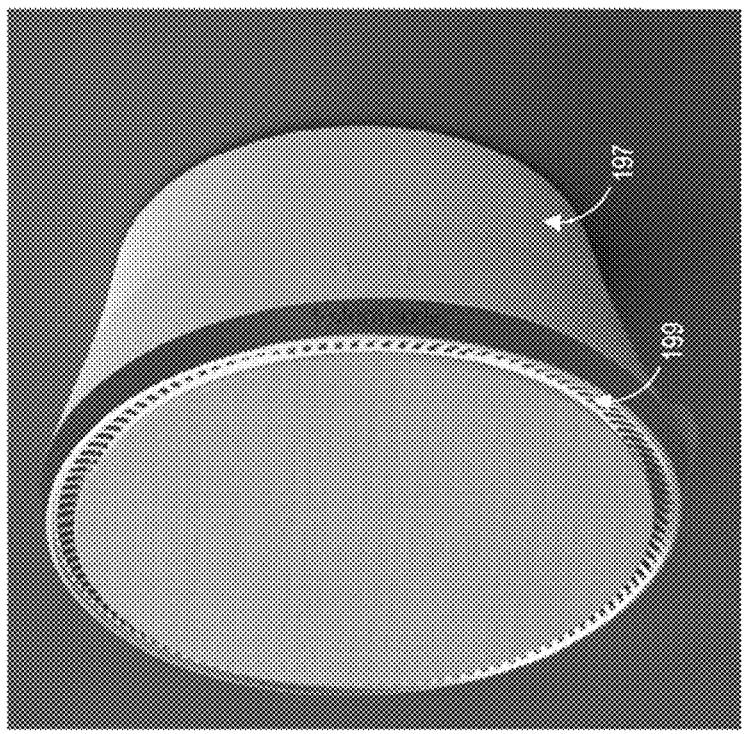
Figure 13B:
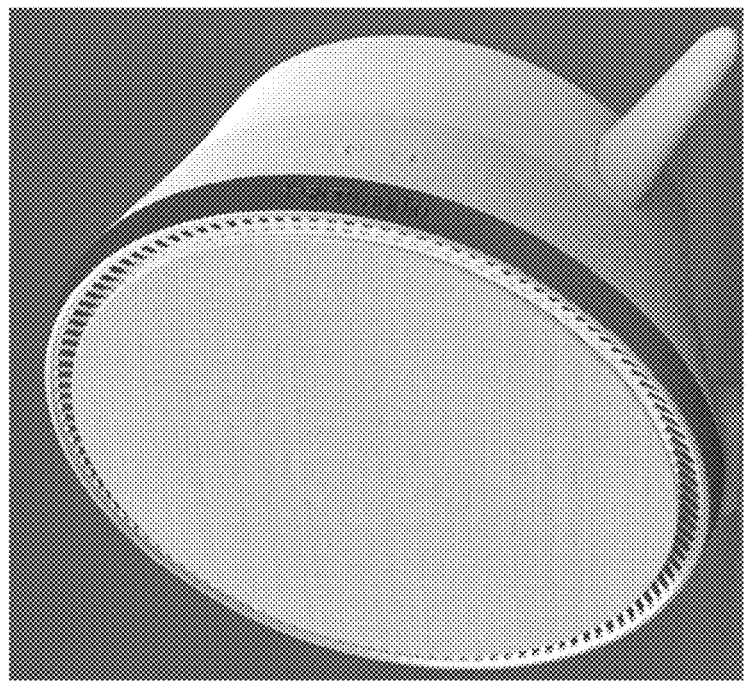

Any of the rooms illustrated in FIGS. 1A-1F can include one or more conferencing devices 190 configured to reproduce sound (sometimes referred to as a "speaker device"), which is shown in FIG. 13A-13B. Additionally or alternatively, a conferencing system in a particular room can include a ceiling device 120, a speaker device 190, and a hub 140. The ceiling device 120 can facilitate audio pickup, the speaker device 190 can facilitate audio playback, and the hub 140 can facilitate control and synchronization.

Conferencing System Components

Conferencing devices can operate standalone or a plurality of conferencing devices can be connected together (for example, via a hub). The following describes operation of various conferencing system components.

Table Device

Figure 2:
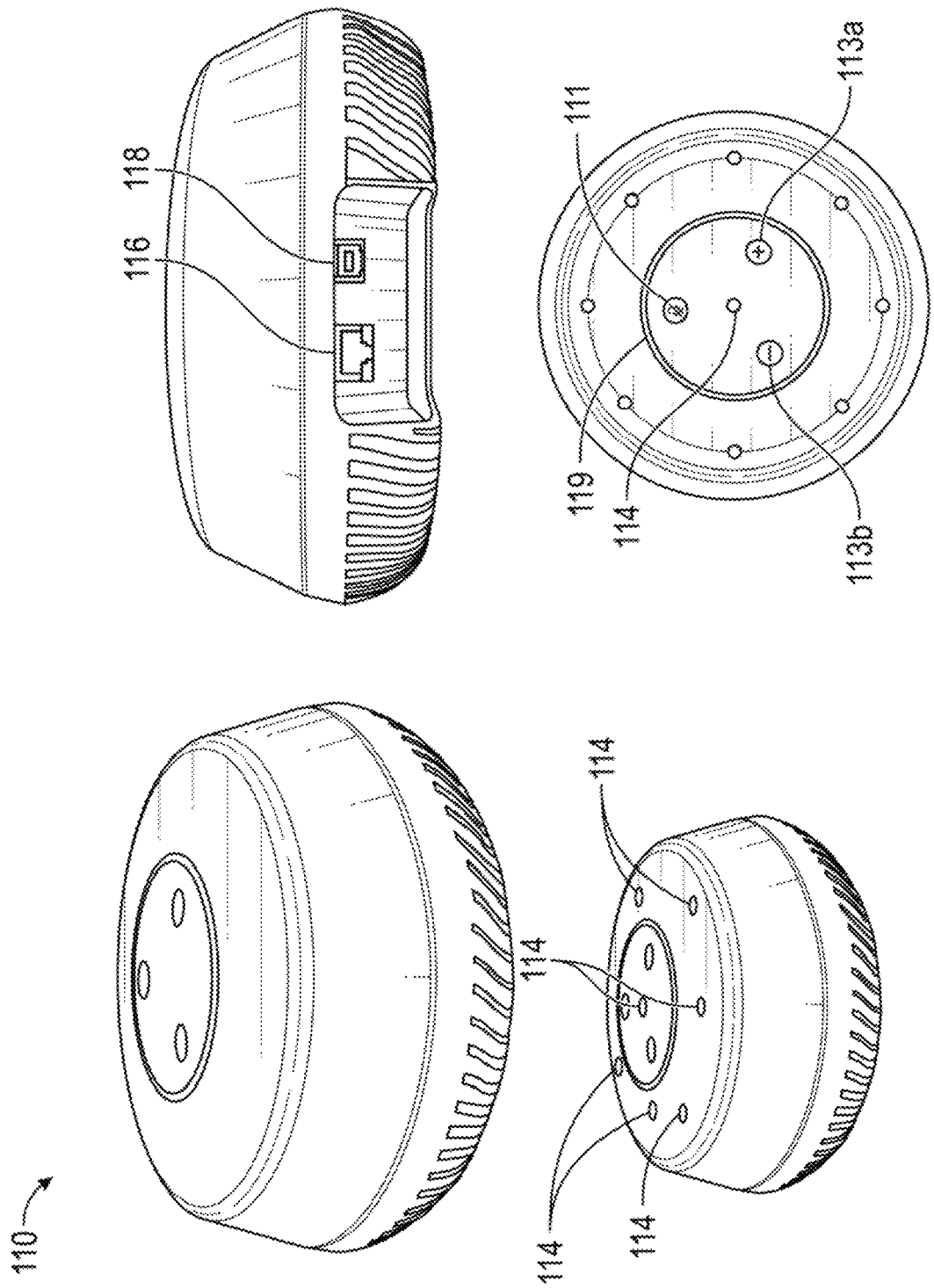
FIG. 2 illustrates a conferencing device configured to be placed on a surface.

FIG. 2 illustrates the table device 110. The table device 110 can be sized for placement on flat surfaces, such as table tops. The table device 110 can include a speakerphone. The table device 110 can include one or more speakers 112. In some cases, the one or more speakers 112 can face downward, which can facilitate propagation of sound along a surface and result in better distribution of sound.

The table device 110 can have a user interface. The user interface may include one or more of a mute control 111 (such as, a button), volume controls (such as, volume up button 113A and volume down button 113B), and a visual indicator 119. The visual indicator 119 can be a light ring, as illustrated in FIG. 2. The visual indicator 119 can indicate status of the table device 110. For example, the visual indicator 119 can indicate one or more of an error (such as, by turning red), restart (such as, by turning blue), mute (pulsing red), power on, or the like. In some implementation, any of the conferencing devices can include additional or alternative indicators, such as audio, tactile, visual, or the like.

The table device 110 can include one or more microphones 114 (sometimes referred to as a "microphone array"). In some implementations, the table device 110 can include one microphone, two microphones, three microphones, four microphones, five microphones, six microphones, seven microphones, eight microphones, nine microphones, ten microphones (or more), or the like.

The microphones 114 can be arranged to facilitate beamforming using any of the approaches described herein. For example, the microphones 114 can be positioned around the perimeter of the table device 110, such as around the perimeter of the top surface as shown in FIG. 2. Positioning of the microphones 114 at or close to the edge of the top surface of the table device 114 and closely to one another can one or more of increase the aperture of the microphone array, reduce the level (such as, power) of the side lobes (particularly, when the microphones 114 are positioned close to each other), and improve performance of the beamforming. For example, the directionality (which can relate to the beam width of the beamformer) or directional response of the beamformer can be improved. As is illustrated in FIG. 2, one or more microphones 114 can be positioned in or close to the center (or middle) of the table device 114. Such one or more centrally-positioned microphones 114 can participate in forming multiple (or all) beams during beamforming. One or more of such positioning of the one or more microphones 114 or increasing the number of the one or more microphones 114 (which can result in decreasing the distance between the microphones) can at least one of increase the aperture of the microphone array, reduce the level of the side lobes, and improve performance of the beamforming. The table device 110 can include electronic circuitry that performs beamforming. The electronic circuitry can include one or more controllers or processors (such as, one or more digital signal processors (DSP)). The electronic circuitry can include one or more memories, any of which can be volatile or non-volatile. Any of the conferencing devices described herein can include such electronic circuitry.

Positioning the one or more microphones 114 (for example, on the top surface of the table device 110) to face away from the one or more speakers 112 (which can be positioned facing downward) can improve performance of echo cancellation. In such arrangement, the one or more microphones can be blind (or deaf) to the one or more speakers 112. In some cases, the one or more microphones 114 or the one or more speakers 112 can be positioned differently in the table device 110 or in any other conferencing devices described herein. For example, the one or more microphones 114 can be positioned on the side surface of the table device 110.

During conferencing, the table device 110 can utilize beamforming to locate a sound source. As described herein, beamforming can form one or more directional beams (or audio beams). When audio (such as, voice or speech) is detected in the room, the visual indicator 119 can indicate, for example via one or more blue (or different color) lights, the direction of focus of the audio beam. This can indicate the direction of location of the audio source, such as a speaker, or directions of locations of multiple audio sources (such as, multiple speakers speaking at the same time). Beamforming can allow focusing on the speaker(s) in the room while canceling out other noise.

The table device 110 can include a port 116 for connecting to a communications network, such as, Ethernet or another local area network. The port 116 can be configured to facilitate a connection via power over Ethernet protocol (such as, PoE+). Such connection can facilitate transmission of power and data over Ethernet cabling. As a result, a separate power connection (or power source) may not be needed. The table device 110 can include a universal serial bus (USB) port 118 (or another port for receiving and/or transferring data using a communications protocol). When the table device 110 is used as standalone device without being connected to one or more other conferencing devices in the room, the USB port 118 can be used to connect a computing device (such as, a laptop, personal computer, or the like). Such connection can facilitate audio and/or video conferencing. When the table device 110 is grouped with one or more other conferencing devices in the room, connection over the USB port 118 may be unnecessary.

Ceiling Device

Figure 3:
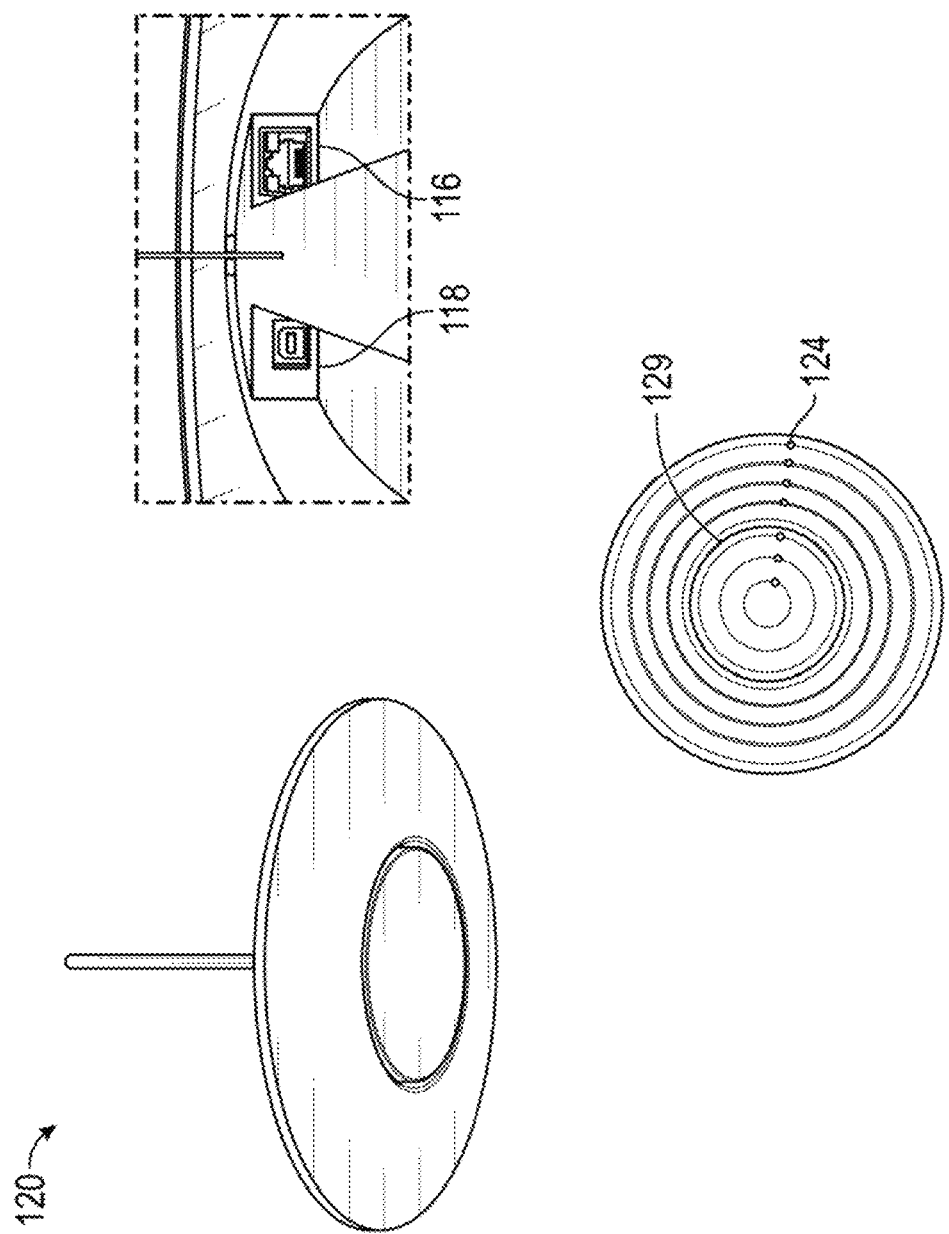
FIG. 3 illustrates a conferencing device configured to be mounted on a ceiling.

FIG. 3 illustrates the ceiling device 120. The ceiling device 120 can be mounted to the ceiling. For example, the ceiling device 120 can be hung from the ceiling in a chandelier mode. The ceiling device 120 can include one or more speakers, which can be positioned facing down. In some cases, the ceiling device 120 may not include any speakers and may be utilized solely for audio pickup (or sampling).

The ceiling device 120 can include one or more microphones 124 (sometimes referred to as a "microphone array"). In some implementations, the ceiling device 120 can include one microphone, two microphones, ten microphones (or less or more), twenty microphones (or less or more), thirty microphones (or less or more), forty microphones (or less or more), fifty microphones (or less or more), sixty microphones (or less or more), seventy microphones (or less or more), eighty microphones (or less or more), ninety microphones (or less or more), one hundred microphones (or less or more), or the like. The microphones 124 can be arranged to facilitate beamforming (which can be performed by electronic circuitry, as described herein). The microphones 124 can be distributed throughout one or more rings of the ceiling device 120. The microphones 124 can be spaced apart at equal distance(s) within each of the rings. With reference to FIG. 3, the microphones 124 can be distributed throughout the concentric rings of the ceiling device 120. The microphones 124 can be distributed throughout the seven concentric rings of the ceiling device 120. Each of the outer rings can include 16 microphones (that can be equally spaced apart) and the inner ring can include four microphones (which can be equally spaced apart). The ceiling device 120 can implement beamforming using any of the approaches described herein.

With reference to FIG. 3, the ceiling device 120 can include a visual indicator 129, which can be similar to the visual indicator 119 described herein. For instance, the visual indicator 129 can be a light ring. The visual indicator 129 can provide indication that the ceiling device 120 is powered on. In some cases, it may be possible to determine the direction of the focus of an audio beam, which can be indicative of the location of the speaker. In such cases, the visual indicator 129 could indicate the direction of focus of the audio beam (and direction of the speaker), as described herein.

As explained herein, the ceiling device 120 can include the port 116 for connecting to a communications network and the USB port 118, which can be positioned on the top portion of the ceiling device 120.

Wall Device

Figure 4:
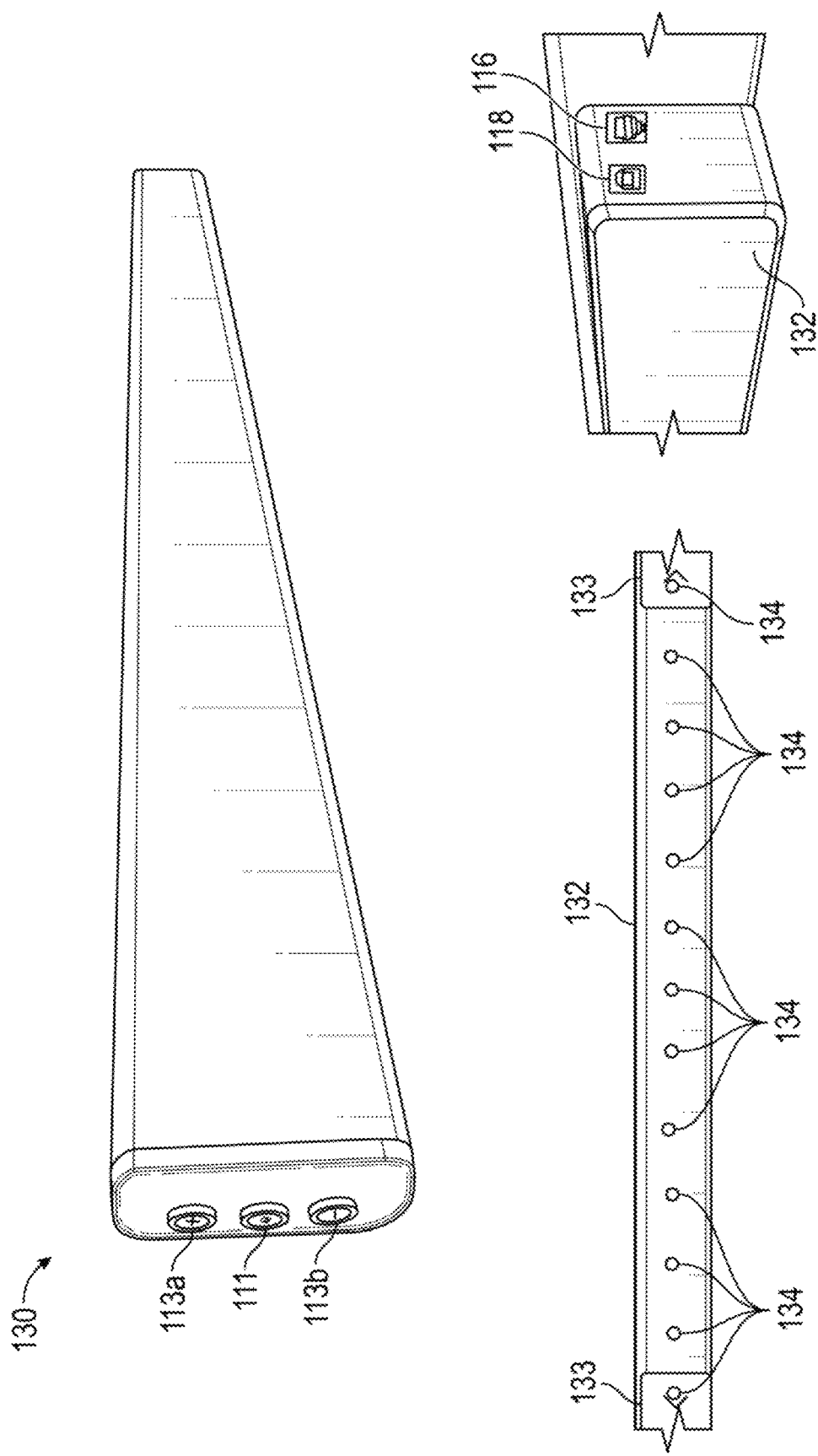
FIG. 4 illustrates a conferencing device configured to be attached to a wall.

FIG. 4 illustrates the wall device 130, which can be a sound bar. The wall device 130 can include one or more speakers 133, such as full range speakers. The wall device 130 can include one or more subwoofers 132. For example, the one or more subwoofers 132 can be positioned at the rear of the wall device 130. The wall device 130 can include a mounting interface (such as, one or more grooves, holes, or the like) to facilitate attaching the wall device 130 to a wall. The mounting interface can be positioned at the rear of the wall device 130. In some instances, there can be provided a mounting bracket that can be mounted to the wall and can support the wall device 130.

The wall device 130 can support a camera (such as, the camera 160) to facilitate video conferencing. For example, the wall device 130 can include one or more of grooves, holes, brackets, or other mounting interface or adapter components to support the camera. These can be positioned, for instance, on top (or bottom) surface of the wall device 130.

The wall device 130 can include one or more microphones 134 (sometimes referred to as a "microphone array"). In some implementations, the wall device 130 can include one microphone, two microphones, five microphones (or less or more), ten microphones (or less or more), fifteen microphones (or less or more), twenty microphones (or less or more), or the like. The microphones 134 can be arranged to facilitate beamforming (which can be performed by electronic circuitry, as described herein). For example, the microphones 134 can be distributed along the front of the wall device 130, as illustrated in FIG. 4. The microphones 134 can be evenly spaced apart or unevenly spaced apart. In some cases, a subset of the microphones 134 can be spaced closer together than the other microphones. This way, the level of the side lobes can be reduced without increasing the number of the microphones 134 in the microphone array. For example, the microphones 134 positioned in the middle of the wall device 130 can be spaced closer to each other than the microphones 134 positioned at the ends. The wall device 130 can implement beamforming using any of the approaches described herein. As described herein, the number of the microphones 134 and their positioning can advantageously improve the directionality of the microphone array 134 of the wall device 130, reduce the level of the side lobes, and improve the performance of the beamforming.

As described herein, the wall device 130 can include the mute control 111 and one or more volume controls 113A and 113B. The wall device 130 can include a visual indicator (not shown), which can be similar to the visual indicator 119 described herein. For example, the visual indicator can indicate the direction of the focus of an audio beam (and direction of the speaker). The visual indicator can be positioned on the front of the wall device 130. As explained herein, the wall device 130 can include the port 116 for connecting to a communications network and the USB port 118. The ports can be positioned on a side portion at the rear of the wall device 130.

Speaker Device

Figure 13C:
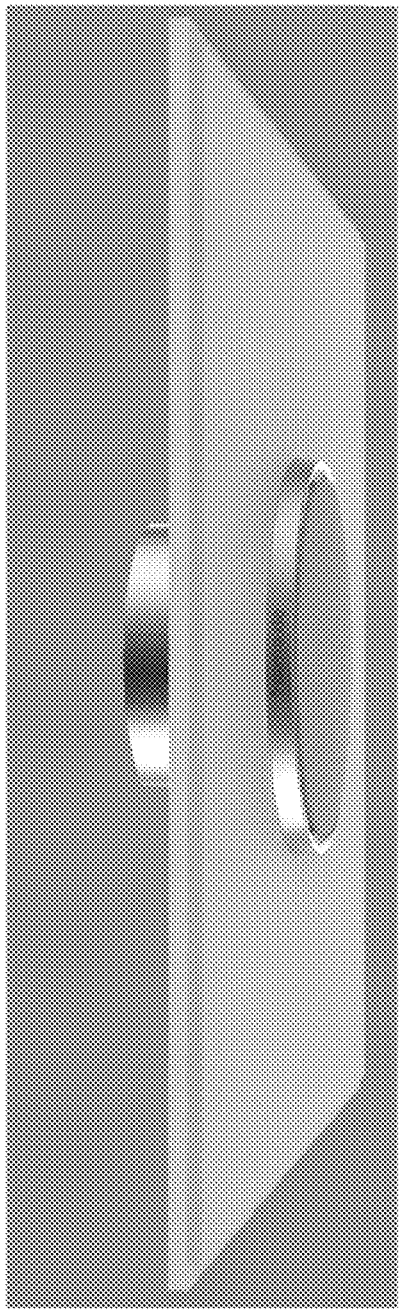
Figure 13C:
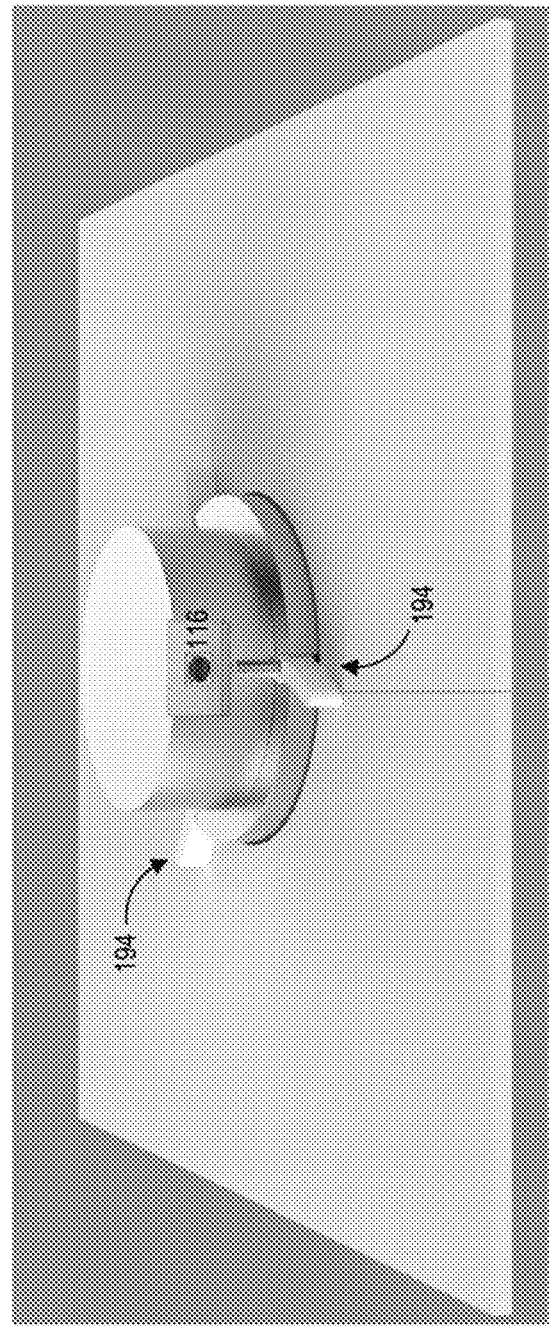

FIGS. 13A-13C illustrate the speaker device 190. The speaker device 190 can be configured to reproduce sound. The speaker device 190 may not have microphones. With reference to FIG. 13B, the speaker device 190 can be placed on a flat surface (such as, a table) or mounted to a wall. With reference to FIG. 13C, the speaker device 190 can be mounted to a ceiling tile. With reference to FIG. 13A, the speaker device 190 can include a detachable cover (or housing) 196. A pair of supports (or legs) 198 can be attached to the cover 196 for placing the speaker device 190 on a flat surface. Each of the supports 198 can be attached to the cover 196 by one or more screws. The supports 198 can be removed (and replaced by caps 197) when the speaker device 190 is mounted to the wall. The caps 197 can be removable (for example, snap on). The cover 196 can be connected to a housing 192 of the speaker device 190 by one or more screws or snap onto to the housing. The cover 196 can include one or more holes for mounting the speaker device 190 to the wall.

With reference to FIGS. 13A and 13C, the cover 196 can be removed for mounting the speaker device 190 to a ceiling tile. A plurality of flanges 194 (such as, three or four flanges) can be retracted to mount the speaker device 190 to the ceiling tile. The flanges 194 can be moved between a retracted (or closed) position (illustrated in FIG. 13A) when the speaker device 190 is not mounted to the ceiling tile and an extended (or open) positon (illustrated in FIG. 13C) when the speaker device 190 is mounted to the ceiling tile. The flanges 194 can be pivotally attached to the housing 192 to permit the flanges 194 to move between the retracted and extended positions.

The speaker device 190 can have volume controls 113A and 113B. The speaker device 190 can include a mute control (not shown), as described herein. The speaker device 190 can have a visual indicator 199, which can be similar to the visual indicator 129 of the ceiling device 120. As illustrated in FIG. 13B, the visual indicator 199 can be a light ring. The visual indicator 199 can be positioned at or adjacent to the outer edge of the speaker device 199. With reference to FIG. 13C, the speaker device 190 can include the port 116 for connecting to a communications networks, as described herein. The cover 196 can include an opening to facilitate connection to the port 116. The speaker device 190 can include a USB port (not shown), as described herein.

Hub

Figure 5:
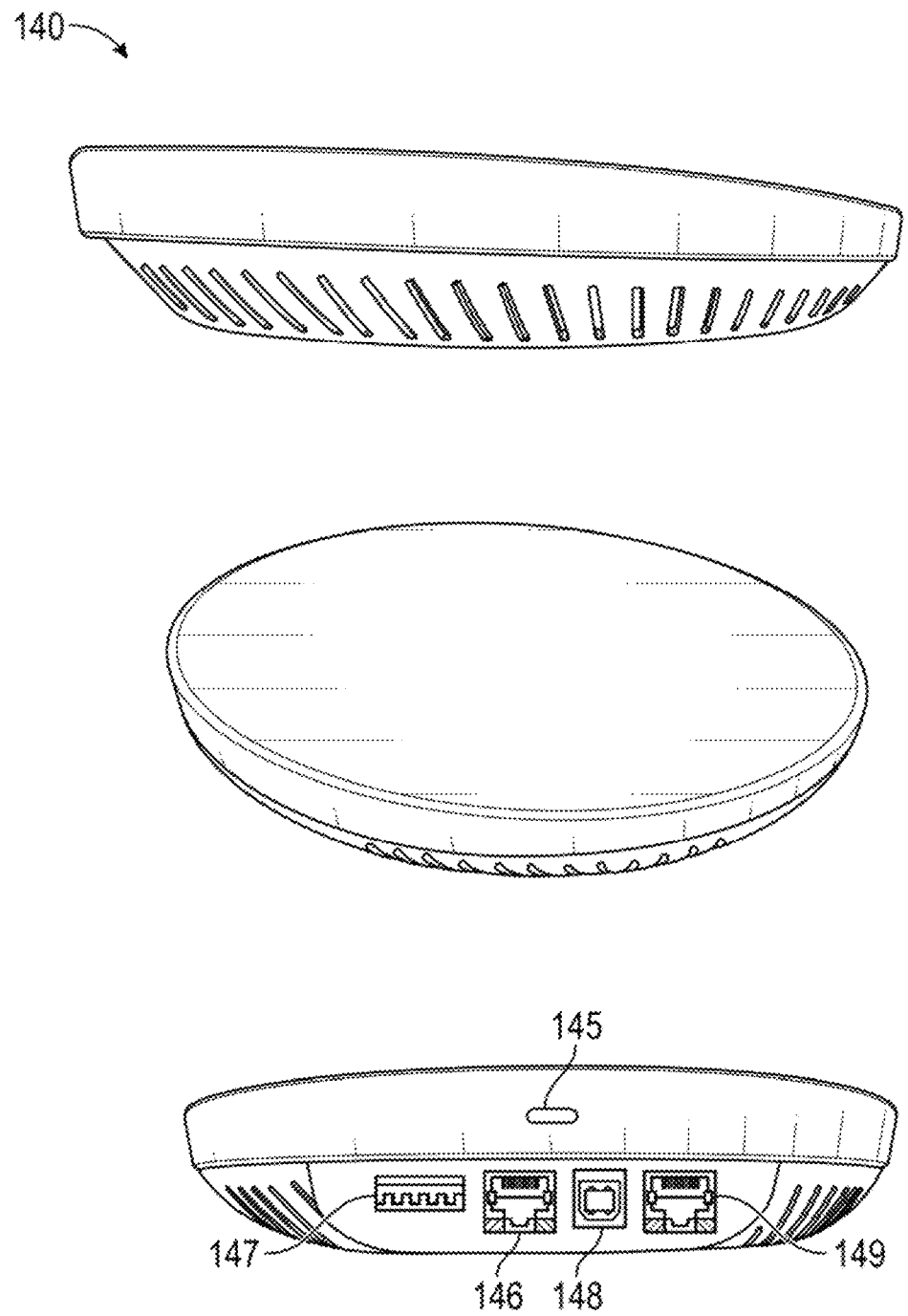
FIG. 5 illustrates a hub for a conferencing system.

FIG. 5 illustrates the hub 140. The hub 140 can connect multiple conferencing devices through a communications network, such as Ethernet or another local area network. The hub 140 can facilitate control and synchronization of multiple conferencing devices. The hub 140 can function as a communications center in a room and facilitate communication between multiple conferencing devices and the computing device running audio and/or video conferencing platform. As described herein, the hub 140 can receive audio from the plurality of conferencing devices in the room, process the received audio, and provide a single audio output to the audio and/or video conferencing platform. The hub 140 can synchronize audio playback and/or pickup by the plurality of conferencing devices and/or external speakers.

The hub 140 can be utilized in the room when more than one conferencing device is connected in the room, when external speakers (for example, ceiling speakers) are being used, when Dante connectivity (which delivers low-latency digital audio over a network, such as Ethernet) is being used, or the like. The hub 140 may be configured to connect up to ten (or less or more) conferencing devices in the room.

With reference to FIG. 5, the hub 140 can include a port 146 (which can be similar to the port 116) for connecting to the communications network. The hub 140 can include a USB port 148 (which can be similar to the port 118) for connecting to the computing device running the audio and/or video conferencing platform. In some cases, the hub 140 can be connected to the communications network and the computing device to facilitate audio and/or video conferencing in the room. The hub 140 can include a port 149 for connecting using the Dante protocol. The hub 140 can facilitate communications using the Dante protocol for all conferencing devices in the room. The hub 140 can include a port 147 for connecting to external speakers. One or more of these ports can be positioned on the rear side of the hub 140.

The hub 140 can include a security interface to prevent or discourage theft. For example, the security interface can be a slot 145 (such as, a Kensington lock slot). Any of the conferencing devices (such as, the table device, ceiling device, wall device, speaker device, or control device) can include the security interface, such as the slot 145. The hub 140 can include a mounting interface (such as, one or more grooves, holes, or the like) for attaching the hub to a wall (for example, see FIG. 1A). The mounting interface can be positioned on the bottom side of the hub 140.

Control Device

Figure 6:
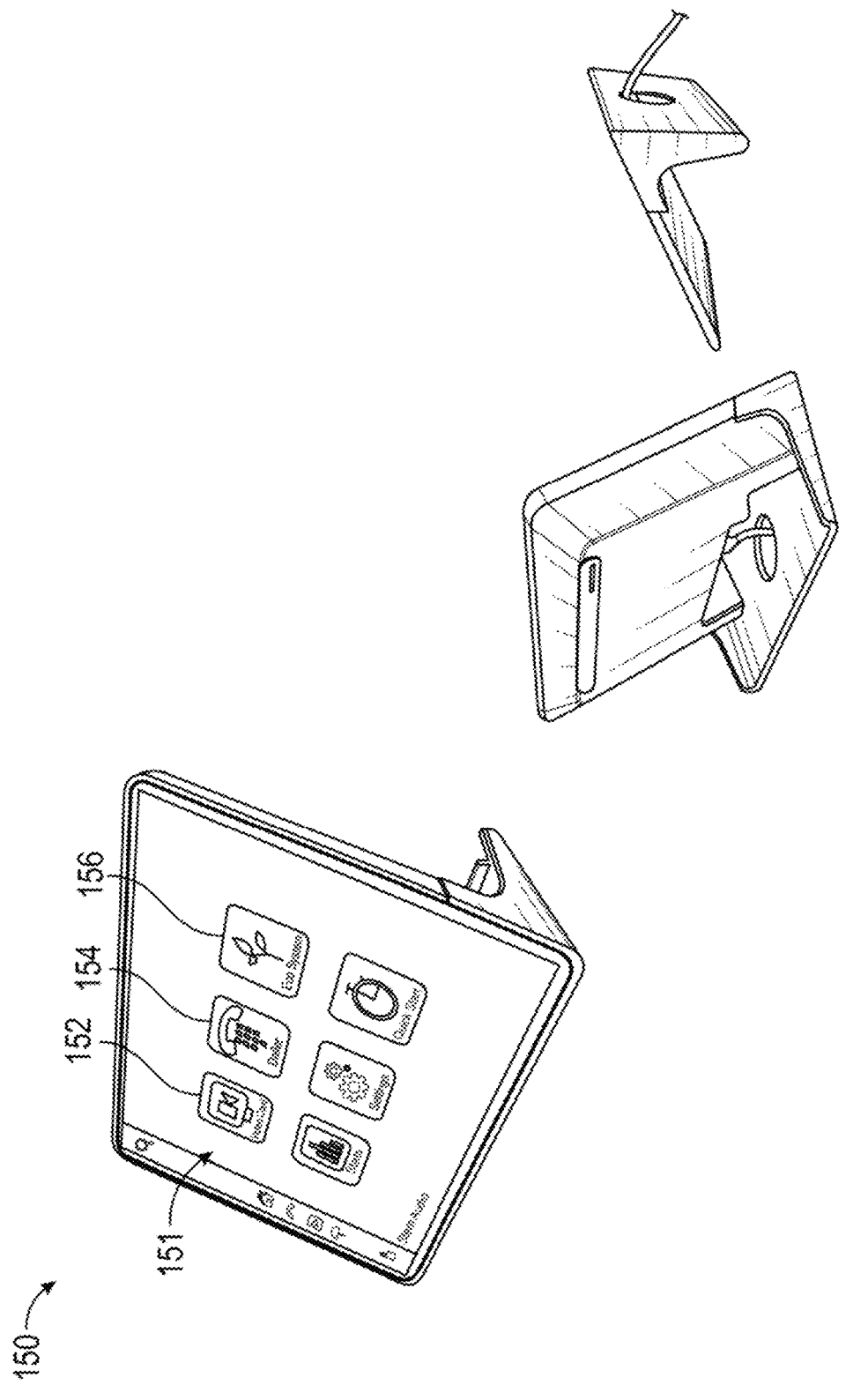
FIG. 6 illustrates a control device for a conferencing system.

FIG. 6 illustrates a control device 150. Among other features, the control device 150 can allow managing a conferencing system platform, including managing conferencing devices in the room (or in other rooms), and function as an in-meeting controller for audio and/or video conferencing. The control device 150 can include a user interface 151, which can be accessible via a touch screen display as shown in FIG. 6. The control device 150 can be configured to facilitate audio conferencing (for instance, via a dial pad application 152 accessible via the user interface), video conferencing (for instance, via a video conferencing application 154 accessible via the user interface), and manage the conferencing system platform (for instance, via an ecosystem application 156 accessible via the user interface). In some cases, one or more applications accessible via the control device can be accessed by using another computing device to navigate to an appropriate web-address or IP-address (for instance, using a web browser). Any of the conferencing devices described herein can implement control software accessible via an HTML interface such that any of conferencing devices can be managed via accessing the web-address or IP-address of the particular conferencing device.

The control device 150 can run an operating system, such as Android, Windows, or the like. The control device 150 can be connected to the communications network via a port 146, which may be located on the rear of the control device. The control device 150 can be positioned standing up (such as, display being at 60° angle to the horizontal), laid down (such as, the display being at a 45° angle), or mounted on a swivel.

Connecting Conferencing System Components

Figure 7:
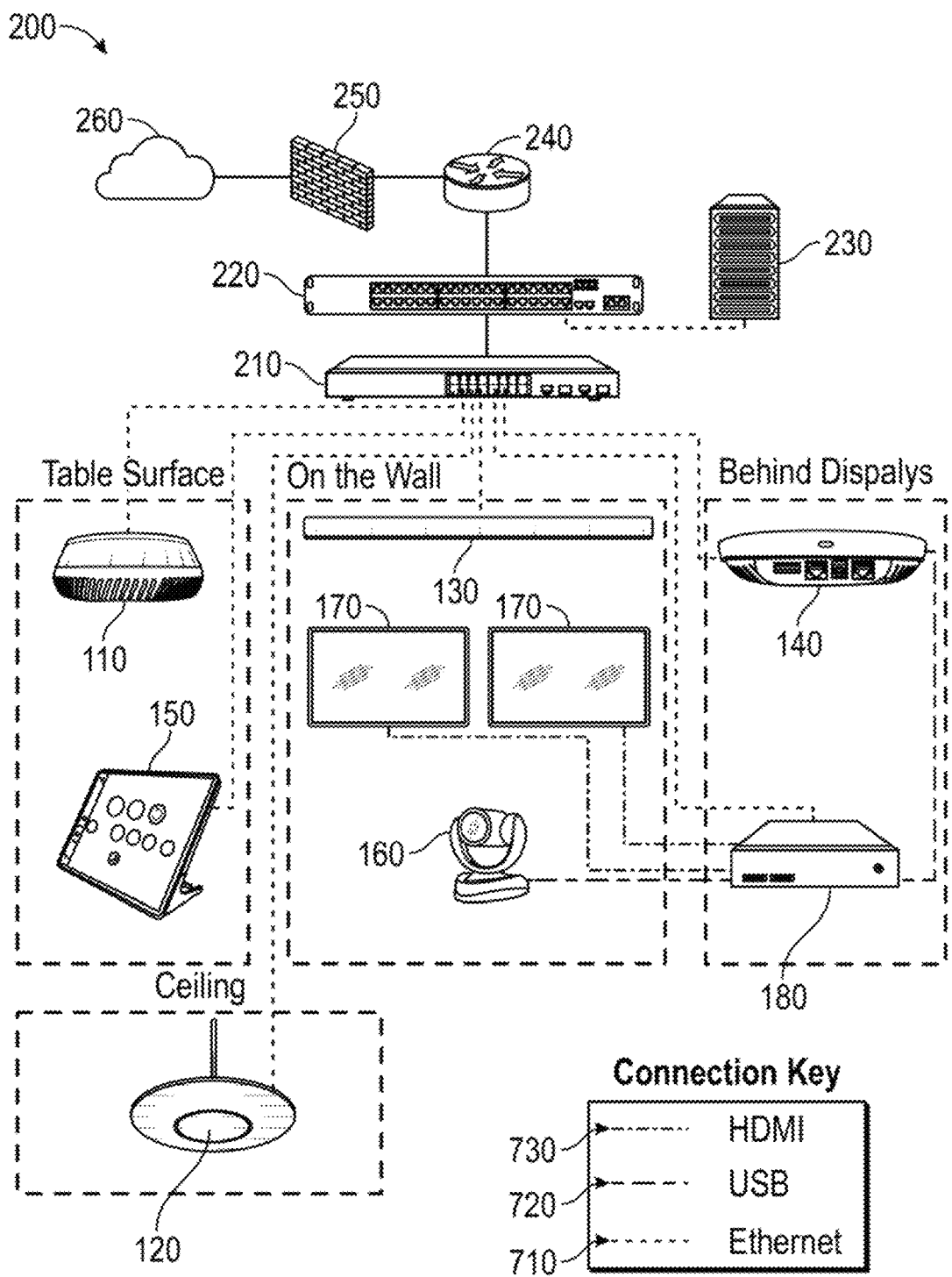
FIG. 7 illustrates a schematic for connecting components of a conferencing system.

FIG. 7 illustrates a schematic 200 for connecting components of a conferencing system, such as the conferencing system illustrated in FIG. 1A. Conferencing devices, including one or more of the table device 110, the ceiling device 120, the wall device 130, the hub 140, and the control device 150 can be connected to a communications network 710, which can be a PoE+ network. The hub 140 can be connected to a computing device 180 (illustrated as a personal computer), which can run the audio and/or video conferencing platform. Such connection can be formed over a data connection 720 (for instance, a USB connection). The camera 160 can be connected to the computing device via the data connection 720. One or more monitors 170 can be connected to the computing device via a video connection 730, such as an HDMI connection.

The communications network 710 can include one or more of a switch 210 or a switch 220. The switch 210 can provide (or inject) power to support PoE+. The switch 220 can be an Ethernet switch that does not inject power. In some cases, the switch 220 can inject power, and the switch 210 can be omitted. The switch 220 can be connected to a server 230 via an Ethernet connection. The server 230 can be a network server for the organization. A router 240 for the organization can be connected to the Internet 260. The router 240 can be positioned behind a firewall 250. In some cases, the router 240 can include the firewall 250 (which can be a hardware and/or software firewall). Audio and/or video information can be transmitted to participants on the other end (or side) of the conferencing or received from the other end of the conferencing via the Internet 260.

Managing Conferencing System Platform

As described in the foregoing and below, the conference system platform can be managed in various ways, including creating a room, managing the room, or the like. As described herein, managing the conferencing system platform can be accomplished via the user interface of the control device 150 (for example, the ecosystem application 156) or with another computing device (from within the organization's communications network or remotely). Additional details of managing the conference system platform are described in Appendix A. One or more features in this detailed description can be combined with one or more features disclosed in Appendix A.

Figure 8:
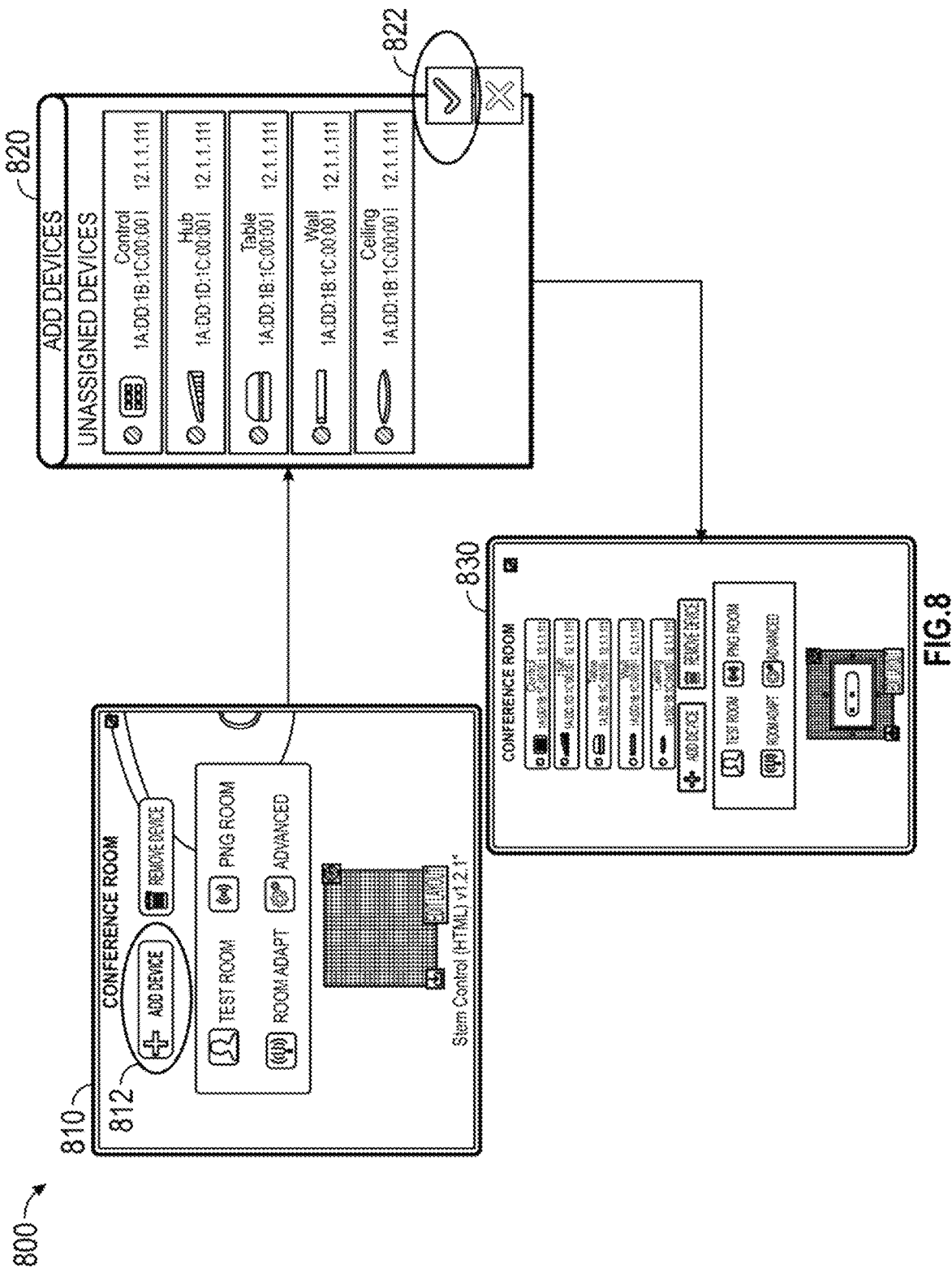
FIG. 8 illustrates a process of setting up a conferencing system in a room.

FIG. 8 illustrates a process 800 of setting up a conferencing system in a room. In some cases, the process 800 assumes that the room had already been created in the conferencing system platform. If the room has yet been created, as described in Appendix A, a user can first create a room by utilizing "Add New Room" feature accessible via the user interface of the control device 150 (for example, the ecosystem application 156 that configures the conferencing platform) or with the computing device. To add one or more conferencing devices to the room (named "Conference Room" as illustrated), the user can access a user interface screen 810 and select option 812 to "Add Device." Next, the user can select via a user interface screen 820 one or more conferencing devices to be added to the room. The user interface screen 820 illustrates conferencing devices that have been plugged into the communications network (such as, the communications network 710), but have not been assigned to a room. The user can select one or more such conferencing devices (for example, by selecting one or more conferencing devices that are positioned in the room) and click the checkmark 822. As illustrated in the user interface screen 830, the selected conferencing device(s) are assigned to the room. As described herein, the conferencing devices can cooperate to facilitate audio and/or video conferencing. Similar process can be followed to remove one or more conferencing devices from being assigned to the room.

In some cases, when a conferencing device is assigned to a room, the room assignment can be stored in memory of the conferencing device (such as, memory of the electronic circuitry). The conferencing device assigned to the room can pick up and/or reproduce audio in the room, as described herein. Assignment of the conferencing device to the room can be persistently stored in the memory of the conferencing device so that the conferencing device can retrieve the room assignment after being disconnected from (or after losing) power and subsequently being reconnected to power. Advantageously, it may not be necessary to reassign the conferencing device to the room following loss of power, reset of the conferencing device, or turning off and subsequently turning the conferencing device. When the conferencing device has not been assigned to any room (for example, at initialization or upon removal of the conferencing device from being assigned to a room), electronic circuitry of the conferencing device can prevent audio pickup and/or reproduction by the conferencing device even if the conferencing device is connected to power (such as, to the communications network). Rather than providing physical significance, room assignment may correspond to a grouping of conferencing devices, which may be physically placed in a room.

Conferencing devices assigned to the room can exchange messages with one another. For example, a conferencing device can exchange messages with the hub 140 and/or other conferencing devices assigned to the room. Such exchange of messages can be utilized to determine if any of the conferencing devices is malfunctioning and taking remedial action (for example, resetting the malfunctioning conferencing device). For example, "keep alive" messages can be exchanged, which can include sending a status request and waiting to receive a response (such as, "I am alive") within a particular time period. If the expected response is not received within the particular time period, the conferencing device may be determined to be malfunctioning. In response to determining that a conferencing device is malfunctioning, one or more alerts can be provided to the user, such as via control device 150 or the computing device.

Each room can have a different acoustics (or acoustic properties) due to the room's dimensions, shape, building materials, furnishings, mechanical or electromechanical devices positioned in the room, or the like. A conferencing system can be calibrated to perform optimally (or substantially optimally) in a particular room. Such calibration can sometimes be referred to as "room adapt." Room adapt can determine (or assign) a quality metric associated with one or more conferencing devices. The quality metric can indicate the quality level of audio pickup. Room adapt can be performed via the "Room Functions Menu" feature accessible via the user interface of the control device 150 (for example, the ecosystem application 156 that configures the conferencing platform) or with the computing device, as described in Appendix A. Room adapt can be performed after conferencing devices have been assigned to the room. When a new conferencing device (or devices) is added to the room, room adapt can be performed again. Room adapt can be initiated or controlled by the hub 140.

During room adapt, one or more conferencing devices in the room (such as, the table device, ceiling device, or wall device) can emit one or more test sounds to test one or more of a signal-to-noise ratio (SNR) or reverberation time. The test sound can be a chirp, which can have increasing or decreasing frequency. In some cases, the hub 140 can send one or more frog chirp signals to each of the one or more conferencing devices in the room, which the one or more conferencing devices can reproduce or playback (one at a time or multiple devices simultaneously). The frog chirp signal can be selected as a signal that is insensitive to noise. For example, the cross-correlation of the emitted frog chirp signal and a received signal can insensitive to the type of noise sources that may be present in the room.

The SNR of the room and/or one or more areas of the room can be measured. For example, the SNR for an area of the room where a noise source is present (such as, air conditioning vent) may be lower than for a different area of the room where there is no noise source. The SNR can be measured by determining a signal level of the detected signal (such as, the reflected frog chirp signal). In some cases, playing back the frog chirp signal can be used to determine if a particular conferencing device is operational (such as, active). In addition to or alternatively, a noise level of the room and/or one or more areas of the room can be measured, for instance, by measuring the level of ambient (or background) noise when no test sound is being produced.

As described herein, reverberation time can be measured during room adapt. Reverberation time can refer to the time duration it takes a test sound to decay or fade away. For instance, in accordance with the RT60 standard, reverberation time is specified as time duration for the test sound to be reduced by about 60 decibels (dB). In some cases, a threshold less than or greater than about 60 dB can be used. Shorter (or lower) reverberation time may be more preferable for speech to be understood more clearly (such as, about 200 milliseconds (ms) or less for being reduced by 60 dB). In certain cases, the hub can send one or more chirp signals that are different than the frog chirp signal to measure the reverberation time of the room or one or more areas of the room. The chirp signal can be a short signal with high frequency content. One or more conferencing devices in the room can reproduce or playback the chirp signal one at a time or simultaneously by more than one device. Reverberation time can be measured by determining the delay between reproducing the chirp signal and detecting the reflection (decayed to a particular level, such as 60 dB). The one or more conferencing devices can playback the chirp signal multiple times, such as two times, three times, four times, five times, or six or more times.

The one or more conferencing devices can provide one or more of the measured SNR and reverberation time to the hub 140. The hub 140 can use this information to determine the quality metrics, as described herein.

In some cases, the determined SNR and reverberation time can be combined to determine a quality metric for a particular conferencing device. In some cases, the combination can be linear, such as weighted linear combination. For example, higher SNR can correspond to a higher quality metric (and vice versa). As another example, shorter reverberation time (such as, about 200 ms or less, as explained above) can correspond to a higher quality metric. As yet another example, longer reverberation time (such as, about 400 ms or more) can correspond to a lower quality metric.

Certain types of conferencing devices may inherently have higher quality metrics than other types of conferencing devices. For instance, a conferencing device that is configured to perform more optimized audio pick up (sometimes referred to as "audio coverage") can have a higher quality metric than another conferencing device. For example, due its larger size (and/or wider aperture of the microphone array), the wall device 130 can have greater audio coverage than the table device 110 or the ceiling device 120.

To facilitate finding one or more conferencing devices and/or one or more rooms to which they are assigned, conferencing devices can be pinged (either collectively or individually). For example, one or more conferencing devices in a particular room can be pinged, which can cause the one or more devices to generate a sound (such as, a ping sound) or another type of indication. This can help a user locate the particular room (for instance, when an organization has multiple rooms with conferencing systems). Pinging can be imitated via the user interface of the control device 150 (for example, the ecosystem application 156 that configures the conferencing platform) or with the computing device, as described in Appendix A.

Additionally or alternatively, room adapt can optimize performance by adjusting microphone(s) and/or speaker(s) levels to work optimally (or substantially optimally) in the particular room. In some cases, room adapt can adjust the level of the speaker(s) of the one or more conferencing devices to create evenly dispersed audio playback in the room (such as, across the room).

Figure 9:
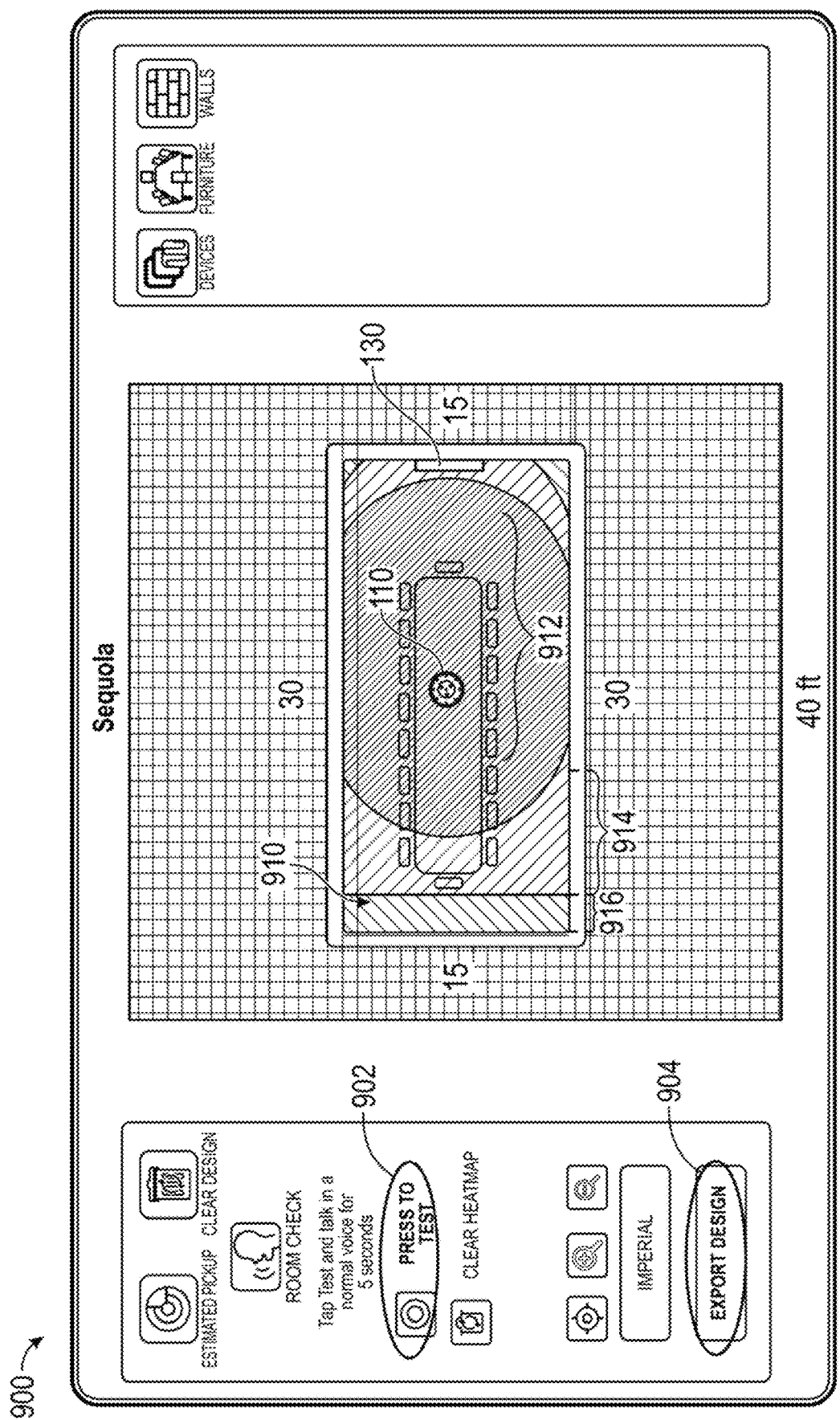
FIG. 9 illustrates a user interface for testing or verifying operation of a conferencing system.

FIG. 9 illustrates a user interface 900 for testing or verifying operation of a conferencing system in a room (sometimes referred to a "room check"). In some cases, room check can be performed after room adapt has been completed (so that, for instance, the one or more quality metrics have already been determined). Room check can be implemented by the conferencing system, such as by one or more conferencing devices in the room. The user interface 900 can be accessible via the user interface of the control device 150 (for example, the ecosystem application 156 that configures the conferencing platform) or with the computing device, as described in Appendix A.

FIG. 9 illustrates that the room includes the table device 110 and the wall device 130. Additional or alternative conferencing device types can be positioned in the room. Room check can test the audio pickup properties of the conferencing system in the room. For instance, the user can speak for five seconds (or less or more). The user can be positioned anywhere in the room. The user can speak after initiating room check, for instance, by activating a user interface component 902 (such as, pressing a button).

During room check, each of the conferencing devices in the room (such as, the table device 110 and the wall device 130) can perform a self-test. By listening to the user's voice and utilizing the SNR and reverberation time (which, as explained above, may have been determined during room adapt), room check can generate a visual representation 910 of the room. The visual representation 910 can illustrate the expected audio quality (sometimes referred to as "audio coverage") for different areas in the room. The visual representation can be a heat map. For example, the expected audio quality in the area 912 (illustrated with hatched pattern having closely spaced lines slanted at about 135 degrees) can be optimal or nearly optimal, the expected audio quality in the area 914 (illustrated as hatched pattern with lines slanted at about 135 degrees) can be worse than in the area 912, but still adequate, and the expected audio quality in the area 916 (illustrated with hatched pattern having lines slanted at about 45 degrees) can be inadequate. The visual representation 910 can color-code areas of the room according to the expected audio quality. As shown in Appendix A, for example, the area 912 can be illustrated in a first color (such as, green color or another color), the area 914 can be illustrated in a second color (such as, yellow color or another color), and the area 916 (such as, in the rear of the room) can be illustrated in a third color (such as, red color or another color).

Based on the visual representation 910, one or more decisions can be made regarding repositioning and/or adding one or more conferencing devices. For example, an additional conferencing device may be added to one or more areas where the audio quality has been determined to be inadequate. As another example, an existing conferencing device may be moved to (or toward) another area to improve the audio coverage. The visual representation 910 can be saved to a room profile for referencing later. For example, the visual representation 910 can be saved by activating a user interface component 904 (such as, a button).

Room Design

Figure 10:
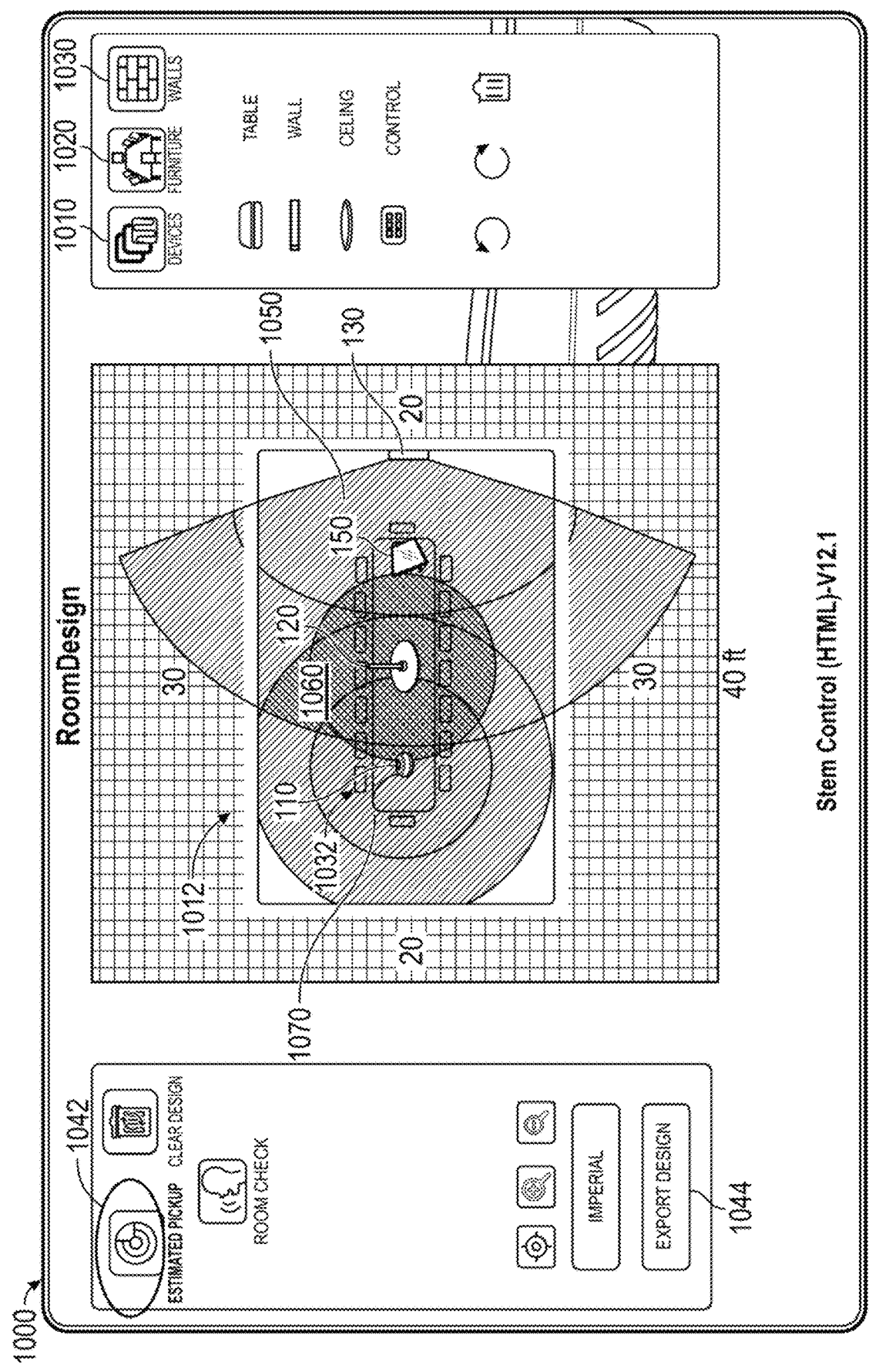
FIG. 10 illustrates a user interface for designing a room.

FIG. 10 illustrates a user interface 1000 for designing a room and determining room coverage (sometimes referred to as "room design"). Room design can allow a user to virtually recreate any room, add one or more conferencing devices, and check the audio coverage. Room design can facilitate the planning and design of the conferencing room system for a particular room. The illustrated user interface 1000 can be accessible via a website or an app. Room design can be implemented by one or more computing devices, such as a laptop, personal computer, or the like.

The user interface 1000 can include one or more user interface components for designing the room. The user interface components can include a user interface component 1010 (such as, a button) for positioning one or more conferencing devices, a user interface component 1020 (such as, a button) for positioning one or more items of furniture (such as, table, chair, sofa, couch, or the like), or a user interface component 1030 (such as, a button) for positioning one or more walls or partitions. Activating any of the user interface components 1010, 1020, or 1030 can cause the user interface 1000 to display available conferencing devices options, furniture options, or walls options for selection. For example, FIG. 10 illustrates conferencing device options (below the user interface components 1010, 1020, and 1030) available for selection.

The dimensions and configuration of one or more walls or furniture items can be adjusted via the user interface 1000. For example, room of any dimensions and size can be created. As another example, a table of any size and shape can be added, such as a rectangular, circular, oval-shaped, L-shaped, U-shaped, or the like. The user interface 1000 can include one or more user interface components for rotating any of the furniture items. The user interface 1000 can include one or more user interface components for removing any of the conferencing devices, furniture items, or walls.

As is illustrated in FIG. 10, a rectangular room has been designed. The room is delineated by a rectangular wall 1012 (such as, 30 meters long and 20 meters wide) and includes a rectangular conference table with chairs 1032. Table device 110, ceiling device 120, wall device 130, and control 150 have been positioned as shown. Positioning of each of the devices in the room can be adjusted via the user interface 1000 (for example, by drag and drop with a mouse). A hub 140 may be added (for example, automatically) to facilitate interaction between one or more of these conferencing devices.

Once one or more conferencing devices have been positioned in the room, audio coverage in the room can be estimated, for instance, via a user interface component 1042 (such as, a button). As is illustrated in FIG. 10, different conferencing devices can have different audio coverage zones or regions. For example, as described herein, the audio coverage region of the wall device 130 (shown as a sector 1050 emanating from the wall device 130) can be larger than the audio coverage of the ceiling device 120 (shown as a circle 1060) or the audio coverage of the wall device 110 (shown as a circle 1070). Beam width can be selected, for instance, for the ceiling device 120. As described herein, increasing the beam width can increase the audio coverage of the ceiling device 120, which can increase the radius of the circle 1060.

For any of the conferencing devices, the coverage region can be illustrated as having two (or more zones) corresponding to the expected quality of the audio coverage. For example, a first zone positioned closer to the conferencing device can correspond to a higher expected quality of audio coverage than a second zone positioned farther from the conferencing device. For ease of user's comprehension (as illustrated, for example, in Appendix A), the first zone can be illustrated in a first color (such as, dark green color or another color) and the second zone can be illustrated in a second, different color (such as, light green color or another color). An intersection between audio coverage zones of different conferencing devices can be determined and illustrated in different color. For example, an intersection between the second zones of audio coverage of two conferencing devices can be illustrated in the second color to signify improved expected quality of the audio coverage due to the overlapping audio coverages. As another example, an intersection between the second zones of audio coverage of three conferencing devices can be illustrated in a third, different color (such as, a darker green color or another color) to signify a more improved expected quality of the audio coverage due to the three overlapping audio coverages.

Visualizing the audio coverage can assist the user in determining the number, type, and placement of the conferencing devices in the room for designing the conference system. For example, an additional conferencing device may be added to one or more areas where the audio coverage is inadequate. As another example, an existing conferencing device may be moved to (or toward) another area to improve the coverage. The room design can be saved for referencing later. For example, the room design can be saved by activating a user interface component 1044 (such as, a button).

Beamforming and Fencing

Any of the conferencing devices disclosed herein can utilize any of beamforming approaches described in this section or elsewhere in the disclosure.

Beamforming can refer to one or more of shaping (such as, narrowing or widening) a directional response of a microphone array. With beamforming, signal pickup can be improved as a result of the enhancement of the signal, reduction of noise, increase of the range, or the like. One of the problems with beamforming is maintaining a uniform beam-width across the entire frequency range of interest. Non-uniform beam-width can cause degradation in performance particularly with wideband signals, such as speech. Because the width of the main lobe of the beamformer can become narrower as the frequency increases, higher frequency components of speech would be lost particularly when the sound source moves out of the center of the beam.

To solve this and other problems, constant width beamforming can be utilized by any of the conferencing devices described herein. Instead of simply summing up the output of the microphones in the microphone array (such as, with delay and sum beamforming), outputs of the microphones can be weighted and combined (such as, summed up). This approach (which can be referred to as "filter and sum") can reshape the audio beam (sometimes referred to a listening beam or beam) and, as a result, improve the response characteristics of the microphone array to wideband signals, such as speech. With constant width beamforming, constant beam-width of the beam (such as, constant narrow beam-width) can be maintained over a wide range of frequencies and high quality of audio pickup can be maintained.

In some implementations, the microphones in the microphone array can be arranged in a single ring (as shown, for instance, in FIG. 2) or in a plurality of concentric rings (as shown, for instance, in FIG. 3). Such arrangement of the microphones can be advantageous for conferencing applications, in which the signal of interest may come from any direction. In some cases, the microphones can be evenly distributed (or spaced) throughout the ring(s).

For constant width beamforming, same weights can be determined and applied to the output of the microphones positioned in the same ring. Contributions of the microphones in the outer ring(s) can be attenuated or eliminated as frequency of the signal increases. The attenuation or elimination can be performed by selecting weights that are proportional to the frequency (for instance, value of a weight can be inversely proportional to the frequency). As the frequency increases, contributions of the microphones in the outer rings can be attenuated or eliminated (for instance, by setting the weights to zero or by applying appropriate filter coefficients) until the microphones in a single ring with a weight different than zero participate in the beamforming.

In some cases, to maintain constant beam-width at lower frequencies (such as, at frequencies below a low frequency threshold, such as about 1 kHz or the like), weights can be selected such that only the contributions of the microphones in the innermost ring are being used. As the frequency increases, weights can be selected such that contributions of the microphones in the other rings that are positioned outward are being used. As described above, as the frequency continues to increase (such as, beyond a high frequency threshold), contributions of the microphones in the outer rings can be attenuated or eliminated by selecting the weights (or filter coefficients) appropriately. This way, constant beam-width can be maintained across the entire frequency range of interest even for wideband signals, such as speech.

Weights can be applied by utilizing one or more filters. For example, the output of the microphones in a given ring can be processed by a filter (such as, a low-pass filter or a band-pass filter). Weights can serve as filter coefficients, such as finite impulse response (FIR) filter coefficients. Different filters can be applied to the microphones in different rings. As explained above, cutoff frequencies of the filters can be different. For instance, the cutoff frequency of a filter being applied to the output of the microphones in an outer ring can be smaller than the cutoff frequency of a filter being applied to the output of the microphones in an inner ring. This way, contributions of the microphones in the outer ring can be attenuated or eliminated as the frequency increases. In between the cutoff frequencies, smoothing magnitude coefficients can be calculated and applied such that the beam-width remains constant.

With reference to FIG. 2, the table device 110 can form separate directional beams utilizing each of the microphones 114. For example, as shown in FIG. 2, eight microphones 114 are positioned in the outer ring, and a microphone 114 is positioned in the center of the table device 110. The center microphone 114 can facilitate reduction of the side lobe levels. Eight beams can be formed using all nine of the microphones 114. Contributions of the center microphone 114 and the microphones 114 in the outer ring that forms the particular beam can be combined (such as, summed up). As described herein, the contributions can be weighted (such as, filtered) after being combined to attain constant beam-width for the beams. The beams can focus in different directions to detect speech emanating from different directions.

Presence of speech in the signal(s) detected by one or more of beams can be determined, for example, by determining one or more of that a signal strength of the picked up signal satisfies a signal strength threshold or that the spectral content matches the spectral content of speech. Match of the spectral content can be determined by determining presence of at least threshold amount of energy in different frequency ranges that represent speech. In some cases, mixing can be performed (for instance, by the table device 110) when speech is detected in multiple beams. This can occur, for example, when there are multiple speakers speaking simultaneously or nearly simultaneously. Mixing can involve determination of a combination of the signals detected by different beams. The combination can a weighted combination, such as a sum. The weights can be selected proportionally to one or more of the signal strength or the spectral content. For instance, a higher weight can be assigned to a signal with a higher signal strength detected by a particular beam.

In some cases, when a new sound source (such as, new speaker) is discovered, response of the beam in which the new signal has been discovered can be opened up very quickly to facilitate pickup and processing of the signal from the new sound source. For example, a relatively high weight can be assigned to such beam for the mixing. In some cases, a short fading in of such beam can be performed, which can be much shorter than the fade out. The weight assigned to the beam can be increased over time to facilitate fading in the new beam. When a beam stops detecting a signal, its response can be faded out slowly (until the weight is reduced to zero). This can be performed by gradually reducing the weight assigned to the beam over a duration of time. This approach can facilitate smooth pickup and/or reproduction.

With reference to FIG. 3, the ceiling device 120 can form a single beam with the microphones 124 positioned in the plurality of rings. Contributions of the microphones 124 in a ring can be combined (such as, summed up). As described herein, the contributions can be weighted (such as, filtered) after being combined to attain constant beam-width for the beams. Also, as described herein, contributions of one or more outer rings (such as, the outermost ring) can be attenuated or eliminated to maintain constant beam-width at higher frequencies.

Figure 11A:
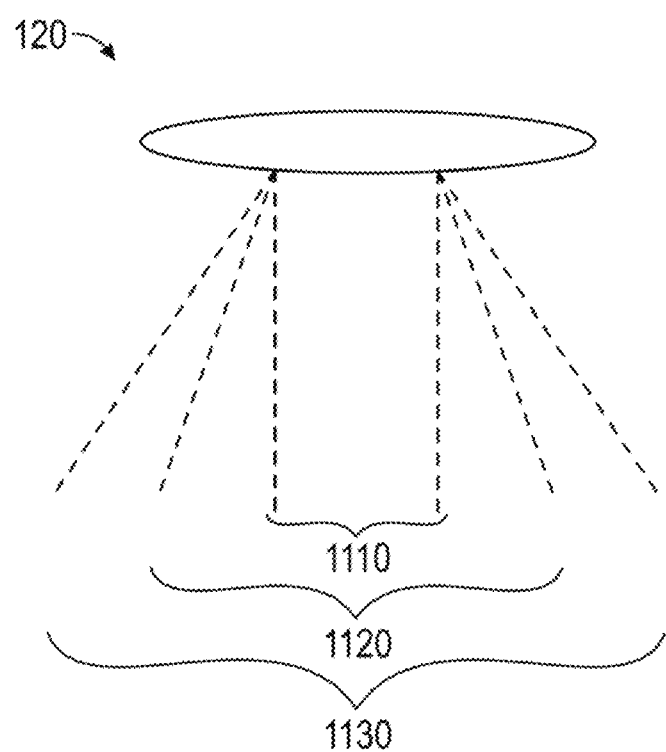
FIG. 11A illustrates beamforming implemented by a conferencing device.

The shape (such as, width) of the beam formed by the ceiling device 120 can be adjusted. For example, the width of the beam can be widened by attenuating or eliminating the microphones in one or more outer rings when performing the beamforming. Such widening can be due to the decrease in the aperture of the microphone array as a result of attenuating or eliminating the microphones. As another example, the width of the beam can be narrowed by adding in the microphones in one or more outer rings. With reference to FIG. 11A, the ceiling device 120 can be configured to provide, among other possibilities, one or more of a beam 1110 with narrow coverage (or a narrow beam with greater directional coverage), a beam with medium coverage 1120 (or a medium beam), or a beam with wide coverage 1130 (or a wide beam). Widening the beam can facilitate picking up audio from a larger zone (such as, area or volume) under or proximal to the ceiling device 120. Widening the beam can expand its coverage to include more participants (such as, speakers), accommodate movement of one or more participants, or the like. Configuration the shape of the beam can be performed by the user (such as, via the user interface of the control device 150) or automatically.

Figure 11B:
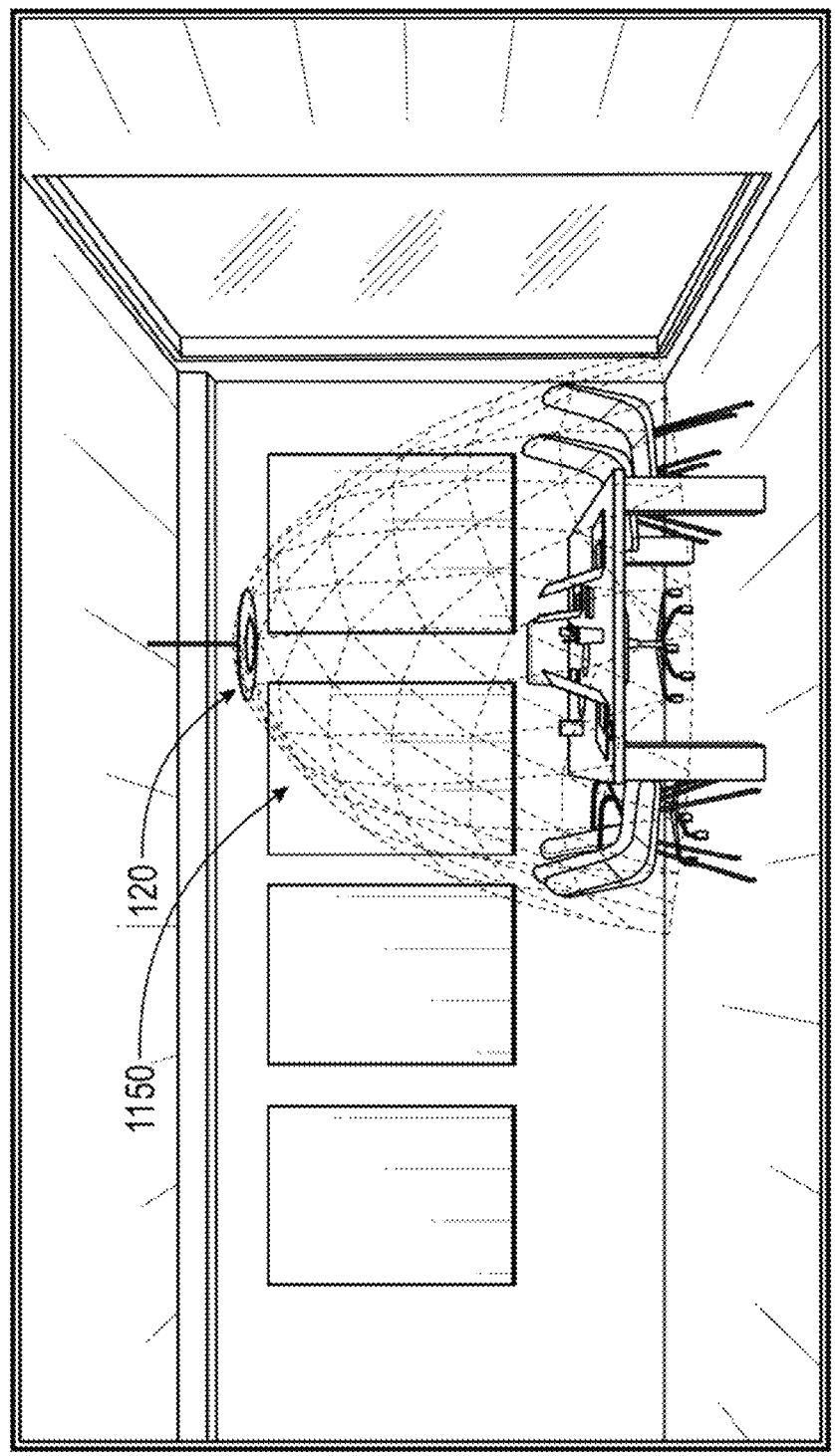
FIGS. 11B-11C illustrates fencing implemented by a conferencing device.

With reference to FIG. 11B, the ceiling device 120 can implement fencing. Fencing can be utilized to form or bound a fencing zone (such as, an area) in which the ceiling device 120 picks up audio. This can allow focusing the audio pickup on the speaker(s) positioned under the ceiling device 120 while blocking out other sources of audio or noise. For example, when a speaker is surrounded by other persons (or noise sources), fencing can be utilized to improve the quality of audio pickup. As another example, fencing can be used to block out room noise or compensate for poor room acoustics. As illustrated in FIG. 11B, a fence 1150 can be created to pick up audio from the fencing zone that includes speakers at the table, while blocking out other audio or noise sources in the room.

Figure 11C:
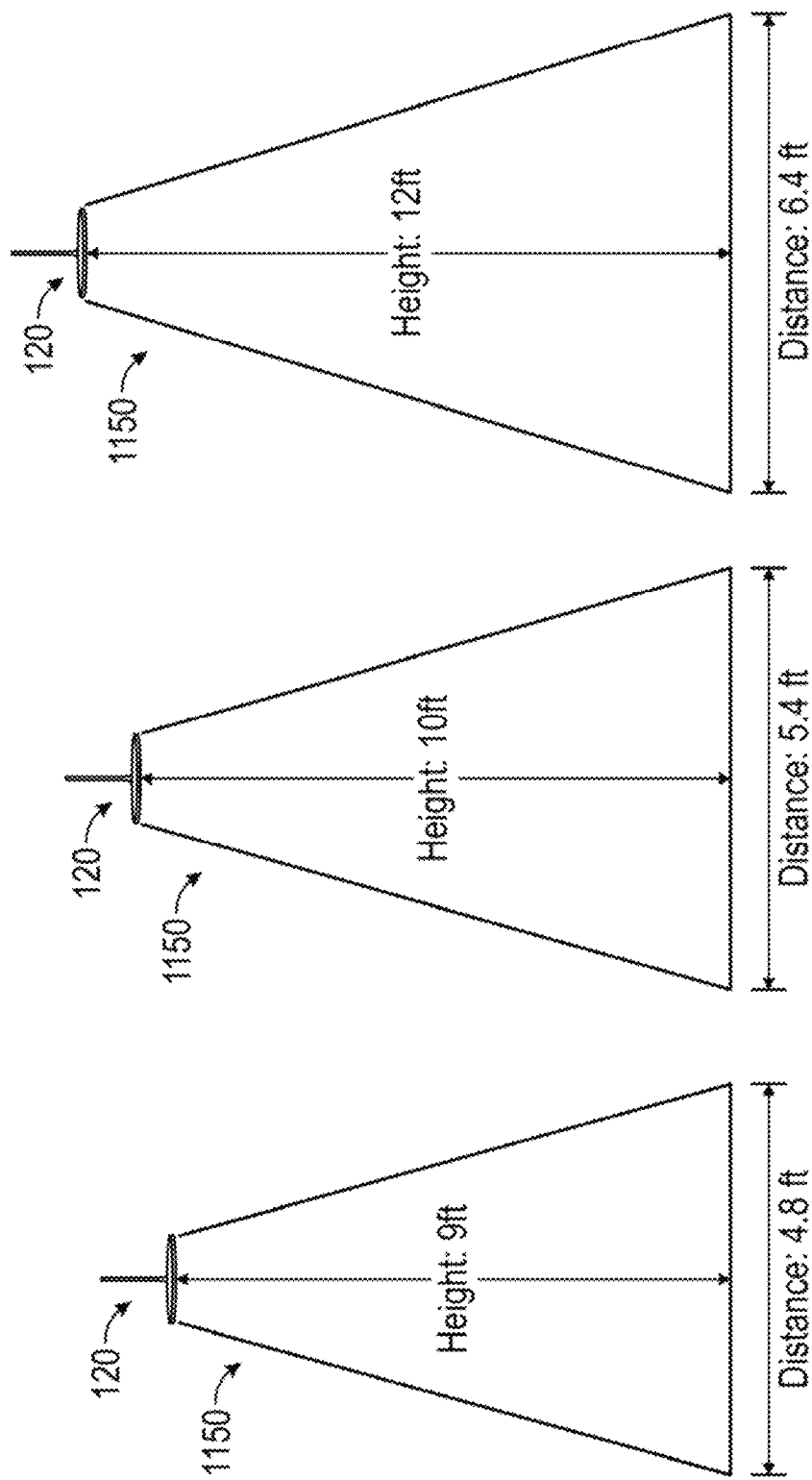

In some implementations, the fence 1150 can be a cone-shaped fencing zone (or fencing zone of a different shape) originating at the ceiling device 120, as shown in FIG. 11C. The angle of the cone-shaped fencing zone relative to the vertical direction may possibly be adjustable. For example, the angle can be 20 degrees (or less or more), 25 degrees (or less or more), 30 degrees (or less or more), 35 degrees (or less or more), or the like. FIG. 11C illustrates variation in the area of the fencing zone based on the mounting height of the ceiling device 120. As shown, the area of the fencing zone increases as the mounting height increases.

Fencing can be implemented using two beams, which can have different shapes (such as, widths). One audio beam can be a narrow beam and the other beam can be a wide audio beam. The narrow beam can be used to detect speech of interest. As described herein, the narrow beam can be obtained by using the microphones 124 of the inner and outer rings of the ceiling device 120 when performing the beamforming. The wide beam can be obtained by eliminating or attenuating the microphones 124 of one or more outer rings of the ceiling device 120. For example, the wide beam can be formed by using only the microphones 124 of the innermost ring of the ceiling device 120. As another example, the narrow beam can be formed by using microphones 124 in all the rings of the ceiling device 120. The wide beam can be used to determine signal(s) that should be blocked (or fenced out).

A difference between a signal detected by the wide beam and a signal detected by the narrow beam can determined and utilized. For example, if a signal is detected only by the wide beam, but not by the narrow beam, this can indicate that the signal is outside the narrow beam and should be eliminated. As another example, if an attenuated signal is detected by the wide and narrow beams, this can indicate that the signal is a wanted signal originating from a sound source from inside the fence 1150. As yet another example, if a signal is detected as being attenuated in the narrow beam, but not in the wide beam, this can indicate that the signal can be an unwanted signal that originated from a sound source outside the fence 1150. To determine whether the signal is attenuated, energy of the signal detected by the narrow beam and energy of the signal detected by the wide beam can be compared. For instance, the energy of the signal detected by the narrow beam can be compared to a threshold generated based on the energy of the signal detected by the wide beam (such as, k*wide beam signal energy, where $0<k<1$). The energy of the signal detected by the narrow beam being less than the threshold (or less than or equal to the threshold) can provide an indication that the signal is unwanted. In some cases, to improve accuracy, a plurality of energies of the signal can be determined for different frequency ranges. For example, attenuation of the signal originating from sound source outside the fence 1150 can be greater at higher frequencies as a result of better directionality of beamforming at higher frequencies. Removal of the unwanted signal(s) can be performed using subtraction.

With reference to FIG. 4, the wall device 130 can form separate directional beams for various combinations of the microphones 134. For example, seven beams focused in different directions can be formed using all the microphones 134 (such as, all fifteen microphones). The beams can be formed by using filter and sum as described herein. Each of the microphones 134 can participate in each of the beams. In some cases, at least some adjacent microphones can be paired and their contributions can be combined (for example, in analog fashion) in order to reduce computational costs and improve efficiency. Contributions of the microphones (or microphone pairs) in each of the beams can be combined (such as, summed up). As described herein, the contributions can be weighted (such as, filtered) after being combined to attain constant beam-width for the beams. The beams can detect speech emanating from different directions (such as, from seven or less or more different directions). Presence of speech in the signal(s) detected by one or more of beams and/or mixing can be performed as described herein.

Indication of the Direction of Arrival

As described herein, one or more of the conferencing devices described herein (such as, the table device or the wall device) can provide an indication of the direction(s) of one or more beams that detect the presence of audio (such as, speech). The indication can be visual, such as with the visual indicator 119. Beamforming techniques described herein can form directional beams that detect speech in real time or substantially in real time, which can detect rapid changes in the direction of arrival. For indicating the direction, it may be desirable provide more consistency in order to reduce or eliminate confusion by the users. In some cases, hysteresis can be applied to the directional output provided by the beamforming process so that indicating the direction of arrival reacts less rapidly to the changes in the direction of arrival detected by the beamforming process. For example, a filter (such as, a low pass filter) can be used to provide hysteresis. As described herein, the conferencing system can include one or more cameras (such as, the camera 160). Directional information for indicating the direction of arrival can be utilized to control the one or more cameras (such as, to focus the one or more cameras on the speaker(s)). Directional information can be provided to the computing device 180, which can control the one or more cameras.

Playback

As described herein, multiple conferencing devices of a conferencing system can be positioned in the room. Each of the conferencing devices can pick up audio in the room during conferencing and transmit the audio to the hub 140 (for example, over the communications network 710). The hub 140 can combine or mix audio from the conferencing devices into a single audio signal (or multiple audio signals) that can be output to one or more participants (such as, on the other end of the conference or in the same room where the hub 140 is positioned). Mixing can take into account the quality metrics determined for the conferencing devices. For example, a conferencing system can include a table device 110, a ceiling device 120, and a wall device 130 positioned in the room. The quality metric of the table device 110 can be A, the quality metric of the ceiling device 120 can be B, and the quality metric of the wall device can be C. In some cases, A, B, and/or C can be a number between zero and one. Suppose that each of the devices picks up an audio segment over a time duration (sometimes referred to as frame). A frame can have a duration of about 1 ms or less or more, 10 ms or less or more, 20 ms or less or more, 30 ms or less or more, 40 ms or less or more, or the like. The hub can mix the frames as follows to determine a combined frame according to:

Combined audio segment=$A$*audio segment picked up by table device+$B$*audio segment picked up by ceiling device+$C$*audio segment picked up by wall device The combined frame can reflect audio picked up by each of the conferencing device scaled or weighted by the quality metric of the conferencing device or by another weight value. To facilitate smoother pickup and/or playback, changing of the weights can be smoothed over time.

For example, two speakers in the room can be talking at the same time. Suppose the first speaker is positioned closer to a first conferencing device in the room, and the second speaker is positioned closer to a second conferencing device in the room. Cleaner audio of the first speaker (such as, audio with less interference) can be picked up by the first conferencing device. Cleaner audio of the second speaker can be picked up by the second conferencing device. The hub can mix the audio picked up by the first and second conferencing devices to determine the combined audio that includes speech of the first and second speaker (such as, a weighted combination of speech of the first and second speaker).

In some cases, audio picked up by the one or more conferencing devices is split frames. As described herein, the length of a frame can be relatively short. When multiple speakers are speaking, speech of the first and second speakers would likely end up in different frames (unless the speakers are talking over each other). In such cases, there may be little or no overlap between speech of different speakers in different frames, and the frames can include speech of only one speaker.

Mixing by the hub 140 can be performed in addition to the mixing performed by the conferencing devices as part of beamforming, as described herein. Mixing by the hub 140 can facilitate smooth pickup and/or playback.

Combined audio can be transmitted to the other side of the conference for playback. With reference to FIG. 7, for example, the hub 140 can communicate the combined audio to the computing device 180 for transmission via the Internet to a remote computing device on the other side of the conference. Similarly, the hub 140 can receive audio from the other side of the conference from the computing device 180. The hub 140 can receive audio over the connection 720. Connection 720 can implement a serial communication protocol, such as USB or Dante. In some cases, the connection 720 can alternatively or additionally implement a parallel communication (or data transfer) protocol.

Figure 12:
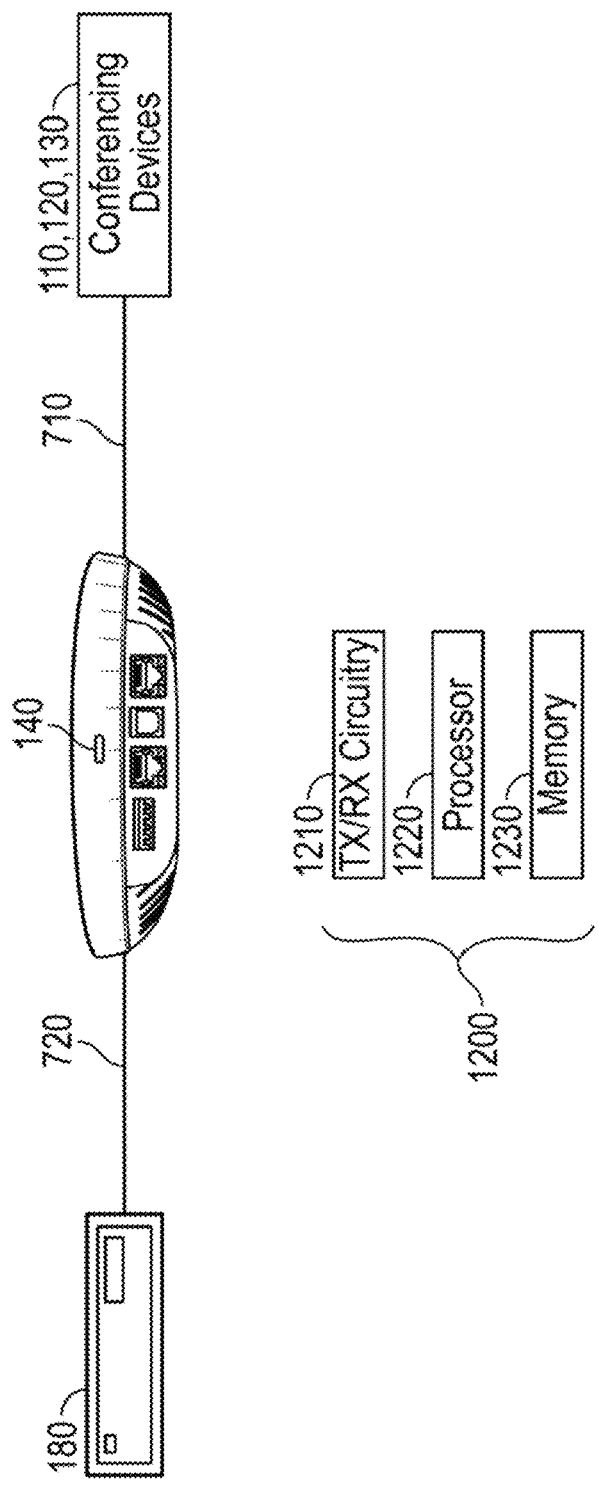
FIG. 12 illustrates synchronization of audio playback and/or pickup in a conferencing system.

To maintain high quality of audio playback, it may be advantageous to synchronize the audio playback among the conferencing devices (and/or external speakers) positioned in the room. If playback is not synchronized across the various conferencing devices, there can be a delay between playback by different conferencing devices, echo, incoherent or garbled audio, or the like. Additionally or alternatively, it may be advantageous to synchronize the audio pickup among the conferencing devices positioned in the room. If pickup is not synchronized across the various conferencing devices, there can be mismatch between sensing audio by the conferencing devices in the room. Synchronization FIG. 12 illustrates synchronization of audio playback and/or pickup in a conferencing system. As is shown, the hub 140 can be connected to the computing device 180 by the connection 720. The hub 140 can be connected to a plurality of conferencing devices (such as, one or more of the table device 110, ceiling device 120, or wall device 130) by the communications network 710. The hub can include electronic circuitry 1200 that may include transmission and/or receiving circuitry 1210, one or more processors 1220, and one or more memories 1230. Electronic circuitry can include other components (not shown), such as input/output circuitry, Ethernet communications circuitry, or the like.

The connection 720 can be a wired connection that plugs into the hub 140 via the port 148. As described herein, the connection 720 can support USB communications protocol (and the port 148 can be a USB port). In some cases, the computing device 180 can act as a master (or host) device that initiates data transfer and the hub 140 can act as a slave (or peripheral) device that receives the data. The computing device 180 can transmit data (which can include audio and/or video from the other side of the conference) and synchronization information to the hub 140 (such as, a clock signal or a data indicative of the clock signal). Synchronization information can be utilized to synchronize the transmission and/or receiving circuitry 1210 of the hub to ensure that the transmitted data is correctly received by the hub.

For example, the USB communications protocol provides that a synchronization pattern, called start-of-frame (SOF) marker or packet, is periodically transmitted (such as, every millisecond or less or more). A possible format of the SOF packet is shown below:

| Synch (8-bits) | Packet identifier (8-bits) | Frame Number (11-bits) | CRC5 (5-bits) | End of Packet (3-bits) |
|---|---|---|---|---|
| 00000001 | 1010 0101 | XXXX XXXX XXX | XXXXX | SE0 SE0 J |

Synch field can be a synchronization pattern or sequence indicating to the receiver that a new packet is being transmitted. Packet identifier (PID) field can indicate to the packet type. In the above example, "1010 0101" value of the PID field can indicate that an SOF packet is being transmitted. Frame number field can include a frame number value periodically incremented by the host device. CRCS field (or 5-bit cyclic redundancy check) can include error detection information that enables the receiver to verify that the packet was received correctly. End of packet (EOP) field can include a transition of the USB communications protocol lines that indicates an end of the packet. In some cases, more or less bits can be used in any of the fields in the above example. For instance, in some cases, the synch field can be 32-bits long.

In some cases, the transmission and/or receiving circuitry 1210 can utilize SOF packets (or similar packets, such as end of frame (EOF) packets) to synchronize with the computing device 180. Because SOF packets (or similar packets) can be transmitted by the computing device 180 periodically, such as every millisecond (which corresponds to a frequency of 1 kHz), the hub 140 can utilize the SOF packets (or similar packets) to synchronize its internal clock with the internal clock of the computing device 180. While the theoretical rate of transmission of the SOF packets (or similar packets) can be 1 kHz, the actual rate of transmission may depend on the internal clock of a USB host controller of the computing device 180. In some cases, the USB host controller can generate a clock that may drift from the theoretical 1 kHz frequency due to tolerances permitted by the USB communications protocol and the resulting use of inaccurate, low-cost crystal oscillators in USB host controllers. To recover the actual clock of the USB host controller, the transmission and/or receiving circuitry 1210 of the hub 140 can include phase locked loop (PLL) circuitry to perform the synchronization. The PLL circuitry (or PLL) can detect (or "lock onto") one or more fields of the SOF packet (or similar packet), such as one or more of the synch field, PID field, or frame number field. As a result, the PLL can output a clock signal that is synchronized (in frequency and/or phase) with the clock of the USB host controller of the computing device 180.

The PLL can be triggered by the SOF packets (or similar packets, such as end of frame packets), which in turn cause the PLL to lock onto the actual clock frequency of the USB host controller of the computing device 180. The output of the PLL can be used to synchronize the transmission of the audio data sampled by the conferencing devices with the clock of the USB host controller of the computing device 180. If there is mismatch between the rate data is being provided by the hub 140 and the rate data is being processed by the USB host controller of the computing device 180, portions of the sampled audio data (such as, one or more frames) may be incorrectly processed or not processed at all by the computing device 180. This can result in the degradation of the playback quality at the other side of the conference, such as generation of clicking sounds due to the missing frames.

To synchronize data transmission over the USB connection, the hub 140 can utilize the clock signal output by the PLL, which is synchronized with the clock frequency of the USB host controller of the computing device 180. This clock signal can be used to transmit (and/or receive) data over the USB connection. As a result of the hub 140 synchronizing its internal clock for communicating data with the computing device 180 over the USB connection, loss of data can be avoided.

Sampling of audio by the conferencing devices in the room can be synchronized by the hub 140 as follows. The internal clock of the hub 140 (or master clock) can be faster than the theoretical clock frequency of 1 kHz and faster than the sampling rate of the audio (such as, 32 kHz). In some cases, the internal clock can be about 1 MHz or less, about 2 MHz, about 3 MHz, about 4 MHz, about 5 MHz, about 6 MHz, about 7 MHz, about 8 MHz, about 8 MHz, or about 10 MHz or more. The internal clock can be generated by a crystal oscillator of the hub 140. In contrast with the USB host controller, the crystal oscillator can be accurate. Synchronization of the audio sampling can be performed by counting the number of clock cycles (or ticks) of the internal clock of the hub 140 that correspond to 32 counts of the clock signal output by the PLL (which is synchronized with the clock frequency of the USB host controller of the computing device 180). While theoretically 32 counts of the clock signal cycles should represent exactly 32 kHz, the frequency will be different in practice. The number of clock cycles of the internal clock of the hub 140 spanning 32 counts of the clock signal output by the PLL can represent the synchronized audio sampling rate.

The conferencing devices can maintain internal clocks that are synchronized (in frequency and/or phase) with the internal clock of the hub 140. This can be achieved by the use of an accurate crystal oscillator by each of the conferencing devices. To synchronize the audio sampling of the conferencing devices, the hub 140 can transmit (for example, periodically) the count of the number of clock cycles of the internal clock spanning 32 counts of the clock signal output by the PLL. The transmission can be performed over the communications network 710. The conferencing devices can utilize the count and their internal clocks to cause the audio sampling to be synchronized across all the conferencing devices.

Other Variations

While the above description can, in some cases, refer only to audio data, video data is also contemplated. The systems and methods disclosed herein are not limited to conferencing applications and can be used for any audio and/or video applications, such as audio reproduction. Wireless communications, such as WiFi, can be used in place of or in addition to wired communications. Any of the devices disclosed herein may be powered wirelessly and/or utilize an internal or external power source.

Any value of a threshold, limit, duration, etc. provided herein is not intended to be absolute and, thereby, can be approximate. In addition, any threshold, limit, duration, etc. provided herein can be fixed or varied either automatically or by a user. Furthermore, as is used herein relative terminology such as exceeds, greater than, less than, etc. in relation to a reference value is intended to also encompass being equal to the reference value. For example, exceeding a reference value that is positive can encompass being equal to or greater than the reference value. In addition, as is used herein relative terminology such as exceeds, greater than, less than, etc. in relation to a reference value is intended to also encompass an inverse of the disclosed relationship, such as below, less than, greater than, etc. in relations to the reference value.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes disclosed and/or illustrated may differ from those shown in the figures. Depending on the embodiment, certain of the steps described above may be removed, others may be added. For example, the actual steps and/or order of steps taken in the disclosed processes may differ from those described and/or shown in the figure. Depending on the embodiment, certain of the steps described above may be removed, others may be added. For instance, the various components illustrated in the figures and/or described may be implemented as software and/or firmware on a processor, controller, ASIC, FPGA, and/or dedicated hardware. Furthermore, the features and attributes of the specific embodiments disclosed above may be combined in different ways to form additional embodiments, all of which fall within the scope of the present disclosure.

In some cases, there is provided a non-transitory computer readable medium storing instructions, which when executed by at least one computing or processing device, cause performing any of the methods as generally shown or described herein and equivalents thereof.

Any of the memory components described herein can include volatile memory, such random access memory (RAM), dynamic random access memory (DRAM), synchronous dynamic random access memory (SDRAM), double data rate (DDR) memory, static random access memory (SRAM), other volatile memory, or any combination thereof. Any of the memory components described herein can include non-volatile memory, such as flash integrated circuits, read only memory (ROM), Chalcogenide random access memory (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

User interface screens illustrated and described herein can include additional and/or alternative components. These components can include menus, lists, buttons, text boxes, labels, radio buttons, scroll bars, sliders, checkboxes, combo boxes, status bars, dialog boxes, windows, and the like. User interface screens can include additional and/or alternative information. Components can be arranged, grouped, displayed in any suitable order.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language, such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

Although the present disclosure includes certain embodiments, examples and applications, it will be understood by those skilled in the art that the present disclosure extends beyond the specifically disclosed embodiments to other alternative embodiments and/or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

What is claimed is:

1. A conferencing device for use in a scalable conferencing system, the conferencing device comprising:
   a housing supporting at least one of a microphone or a speaker, the housing configured to be positioned on a surface, mounted on a ceiling, or mounted on a wall; and
   a first processing circuitry supported by the housing, the first processing circuitry configured to:
      in response to receiving an indication that the conferencing device has been assigned to a group of conferencing devices associated with a room, store information associating the conferencing device with the room in a first memory; and
      in response to being powered on:
         retrieve the information associating the conferencing device with the room from the first memory;
         in response to determining that the conferencing device has been assigned to the group of conferencing devices associated with the room, cause at least one of: the microphone to sense audio in the room or the speaker to reproduce audio in the room; and
         in response to determining that the conferencing device has not been assigned to the group of conferencing devices associated with the room, prevent any microphone from sensing audio in the room and prevent any speaker from reproducing audio in the room.

2. The conferencing device of claim 1, wherein the first processing circuitry is configured to receive power and communicate with another conferencing device associated with the room over a wired connection.

3. The conferencing device of claim 2, wherein the wired connection comprises an Ethernet connection.

4. The conferencing device of claim 1, wherein the microphone comprises a plurality of microphones spaced apart from one another, and wherein the first processing circuitry is configured to utilize the plurality of microphones to perform beamforming to locate one or more audio sources in the room.

5. The conferencing device of claim 4, wherein the first processing circuitry is configured to utilize the plurality of microphones to perform constant width beamforming.

6. The conferencing device of claim 4, further comprising a visual indicator supported by the housing, wherein the first processing circuitry is configured to cause the visual indicator to indicate positioning of the one or more audio sources in the room.

7. The conferencing device of claim 4, wherein the first processing circuitry is configured to utilize beamforming to bound a zone in which audio is sensed by the plurality of microphones.

8. The conferencing device of claim 7, wherein the first processing circuitry is configured to:
form or cause formation of a first beam and a second beam, the first beam with a narrower coverage than coverage of the second beam;
sense or cause at least some microphones of the plurality of microphones to sense audio originating from a first audio source located within the coverage of the first beam; and
ignore or cause at least some microphones of the plurality of microphones to ignore audio originating from any second audio source located outside the coverage of the first beam and within the coverage of the second beam.

9. A scalable conferencing system comprising a plurality of conferencing devices of claim 1, wherein:
the plurality of conferencing devices are configured to be assigned to a group of conferencing devices associated with the room;
the plurality of conferencing devices are configured to interact to sense audio in the room and reproduce audio in the room; and
the scalable conferencing system further comprises a hub configured to be assigned to the group of conferencing devices associated with the room, the hub including a second processing circuitry configured to:
in response to receiving an indication that the hub has been assigned to the group of conferencing devices associated with the room, store information associating the hub with the room in a second memory; and
in response to being powered on:
retrieve the information associating the hub with the room from the second memory; and
in response to determining that the hub has been assigned to the group of conferencing devices associated with the room, control the plurality of conferencing devices to synchronize audio sensing and reproduction in the room.

10. The scalable conferencing system of claim 9, wherein the second processing circuitry is further configured to:
in response to determining that the hub has not been assigned to the group of conferencing devices associated with the room, prevent the plurality of conferencing devices from synchronizing audio sensing and reproduction in the room.

11. The scalable conferencing system of claim 9, wherein the conferencing devices of the plurality of conferencing devices and the hub are configured to be connected over a wired connection and are further configured to communicate and receive power over the wired connection.

12. A method of operating a conferencing device for use in a scalable conferencing system, the method comprising:
by a first processing circuitry:
in response to receiving an indication that the conferencing device has been assigned to a group of conferencing devices associated with a room, storing information associating the conferencing device with the room in a first memory; and
in response to being powered on:
retrieving the information associating the conferencing device with the room from the first memory;
in response to determining that the conferencing device has been assigned to the group of conferencing devices associated with the room, causing at least one of: a microphone of the conferencing device to sense audio in the room or a speaker of the conferencing device to reproduce audio in the room; and
in response to determining that the conferencing device has not been assigned to the group of conferencing devices associated with the room, preventing any microphone of the conferencing device from sensing audio in the room and preventing any speaker of the conferencing device from reproducing audio in the room.

13. The method of claim 12, further comprising, by the first processing circuitry, receiving power and communicating with another conferencing device associated with the room over a wired connection.

14. The method of claim 13, wherein the wired connection comprises an Ethernet connection.

15. The method of claim 12, wherein the microphone comprises a plurality of microphones spaced apart from one another, and wherein the method further comprises, by the first processing circuitry, locating one or more audio sources in the room via beamforming that uses the plurality of microphones.

16. The method of claim 15, wherein the beamforming comprises constant width beamforming.

17. The method of claim 15, further comprising, by the first processing circuitry, providing an indication of positioning of the one or more audio sources in the room.

18. The method of claim 15, further comprising, by the first processing circuitry, utilizing beamforming to bound a zone in which audio is sensed by the plurality of microphones.

19. The method of claim 18, further comprising, by the first processing circuitry:
forming or causing formation of a first beam and a second beam, the first beam with a narrower coverage than coverage of the second beam;
sensing or causing at least some microphones of the plurality of microphones to sense audio originating from a first audio source located within the coverage of the first beam; and
ignoring or causing at least some microphones of the plurality of microphones to ignore audio originating from any second audio source located outside the coverage of the first beam and within the coverage of the second beam.

20. A method of operating a scalable conferencing system comprising a plurality of conferencing devices of claim 12 and a hub, the method comprising:

by a second processing circuitry of the hub:
   in response to receiving an indication that the hub has been assigned to the group comprising the plurality of conferencing devices associated with the room, storing information associating the hub with the room in a second memory; and
   in response to being powered on:
     retrieving the information associating the hub with the room from the second memory; and
     in response to determining that the hub has been assigned to the group of conferencing devices associated with the room, controlling the plurality of conferencing devices to synchronize audio sensing and reproduction in the room, wherein the conferencing devices of the plurality of conferencing devices are configured to interact to sense audio in the room and reproduce audio in the room.

21. The method of claim 20, further comprising, by the second processing circuitry:
   in response to determining that the hub has not been assigned to the group of conferencing devices associated with the room, preventing the plurality of conferencing devices from synchronizing audio sensing and reproduction in the room.

22. The method of claim 20, further comprising, by the plurality of conferencing devices, receiving power and communicating over a wired connection.

23. The conferencing device of claim 1:
   wherein the microphone comprises a plurality of microphones;
   wherein the housing supports the plurality of microphones spaced apart from one another; and
   wherein the first processing circuitry is configured to:
     determine that the audio has been generated by one or more audio sources positioned within a zone and not by an audio source positioned outside the zone; and
     process the audio responsive to the determination.

24. The conferencing device of claim 23, wherein the first processing circuitry is configured to:
   form or cause formation of a first audio beam by the plurality of microphones and a second audio beam by the plurality of microphones, the first audio beam with a narrower coverage than coverage of the second audio beam;
   sense or cause at least some microphones of the plurality of microphones to sense audio originating from a first audio source located within the coverage of the first audio beam; and
   ignore or cause at least some microphones of the plurality of microphones to ignore audio originating from any second audio source located outside the coverage of the first audio beam and within the coverage of the second audio beam.

\* \* \* \* \*